US012756536B2

(12) United States Patent
Boudi et al.

(10) Patent No.: US 12,756,536 B2
(45) Date of Patent: Oct. 6, 2026

(54) COMPUTATION ON ENCODED-AND-ENCRYPTED VALUES

(71) Applicant: ZAMA SAS, Paris (FR)

(72) Inventors: Anas Boudi, Paris (FR); Ilaria Chillotti, Paris (FR); Damien Ligier, Paris (FR); Jean-Baptiste Guillaume Noël Orfila, Paris (FR)

(73) Assignee: ZAMA SAS, Paris (FR)

( * ) Notice: Subject to any disclaimer, the term of this patent is extended or adjusted under 35 U.S.C. 154(b) by 98 days.

(21) Appl. No.: 18/867,654

(22) PCT Filed: May 24, 2023

(86) PCT No.: PCT/EP2023/063893
§ 371 (c)(1),
(2) Date: Nov. 20, 2024

(87) PCT Pub. No.: WO2023/227650
PCT Pub. Date: Nov. 30, 2023

(65) Prior Publication Data
US 2026/0189361 A1 Jul. 2, 2026

(30) Foreign Application Priority Data
May 24, 2022 (EP) .................................... 22315114

(51) Int. Cl.
*H04L 9/00* (2022.01)

(52) U.S. Cl.
CPC .................................... *H04L 9/008* (2013.01)

(58) Field of Classification Search
CPC ...................................................... H04L 9/008
See application file for complete search history.

(56) References Cited

U.S. PATENT DOCUMENTS

2019/0312728 A1 10/2019 Poeppelmann
2020/0213079 A1* 7/2020 Kreeger ................. G06F 7/544
(Continued)

FOREIGN PATENT DOCUMENTS

CA 3034597 A1 2/2019
CN 106452723 A 2/2017
(Continued)

OTHER PUBLICATIONS

Chillotti et al., Concrete: Concrete Operates oN Ciphertexts Rapidly by Extending TfhE, WAHC 2020, 7 pages (Year: 2020).*
(Continued)

*Primary Examiner* — Oleg Korsak
(74) *Attorney, Agent, or Firm* — NIXON & VANDERHYE P.C.

(57) ABSTRACT

Some embodiments are directed to a cryptographic method of performing an encrypted computation on a set of one or more encoded-and-encrypted values. A value is encoded-and-encrypted as encryptions of multiple respective subvalues. A subvalue has a corresponding message modulus and carry-message modulus larger than the message modulus. A value is encoded-and-encrypted without carry by non-carry subvalues smaller than the corresponding message moduli. A value is encoded-and-encrypted with carry by at least one with-carry subvalue larger than or equal to the corresponding message modulus. An encrypted operation is applied to at least an input value encoded-and-encrypted with carry to obtain an output value encoded-and-encrypted with carry. An encrypted carry-reduction is applied to the output value encoded-and-encrypted with carry to obtain a further encoding-and-encryption of the output value in which at least one with-carry subvalue is reduced to a non-carry subvalue.

20 Claims, 6 Drawing Sheets

(56) References Cited

U.S. PATENT DOCUMENTS

| | | | | |
|---|---|---|---|---|
| 2024/0187210 | A1* | 6/2024 | Hoshizuki | H04L 9/008 |
| 2024/0267222 | A1* | 8/2024 | Chillotti | H04L 9/008 |
| 2025/0175322 | A1* | 5/2025 | Bourgerie | H04L 9/008 |

FOREIGN PATENT DOCUMENTS

| | | | |
|---|---|---|---|
| CN | 108809619 | A | 11/2018 |
| CN | 110457912 | A | 11/2019 |
| JP | 2005535360 | A | 11/2005 |
| JP | 2020537756 | A | 12/2020 |
| WO | 086304 | A2 | 10/2003 |
| WO | 2022129979 | A1 | 6/2022 |

OTHER PUBLICATIONS

Chillotti et al., TFHE: Fast Fully Homomorphic Encryption Over the Torus, Journal of Cryptology, 2020, 33 (1), pp. 34-91. (Year: 2020).*

Jean-Philippe Bossuat et al, "Security Guidelines for Implementing Homomorphic Encryption", Cryptology ePrint Archives, https://eprint.iacr.org/2024/463, Paper 2024/463, 2024.

Morten Dahl et al, "Noah's Ark: Efficient Threshold-FHE Using Noise Flooding", WACH'23, Nov. 26, 2023, Copenhagen, Denmark.

Andrei Stoian et al; "Deep Neural Networks for Encrypted Inference with TFHE", Cryptology ePrint Archives, https://eprint.iacr.org/2023/257, Paper 2023/257, 2023.

Johannes Mono et al; "Finding and Evaluating Parameters for BGV", Cryptology ePrint Archives, https://eprint.iacr.org/2022/706, Paper 2022/706, 2022.

Daphne Trama et al; "A homomorphic AES evaluation in less than 30 seconds by means of TFHE", WAHC 2023, Nov. 2023, Copenhagen, Denmark.

Pierre-Emmanuel Clet et al, "ComBo: a Novel Functional Bootstrapping Method for Efficient Evaluation of Nonlinear Functions in the Encrypted Domain", AfricaCrypt, Jul. 2023, Sousse, Tunisia, p. 317-343.

Thibault Balenbois et al, "Trivial Tanscipering With Trivium and TFHE", WAHC 23, Nov. 26, 2023, Copenhagen, Denmark.

Antonio Guimaraes, "MOSFHET: Optimized Software for FHE over the Torus", Cryptology ePrint Archives, https://eprint.iacr.org/2022/515, Paper 2022/515, 2022.

Beatrice Biasioli, "Improving and Automating BFV Parameters Selection: An Average-Case Approach", Cryptology ePrint Archives, https://eprint.iacr.org/2023/600, Paper 2023/600, 2023.

Andrea DiGiusto et al, "Breaking the power-of-two barrier: noise estimation for BGV in NTT-friendly rings", Cryptology ePrint Archives, https://eprint.lacr.org/2023/783, Paper 2023/783, 2023.

Daphne Trama et al, "At Last! A Homomorphic AES Evaluation in Less than 30 Seconds by Means of TFHE", Cryptology ePrint Archives, https://eprint.iacr.org/2023/1020, Paper 2023/1020, 2023.

Jeongeun Park et al, "Efficient TFHE Bootstrapping in the Multiparty Setting", IEEE Access, vol. 11, 2023.

Zhou Zhang et al, "ArcEDB: An Arbitrary-Precision Encrypted Database via (Amortized) Modular Homomorphic Encryption", Cryptology ePrint Archives, https://eprint.iacr.org/2024/1064, Paper 2024/1064, 2024.

Heewon Chung et al, "Amortized Large Look-up Table Evaluation with Multivariate Polynomials for Homomorphic Encryption", Cryptology ePrint Archives, https://eprint.iacr.org/2024/274, Paper 2024/274, 2024.

Elena Kirshanova, et al, "Guidance for Efficient Selection of Secure Parameters for Fully Homomorphic Encryption", Cryptology ePrint Archives, https://eprint.iacr.org/2024/1001, Paper 2024/1001, 2024.

Antonio Guimaraes et al, "Amortized bootstrapping revisited: Simpler asymptotically-faster, implemented", Cryptology ePrint Archives, https://eprint.iacr.org/2023/014, Paper 2023/014, 2023.

Arjun Roy et al, "DCT-CryptoNets: Scaling Private Inference in the Frequency Domain", https://arxiv.org/html/2408.15231v2arXiv, Aug. 27, 2024.

Benjamin R. Curtis et al, "Homomorphic Evaluation of LWR-based PRFs and Application to Transciphering", Cryptology ePrint Archives, https://eprint iacr.org/2024/665, Paper 2024/665, 2024.

Kang Hoon Lee et al, "Discretization Error Reduction for High Precision Torus Fully Homomorphic Encryption", Korea University, School of CyberSecurity, Power Point Presentation, 2023.

Shintaro Narisada et al, "GPU Acceleration of High-Precision Homomorphic Computation Utilizing Redundant Representation", Cryptology ePrint Archieves, https://eprint.iacr.org/2023/1467, Paper 2023/1467, 2023.

Luis Montero et al, "Neural Network Training on Encrypted Data with TFHE", https://arxiv.org/html/2401.16136v1, Jan. 29, 2024.

Antonio Guimaraes et al, "Homomorphic evaluation of large lookup tables for inference on human genome data in the cloud", IEEE Xplore, https://ieeexplore.ieee.org/document/9978367, 2022.

Nicolas Bon et al, "Optimized Homomorphic Evaluation of Boolean Functions", IACR Transactions on Cryptographic Hardware and Embedded Systems, ISSN 2569-2925, Vo. 2024, No. 3, pp. 302-341 (2024).

Andreea Alexandru et al, "General Functional Bootstrapping using CKKS", Cryptology ePrint Archives, https://eprint.iacr.org/2024/1623, Paper 2024/1623, 2024.

Mingyu Cho et al, "FRAST: TFHE-Friendly Cipher Based on Random S-Boxes", IACR Transactions on Symmetric Cryptology, ISSN 2519-173X, vol. 2024, No. 3, pp. 1-43, 2024.

Jordan Frery et al, "Privacy-Preserving Tree-Based Inference with TFHE", https://arxiv.org/html/2303.01254v3, Aug. 7, 2023.

Beatrice Biasioli et al, "A Tool for Fast and Secure LWE Parameter Selection: the FHE case", Cryptology ePrint Archives, https://eprint.iacr.org/2024/1895, Paper 2024/1895, 2024.

Louis Tremblay Thibault et al., "Towards Verifiable FHE in Practice, Proving Correct Execution of TFHE's Bootstrapping using plonky2", Cryptology ePrint Archives, https://eprint.iacr.org/2024/451, Paper 2024/451, 2024.

Deokhwa Hong et al., "A New Fine Tuning Method for FHEW/TFHE Bootstrapping with IND-CPAD Security", Cryptology ePrint Archives, https://eprint.iacr.org/2024/1052, Paper 2024/1052, 2024.

Jung Hee Cheon et al., "Tree-based Lookup Table on Batched Encrypted Queries using Homomorphic Encryption", Cryptology ePrint Archives, https://eprint.iacr.org/2024/087, Paper 2024/087, 2024.

Ruida Wang et al, "FHEW-like Leveled Homomorphic Evaluation: Refined Workflow and Polished Building Blocks", Cryptology ePrint Archives, https://eprint.iacr.org/2024/1318, Paper 2024/1318, 2024.

Pierre-Emmanuel Clet et al, "Chocobo: Creating Homomorphic Circuit Operating with Functional Bootstrapping in basis B", Cryptology ePrint Archives, https://eprint.iacr.org/2024/673, Paper 2024/673, 2024.

Daphne Trama et al, "Designing a General-Purpose 8-bit (T)FHE Processor Abstraction", Cryptology ePrint Archives, https://eprint.iacr.org/2024/1201, Paper 2024/1201, 2024.

Shintaro Narisada et al, "Time-Memory Trade-off Algorithms for Homomorphically Evaluating Look-up Table in TFHE", Cryptology ePrint Archives, https://eprint.iacr.org/2024/1114, Paper 2024/1114, 2024.

Kang Hoon Lee et al, "Discretization Error Reduction of High Precision Torus Fully Homomorphic Encryption", Cryptology ePrint Archives, https://eprint.iacr.org/2023/402, Paper 2023/402, 2023.

Pierre-Emmanuel Clet, "Contributions to the optimization of TFHE's functional bootstrapping for the evaluation of non-polynomial operators", HALtheses, https://theses.hal.science/tel-04431993v1, Feb. 1, 2024.

Samuel Tap, "Constructing new tools for efficient homomorphic encryption", HALtheses, https://theses.hal.science/tel-04587370, May 24, 2024.

Vele Tosevski, "Enabling Large-Scale Privacy-Preserving Recurrent Neural Networks with Fully Homomorphic Encryption", University of Toronto, TSpace, https://utoronto.scholaris.ca/bitstreams/8ab99bc1-8c9c-4f78-9018-de18af75b106/download, Nov. 2023.

(56) References Cited

OTHER PUBLICATIONS

Afrin Hossain, "Torus-based Fully Homomorphic Encryption in Federated Learning", Aalto University School of Science, https://aaltodoc.aalto.fi/bitstreams/85d4ee02-ba79-4ad0-986f-8dc90ec86af0/download, Masters Thesis, 2023.
Thibault Balenbois et al, "Trivial Transcipering With Trivium and TFHE", Cryptology ePrint Archives, https://eprint.iacr.org/2023/980, Paper 2023/980, 2023.
Seungjin HA et al, "A study on the Optimisation of the TFHE Parameters", Korea Science, Annual Conference of KIPS, https://koreascience.kr/article/CFKO202422572279859.page?vJhi6srpW=F2sf2S&lang=en, 2024.
Loris Bergerat et al, "Parameter Optimization and Larger Precision for (T)FHE", Cryptology ePrint Archives, https://eprint.iacr.org/2022/704, Paper 2022/704, 2022.
Search Report, CN Application 202380042317.9, May 24, 2022.
Office Action, CN Application 202380042317.9, May 10, 2025.
Pierre-Emmanuel Clet et al; "Putting up the swiss army knife of homomorphic calculations by means of TFHE functional bootstrapping", Cryptology ePrint Archives, https://eprint.iacr.org/2022/149, Paper 2022/149, 2022.
Shan Wang, Thesis for Master's Degree, Research on Medical Data Privacy, Protection application Based on Homomorphic Encryption, Shenyang Aerospace University, CNKI, Apr. 2020.
International Search Report and Written Opinion of the ISA for PCT/EP2023/063893, mailed Aug. 7, 2023, 9 pages.
Pierre-Emmanuel Clet et al., "Putting up the Swiss army knife of homomorphic calculations by means of TFHE functional bootstrapping", IACR, International Association for Cryptologic Research, vol. 20220212:064555, Feb. 9, 2022, 30 pages.
Ilaria Chillotti et al., "Improved Programmable Bootstrapping with Larger Precision and Efficient Arithmetic Circuits for TFHE", IACR, International Association for Cryptologic Research, vol. 20210602:115148, May 31, 2021, 63 pages.
Coron Jean-Sébastien et al., "Fully Homomorphic Encryption over the Integers with Shorter Public Keys", Aug. 14, 2011, SAT 2015 18th International Conference, Austin, TX, USA, Sep. 24-27, 2015, [Lecture Notes in Computer Science; Lect.Notes Computer], Springer, Berlin, Heidelberg, 18 Pages.
Chillotti et al., "Programmable bootstrapping enables efficient homomorphic inference of deep neural networks", Cyber Security Cryptography and Machine Learning (CSCML 2021), vol. 12716 of Lecture Notes in Computer Science, Springer, 2021, 19 pages.
C. Bonte et al., "FINAL: Faster FHE instantiated with NTRU and LWE", Cryptology ePrint Archive, Paper 2022/07, 24 pages.
K. Kluczniak, "NTRU-v-um: Secure Fully Homomorphic Encryption from NTRU with Small Modulus", Cryptology ePrint Archive, Paper 2022/089, 30 pages.
Ron Rothblum, "Homomorphic Encryption: from Private-Key to Public-Key", Theory of Cryptography (TCC 2011), vol. 6597 of Lecture Notes in Computer Science, Springer, 2011, 16 pages.
L. Ducas et al., "FHEW: bootstrapping homomorphic encryption in less than a second", proceedings Eurocrypt 2015, 24 pages.
I. Chillotti et al., "Faster fully homomorphic encryption: Bootstrapping in less than 0.1 seconds", proceedings Asiacrypt 2016, 31 pages.
I. Chillotti et al., "Faster packed homomorphic operations and efficient circuit bootstrapping for TFHE", proceedings Asiacrypt 2017, 31 pages.
C. Boura et al., "Chimera: Combining Ring-LWE-based Fully Homomorphic Encryption Schemes", J. Math. Cryptol., 14(1):316-338, 2020, 23 pages.
M. Albrecht et al., "On the concrete hardness of Learning with Errors", 10.1, Journal of Mathematical Cryptology, 9 (3):169-203, 2015, 42 pages.
M. Albrecht et al., "On the concrete hardness of Learning with Errors", 10.2, Journal of Mathematical Cryptology, 9 (3):169-203, 2015, 35 pages.
A. Guimarães et al., "Revisiting the functional bootstrap in TFHE", IACR Trans. Cryptogr. Hardw. Embed. Syst., ISSN 2569-2925, vol. 2021, No. 2, 25 pages.
H. Chen et al., "Onion ring ORAM: efficient constant bandwidth oblivious RAM from (leveled) TFHE", proceedings CCS 2019, 16 pages.
Kamil Kluczniak et al., "FDFB: Full Domain Functional Bootstrapping Towards Practical Fully Homomorphic Encryption", 22 pages.
Japanese Office Action dated Jul. 7, 2012 in corresponding Japanese Application No. 2024-569310.
Kluczniak et al., "FDFB: Full Domain Functional Bootstrapping Towards Practical Fully Homomorphic Encryption", 22 pages.
Chillotti, et al., "Programmable Bootstrapping Enables Efficient Homomorphic Inference of Deep Neural Networks", Published in S, Dolev et al., Eds., Cyber Security Cryptography and Machine Learning (CSCML 2021), vol. 12716 of Lecture Notes in Computer Science, pp. 1-19, Springer, 2021.
Viand et al., "Fully Homomorphic Encryption Compilers"., arXiv:2101.07078c1 [cs.CR], Jan. 18, 2021, 17 pages.
Joye, Guide to Fully Homomorphic Encryption over the [Discretized] Torus, Zama, France, Version 2.6, Oct. 14, 2021, 39 pages.

* cited by examiner

COMPUTATION ON ENCODED-AND-ENCRYPTED VALUES

CROSS-REFERENCE TO RELATED APPLICATIONS

This application is the U.S. national phase of International Application No. PCT/EP2023/063893 filed May 24, 2023 which designated the U.S. and claims priority to EP 22315114.3 filed May 24, 2022, the entire contents of each of which are hereby incorporated by reference.

TECHNICAL FIELD

The presently disclosed subject matter relates to a cryptographic method of performing an encrypted computation, to a corresponding device, to a compiler method and device for the encrypted computation, and to a computer readable medium.

BACKGROUND

Homomorphic cryptography allows one to perform encrypted computations: computations, e.g., circuit evaluations, that are performed over encrypted data by a party without that party being able to decrypt. For example, input data and computation results may be received and returned in encrypted form. Intermediate data, e.g., an internal state of the computation, may also be in encrypted form.

Even though the result of the computation is returned in an encrypted form, when decrypted the output is expected to be the same, or very close to, as if the operations had been performed on the unencrypted data. Homomorphic encryption can be used for privacy-preserving outsourced storage and computation. This allows data to be encrypted and outsourced to a cloud environment for processing and/or storage, all while encrypted.

For example, homomorphic cryptography may be applied in fields such as health care in which privacy regulations may make it difficult to share plain data, but computations on encrypted medical data may be allowable. For example, a medical model developed, say, to classify medical data may be configured to receive medical data from a third party, say a hospital, in encrypted form. The medical model might, e.g., classify medical data, e.g., as normal or abnormal, or as having some particular medical syndrome, disease, or other disorder. Using homomorphic encryption, the medical model may be applied to medical data that is received in encrypted form. This means that the party that offers the medical model does not have access to the plain medical data that corresponds to the encrypted medical data. The user of the service can decrypt the result of the medical model application.

In particular, homomorphic cryptography techniques exist that can be used, at least in principle, to compute any function on encrypted data. Such techniques are referred to as "fully homomorphic encryption" (FHE) techniques.

Known implementations of FHE use noisy ciphertexts for security reasons. For example, encryption of a data item may comprise mapping the data item to a point in a key-dependent lattice, to which noise is added. In particular, many known implementations of FHE use LWE-type ciphertexts, whose security depends on the cryptographic hardness of the Learning With Errors problem. Such an LWE-type ciphertext may comprise one or more mask values (e.g., values modulo a certain modulus q, or torus elements), plus a body value which is derived from the mask values and from a plaintext using an encryption key, and which contains the noise. A generalization of this is a GLWE-type ciphertext, that encrypts and uses polynomials instead of scalar values. A RLWE-type ciphertext is another type of GLWE ciphertext. Other known implementations of FHE use NTRU-type ciphertexts, for which the same considerations largely apply.

When a data item has just been encrypted the noise is low—the encryption is fresh. For example, the amount of noise is so low, that if a data item were to be decrypted, the noise can be removed at some point in the decryption process, e.g., by rounding. On the other hand, the noise should be high enough to make attacks on the system sufficiently hard. For example, in the hypothetical absence of noise, many homomorphic encryption schemes could be attacked with linear algebra, or other efficient algorithms, e.g., lattice reduction algorithms. When a data item is encrypted, noise is added that is chosen so that attacks are hard while homomorphic operations can still be performed and decryption is still possible.

Most homomorphic operations increase the noise that is inherent in a homomorphically encrypted data item. When many such operations are performed, the noise may reach a level such that unique decryption is no longer possible. Generally, it is known to use a technique called bootstrapping to reduce the noise of a homomorphically encrypted value. Bootstrapping may use a public key called a bootstrapping key. By using bootstrapping to reducing noise when needed, in principle it is possible to compute any desired number of homomorphic operations.

A particular class of fully homomorphic encryption schemes are the TFHE-like homomorphic encryption schemes. Such a scheme is described in I. Chillotti et al., "Programmable bootstrapping enables efficient homomorphic inference of deep neural networks", *Cyber Security Cryptography and Machine Learning* (*CSCML* 2021), vol. 12716 of Lecture Notes in Computer Science, pp. 1-19, Springer, 2021 (incorporated herein by reference). TFHE-like schemes differentiate themselves from other FHE schemes by supporting a comparatively very efficient technique for bootstrapping; in addition, they enable at the same time to evaluate a function during the bootstrap operation, referred to as programmable bootstrapping. The regular bootstrapping corresponds to a programmable bootstrapping with the identity function.

Other known implementations of TFHE-like schemes use NTRU-type ciphertexts, for which the same considerations largely apply. In particular, NTRU may be used in combination with the provided techniques by using a blind rotation that results in an NTRU-encrypted polynomial product of a test polynomial and a bootstrapping monomial, and/or by applying a blind rotation to an NTRU ciphertext as input. Examples of suitable NTRU encryptions are defined in C. Bonte et al., "FINAL: Faster FHE instantiated with NTRU and LWE", Cryptology ePrint Archive, Paper 2022/07; and K. Kluczniak, "NTRU-v-um: Secure Fully Homomorphic Encryption from NTRU with Small Modulus", Cryptology ePrint Archive, Paper 2022/089.

Interestingly, the output of the programmable bootstrapping has an amount of noise that is independent of the noise in the input ciphertext. Thus, by performing the programmable bootstrapping, the noise in the input ciphertext can be reduced to a fixed amount, while possibly at the same time applying a function to the input ciphertext. By performing the programmable bootstrapping at appropriate times, it is possible to perform encrypted computations of unlimited multiplicative complexity.

Despite the power of the PBS operation, it is still challenging today to efficiently perform arithmetic operations (e.g., multiplication) on relatively large values, e.g., values defined modulo a modulus that is larger than 256 or larger than 1024. One reason for this is that the PBS scales worse than linear in the size of the inputs.

In the paper "Putting up the Swiss army knife of homomorphic calculations by means of TFHE functional bootstrapping" by P. Clet et al., Cryptology ePrint Archive, Report 2022/149, techniques are proposed to perform multiplications and additions over ciphertexts building on a digit-decomposition approach. This means that a value is encoded-and-encrypted by encrypting the elements of a radix decomposition of the value modulo a base β. In this article the authors propose an addition that uses two or more programmable bootstrappings for each ciphertext encrypting an element of the decomposition. The addition is performed in a sequential way. Multiplication is performed based on a schoolbook multiplication approach. Despite these developments, further improvements in cryptographic computation on large encrypted values are still needed.

SUMMARY

The inventors noted a number of disadvantages in existing approaches.

Some existing approaches have a small precision for integer plaintexts with TFHE: when using a single ciphertext to encrypt an integer, it in practice is not feasible nowadays to perform arithmetic operations such as multiplication on ciphertext with more than 7 bits of plaintext.

Existing approaches also lack in efficiency. Approaches based on converting a computation into a Boolean circuit and then evaluating the circuit via gate bootstrapping, have a significant slowdown in practice in the case where plaintexts are not Boolean. Also existing approaches that rely on encoding values using small integers (e.g., of 1 or 2 bits) are slow since operations on these small integers are typically constructed using a PBS, or followed by one, so that a lot of costly PBSes are needed.

Another disadvantage of existing approaches is their lack of parallelizability. For instance, when integers are encoded by means of a radix decomposition, performing an addition or multiplication may involve carry propagation along the MSB of the homomorphic integers, which is a sequential process. This implies a slowdown during homomorphic circuit evaluation when parallelization is possible.

A further disadvantage is a lack of flexibility. Existing implementations of arithmetic operations, for example an addition or multiplication with carry propagation, do not allow to flexibly adapt the way the arithmetic operations take place depending on the size of the inputs and thereby optimize performance for the use case at hand.

It is a goal of the invention to address at least some of these problems.

According to one aspect of the invention, a cryptographic computation method of performing an encrypted computation is provided, as defined by the claims. According to a further aspect, a device corresponding to the computer-implemented method is provided, as defined by the claims. According to another aspect, a computer-readable medium is provided as defined by the claims.

Various aspects relate to performing an encrypted computation on a set of one or more encoded-and-encrypted values. The values may be numeric values, e.g., values defined modulo a certain overall modulus q. Such values modulo a modulus q may be interpreted e.g. as unsigned integers (e.g., from the domain [0, q)); as signed integers (e.g., [−q/2, q/2)); as fixed-point numbers, etcetera.

Such an encoded-and-encrypted value may be encoded-and-encrypted as encryptions of multiple respective subvalues, also referred to herein as "blocks". As an example, the value and subvalues may relate to each other according to a radix decomposition according to a fixed basis β. Several other ways in which the value and subvalues can relate are also possible, as discussed in more detail elsewhere.

In an embodiment, the encryptions of the subvalues are LWE encryptions. In an embodiment, the encryptions of the subvalues are NTRU encryptions.

The encrypted computation may comprise applying one or more encrypted operations on the set of encoded-and-encrypted values, for example, arithmetic operations such as addition and/or multiplication; function applications such as applying a ReLU, sign, exponential, or other univariate function; and/or other numeric operations. Such an encrypted operation may in general take one or more encoded-and-encrypted input values (and optionally, additional inputs as well, e.g., further encrypted or non-encrypted values) as input, and may result in one or more encoded-and-encrypted output values. Interestingly, the operations are performed in an encrypted way in the sense that they do not leak information about the input and/or output values, in particular, the input values are not decrypted in order to perform the operations.

Interestingly, the inventors envisaged to use an encoding of an encoded-and-encrypted value into encrypted subvalues that are allowed to hold carry. A subvalue may have an associated message modulus, but also a carry-message modulus that is larger than the message modulus. For example, the subvalues may be defined according to a radix decomposition with a radix, and so also message modulus, of 8, but may be encrypted as values modulo a carry-message modulus of 64. Accordingly, a value may be encoded-and-encrypted without carry, meaning that the subvalues are non-carry subvalues that are smaller than the corresponding message moduli; but a value can also be encoded-and-encrypted with carry, meaning that at least one subvalue is a with-carry subvalue that is larger than or equal to the corresponding message modulus.

A value encoded-and-encrypted with carry may correspond to its subvalues according to a relation between the value and non-carry subvalues and according to a corresponding carry-reduction operation, e.g., according to a radix decomposition with a message modulo β and according to a carry-reduction that carry-reduces a subvalue m to m mod β and propagates carry ⌊m/β⌋ to the next most significant value.

The inventors realized that with-carry subvalues may be used not just within an encrypted operation, but also as inputs or outputs of an encrypted operation. An encrypted operation (e.g., an addition, multiplication, another arithmetic operation, or a univariate function evaluation) may be applied to at least one input value encoded-and-encrypted with carry, and may result in at least one output value encoded-and-encrypted with carry.

In some cases, an encrypted carry-reduction may be applied to the output value, in which at least one with-carry subvalue may be reduced to a non-carry subvalue. In other cases, however, the output value may not be carry-reduced and may be input with carry into a further encrypted operation (e.g., a further addition, multiplication, or other arithmetic operation). In any case, if needed, the encrypted carry-reduction can be applied during an encrypted operation e.g. to intermediate subvalues. Generally, the encrypted carry-reduction may be applied in order to guarantee that a following encrypted operation does not result in a subvalue exceeding the carry-message modulus.

By allowing values that are encoded-and-encrypted with carry as inputs and/or outputs of encrypted operations, and by optionally performing carry-reductions that in some cases do not carry-reduce all of the with-carry subvalues of an encoded-encrypted value, efficiency of the encrypted computation can be greatly improved, for a number of reasons detailed below. In general, the provided techniques make it possible to efficiently perform encrypted computations, e.g., to evaluate arithmetic circuits, on values that are encoded-and-encrypted into multiple subvalues. By selectively performing encrypted carry-reductions on selected subvalues, configurable encrypted computation techniques are provided that allow to optimize the execution in terms of computation, either prior to the execution or on the fly.

In particular, by using multiple subvalues, a lack of precision of some existing approaches is remedied. This enables to perform encrypted computations on values defined modulo relatively large moduli, examples of which are given later.

By selective carry-reduction, the number of carry-reductions operations that are needed can be greatly reduced; for example, compared to existing approaches, an encrypted computation can be performed with a much smaller number of programmable bootstrapping applications, thereby greatly improving efficiency. For example, multiple additions, or other linear operations, or even multiplications of encrypted values may be performed without performing a carry-reduction in between. Various parameters, including the message moduli, the carry-message moduli, and the encoding into subvalues of a plaintext during encryption, can be varied. This offers the possibility to optimize the homomorphic evaluation for a given encrypted computation, improving flexibility and performance.

Moreover, the provided techniques provide improved parallelizability. Because outputs of operations can have carry, it is possible to avoid carry reduction in between steps, and thus to perform one or a sequence of encrypted operations in parallel on respective subvalues. For example, when using an encoding based on radix decomposition, addition can be performed separately on respective subvalues. When using an encoding based on a residue number system, also multiplication and carry reduction can be parallelized. Thereby performance is improved especially on multi-threaded and multi-core systems.

Specifically, the above-cited paper "Putting up the Swiss army knife of homomorphic calculations by means of TFHE functional bootstrapping" proposes an addition that is sequential and that uses at least 2 PBS per ciphertext encrypting an element of the decomposition. In comparison, the provided techniques allow to implement addition using only one PBS per ciphertext and only when a carry reduction for that ciphertext is needed; and the addition can be fully parallelized if no carry reduction is needed. Also compared to their proposed multiplication, the provided techniques are more efficient and can be better parallelized.

In general, the encrypted computation may be performed in the TFHE setting. This means that the ciphertexts that are used to encrypt the subvalues allow a programmable bootstrapping operation. In particular, the ciphertexts may be LWE (Learning With Errors) encryptions, that is, encryptions based on the cryptographic assumption that the Learning With Errors problem is hard. As is known per se, the programmable bootstrapping may evaluate a LWE decryption in an exponent of a GLWE-encrypted monomial, e.g., implemented as a so-called blind rotation. In particular, the programmable bootstrapping may involve computing an encrypted polynomial product of a bootstrapping monomial representing the plaintext value as an exponent, and a test polynomial. The test polynomial may represent a function being applied to the input by the programmable bootstrapping. The programmable bootstrapping may use a bootstrapping key that enables to perform the programmable bootstrapping but not the decryption of ciphertexts. The encrypted carry-reduction and/or one or more encrypted operations of the encrypted computation may be implemented using the programmable bootstrapping operation.

Instead of using LWE/GLWE-type ciphertexts, it is also possible to use different lattice encryptions. For example, the ciphertext to which the blind rotation is applied, and/or the encrypted polynomial product that results from it, may be NTRU ciphertexts. For example, a NTRU encryption of a message $\mu$ may be defined by adding a quotient of a noise polynomial g and a private key polynomial f to the message, e.g., $f \in \mathbb{Z}_{N,q}[X]$ may be an invertible polynomial (typically with small coefficients); and the NTRU encryption may be given by $c = g/f + \mu \in \mathbb{Z}_{N,q}[X]$, or, writing $g = e_1 + f \cdot e_2$, by $c = e_1/f + \mu + e_2$. In particular, an NTRU ciphertext may comprise only a single polynomial. Security of such ciphertexts may be based on the NTRU assumption.

In an embodiment, the ciphertext to which the blind rotation is applied, may be an LWE-type ciphertext. For example, the blind rotation may be part of an encrypted computation being carried out on LWE-type ciphertexts (e.g., without involving any NTRU-type ciphertexts). Or, the LWE-type ciphertext may be obtained by conversion from an NTRU-type ciphertext, e.g., as part of an encrypted computation that is carried out on NTRU-type ciphertexts. It is also possible to apply the blind rotation directly to a NTRU-type ciphertext without conversion to LWE. More generally, the ciphertext may be a lattice-type ciphertext whose security depends on the cryptographic hardness of a lattice problem, of which LWE and NTRU are two examples.

In an embodiment, the output value may be computed by performing multiple encrypted operations on a set of encoded-and-encrypted values, where the encrypted operations are performed without performing any encrypted carry-reduction in between or during the encrypted operations. For example, the encrypted operations may comprise multiple additions and/or multiple multiplications. For example, performing the encrypted computation may comprise evaluating an arithmetic circuit comprising the encrypted operations. The arithmetic circuit may have a multiplicative depth of at least two (meaning that an output of one multiplication is used directly or indirectly as an input to another multiplication) or at least three, for example. By allowing carry, such computations may in some cases be performed without a carry reduction in between, or in any case using fewer carry reductions, thereby providing a significant performance improvement.

In an embodiment, the encrypted operation may be applied by applying respective sub-operations separately to the respective encryptions of the subvalues of the input value. In particular, performing the encrypted operation may consist only of performing these sub-operations. This may be the case for example for linear operations, or for multiplications when using a residue number system representation. In an embodiment separately applied encrypted operations may be performed at least in part in parallel, which is advantageous for performance, especially for multi-threaded and multi-core systems.

In an embodiment, an encoding of a value as non-carry subvalues is based on a radix decomposition of the value. In other words, the value encoded by a set of with-carry and non-carry subvalues may be computable by carry-reducing the with-carry subvalues and reconstructing the value from the radix decomposition. The radix decomposition may be with respect to a base of respective basis elements, with respective message moduli corresponding to the respective basis elements. An encoding using radix decomposition allows various parts of the encrypted computation to be performed relatively efficiently, in particular arithmetic operations such as addition and/or multiplication and/or division; comparison operations such to determine which of two value is greater, etc.; and also carry-reduction The basis elements may define an overall modulus corresponding to the product of the respective basis elements. Accordingly, a radix decomposition with a given basis may be used to encode a value modulo that overall modulus. It is also possible to use a basis in combination with a modulus smaller than the product of the basis elements as also described elsewhere in in this specification.

The basis elements may all be the same, e.g., may all be equal to 2 for a basis-2 radix decomposition or may all be equal to 5 for a basis-5 radix decomposition. Interestingly, however, this is not needed. In some embodiments, the basis elements of the radix decomposition are not all the same. This provides much greater flexibility in selecting the basis elements according to the size requirements of the application at hand, thereby reducing the overhead of using moduli that are larger than necessary. In particular, the basis elements need not all be the same power or two or need not all be powers of two at all. The inventors realized that encrypted computation techniques, in particular in the TFHE setting, can be applied in such more general settings as well.

In an embodiment, the encrypted carry-reduction in the radix decomposition setting may be performed decomposing a with-carry subvalue of the output value into encryptions of respective subvalues of the subvalue, and adding the encryptions of the subvalues of the subvalue to encryptions of corresponding subvalues of the output value. This way, the with-carry subvalue may be reduced to a value below the message modulus. By repeating this process for respective with-carry subvalues, an encoding-and-encryption of the value without carry may be obtained.

In an embodiment, an encrypted multiplication of an encoded-and-encrypted value by a non-encrypted scalar may be performed. This encrypted multiplication may be implemented by computing respective encrypted subvalues of a multiplication of a subvalue of the encoded-and-encrypted value by the scalar, for example, using a programmable bootstrapping. In case a radix decomposition encoding is used, the results of the encrypted multiplications may be combined to obtain the overall result. This way, multiplication with relatively large scalars can be performed. It is also possible, e.g., for smaller scalars, to directly multiply respective encrypted subvalues with the scalar itself to obtain the respective encrypted output subvalues. In case a residue number system encoding is used, the respective products for the respective subvalues may form the overall result.

In an embodiment, an encrypted multiplication of a first encoded-and-encrypted value and a second encoded-and-encrypted value may be performed by performing encrypted multiplications of encryptions of subvalues of the first and second encoded-and-encrypted values. In the radix decomposition setting, the encrypted multiplication of encryptions of subvalues may result in an encoded-and-encrypted value. These encoded-and-encrypted values may be summed together to obtain the overall result. During the multiplication, carry reductions may be performed as needed, e.g., as dictated by a computed degree of fullness as described herein. Interestingly, a particularly efficient multiplication of large encrypted values is achieved in this way.

In an embodiment, the value that is encoded-and-encrypted using the radix decomposition encoding, is defined modulo a modulus that is smaller than the maximum value representable by the radix decomposition, e.g., the product of basis elements. This way, the number of situations in which the radix decomposition encoding can be used, is greatly improved. For efficiency, the radix decomposition encoding preferably uses small basis elements, in which case the maximum representable value is a product of such small basis elements. Interestingly, the inventors realized that, in cases where a computation is desired modulo a modulus that is not a product of small basis elements, the radix decomposition encoding can still be used. Various encrypted operations can be performed as if working modulo the product of basis elements, except that the encrypted carry-reduction of the most significant sub-message can be adapted by correcting the carry reduction according to the desired modulus. For example, the correction may be performed by multiplying the most significant subvalue by a scalar and subtracting the result from the value from which the most significant subvalue has been removed.

In an embodiment, an encoding of a value as non-carry subvalues is based on a residue number system representation of the value. Such a representation is also known as a CRT (Chinese Remainder Theorem) representation. The representation may be based on a set of mutually coprime basis elements. For example, respective subvalues of the encoded-and-encrypted value may have message moduli corresponding to the basis elements.

In particular, a value encoded-and-encrypted with carry may correspond to its subvalues according to a CRT decomposition with respective message moduli $\beta_i$ and according to a carry-reduction that modulo-reduces respective subvalue $m_i$ to $m_i \bmod \beta_i$.

Similarly to the radix representation, linear arithmetic operations may be implemented efficiently using the CRT representation. Interestingly, the CRT representation may also allow particularly efficient multiplication and carry reduction, both of which can moreover be performed separately to respective subvalues and are therefore parallelizable. Also various other kinds of operations, such as applying a univariate function, are possible using the CRT representation.

In an embodiment, the encoding of a value as non-carry subvalues may be based on a residue number system representation, and based further on a radix decomposition of an element of the residue number system representation. This approach is referred to herein as the "hybrid" approach. For example, one, multiple, or all elements of the residue number system may be radix decomposed according to respective (different or equal) bases. Using the hybrid approach, it is possible to use the CRT approach efficiently with relatively large CRT basis elements.

In an embodiment, when using a radix decomposition to encode an element of the residue number system representation, the modulus with respect to which this element is defined (namely, the corresponding basis element of the CRT basis), may be smaller than the maximum value representable by the radix decomposition. As also described for the radix decomposition in general, the radix decomposition can still be used in such cases, enabling it to be used in a wider range of cases. This combination is particularly beneficial because it allows to better combine the *desiderata* of having basis elements of the CRT that are mutually coprime and having a radix decomposition that uses small basis elements.

Several advantages of using the CRT representation, in particular efficient and parallelizable encrypted linear and multiplication operations, also apply if no carry is used for the inputs and outputs of encrypted operations, e.g., if an encrypted carry-reduction is just used inside the encrypted operations; if an encrypted carry-reduction is used directly after each encrypted operation so that it results in outputs without carry; or if the encrypted operations do not involve any carry at all, e.g., if they are implemented using programmable bootstrappings without the use of carry. Also an encrypted computation method that uses the CRT but that does not involve encrypted operations being applied to values encrypted-and-encoded without carry, is envisaged.

In particular, an encrypted computation method is envisaged comprising: accessing one or more encoded-and-encrypted values, wherein an encoding of a value as non-carry subvalues is based on a residue number system representation of the value; and applying an encrypted operation to at least an input value encoded-and-encrypted to obtain an encoded-and-encrypted output value. A cryptographic device corresponding to this method is envisaged as well.

In an embodiment, performing an encrypted computation with carry may comprise keeping track of degrees of fullness of subvalues of the encoded-and-encrypted values. A degree of fullness may indicate a bound on the subvalue, e.g., expressed as a maximum value that the subvalue is known to have, or a proportion of the maximum value with respect to the carry-message modulus. For example, for a value encoded-and-encrypted without carry, the degrees of fullness may indicate that its subvalues are smaller than the corresponding message moduli. For a value encoded-and-encrypted with carry, the degrees of fullness may indicate that at least one of its subvalues may be greater than or equal to the corresponding message modulus, in other words, is not guaranteed to be smaller than the message modulus.

During and/or in between encrypted operations, the degree of fullness may be used to determine whether or not to perform an encrypted carry-reduction on an encrypted subvalue. In particular, a degree of fullness may be determined for a with-carry subvalue that is to be computed in an encrypted operation from one or more input encrypted subvalues. If the bound indicated by the degree of fullness exceeds the corresponding carry-message modulus, the encrypted carry-reduction may be applied to one or more of the input encrypted subvalues prior to computing the with-carry subvalue, such that the bound on the with-carry subvalue no longer exceeds the carry-message modulus. Accordingly, an overflow of the subvalue may be avoided.

Interestingly, by keeping track of the degree of fullness during the encrypted computation, a flexible way of performing the encrypted computation may be obtained in which it can be adaptively decided whether or not to perform the encrypted carry-reduction. Accordingly, the decision can depend on the inputs at hand, e.g., on a public scalar used in the computation, on bound(s) on encrypted inputs provided by an inputter, on fullness degrees in a particular iteration of an iterative algorithm, etc. This generally leads to a more efficient execution of the encrypted computation. It also makes it easier to specify an encrypted computation since explicit specification of when to perform a carry reduction is not needed. This may make the provided techniques particularly well suited to non-experts in encrypted computation.

For example, the encrypted computation may be executed in such a way that in a first execution, an encrypted carry-reduction of a certain encrypted subvalue takes place whereas in the second execution, this encrypted carry-reduction is avoided. Also operations of the encrypted computation that are performed multiple times may or may not comprise encrypted carry-reductions depending on the degrees of fullness of their inputs. For example, an encrypted multiplication or other encrypted operation may comprise an encrypted carry-reduction on an encrypted subvalue computed during the operation in a first execution of the multiplication but not in a second.

According to further aspects of the invention, a compiler method and device are provided as defined by the claims. As the inventors realized, it is not needed to keep track of the degree of fullness during the encrypted computation. Many of the advantages of the use of a degree of fullness can also be attained if the degree of fullness is computed as part of a compiler method of compiling a computation into a homomorphic executable. Namely, this homomorphic executable may enable to efficiently perform the encrypted computation in particular by performing encrypted carry-reduction operations only when needed. The homomorphic executable may be executable by an encrypted computation engine and causes the encrypted computation engine to perform an encrypted computation on a set of one or more encoded-and-encrypted values as described herein. The homomorphic executable may comprise one or more instructions to perform the encrypted carry-reduction operation as described herein, e.g., as part of an encrypted operation or in between the execution of encrypted operations. The compiler method may comprise, for a with-carry subvalue that is to be computed, determining a degree of fullness indicating a bound on the with-carry subvalue; and, if the bound exceeds the corresponding carry-message modulus, generating an instruction that causes the encrypted computation engine to apply the encrypted carry-reduction prior to computing said with-carry subvalue. The compiler method may also comprise optimizing one or more parameters of the encrypted computation, such as number and values for the message and carry-message moduli, for the encrypted computation being compiled into an executable.

In an embodiment, a or each message modulus is not a power of two. Although existing techniques for encrypted computation, in particular in the TFHE setting, generally use powers of two for their moduli, the inventors realized that this is not needed and that the provided techniques can also be used when one or more of the message moduli are not powers of two. Instead or in addition, in an embodiment, one or more of the carry-message moduli are not powers of two. This allows to better adjust the operations to the situation at hand, e.g., to perform the computation on values defined modulo a modulus that matches the computation and ranges for the input values at hand.

In an embodiment, a message modulus is at least 3 and/or at least 5 and/or at least 10. Using larger values for the message modulus has the advantage of having a higher degree of precision for a single ciphertext, so that less ciphertexts are needed to represent a value. Also computations, in particular those not involving carry reduction, may be more efficient.

In an embodiment, a carry-message modulus may be at least four times as large as a corresponding message modulus, at least eight times, or at least thirty-two times. Accordingly, expressed in bits, effectively, at least two, at least three, or at least 5 carry buts may be provided. By using a carry-message modulus that is significantly larger than the message modulus, the number of operations, or substeps of operations, that can be performed before a carry-reduction is needed, is increased, increasing efficiency.

In an embodiment, a or each carry-message modulus is at most 128, at most 256, or at most 512. Efficiency of operations such as carry-reduction, e.g., using programmable bootstrapping, typically scales worse than linear in the size of the carry-message modulus. By keeping the carry-message modulus limited, the computational costs of such operations are kept limited.

In an embodiment, the modulus over which the encrypted values are defined is at least 1024, at least 4096, or at least 16384. Interestingly, despite the use of such large moduli, the provided techniques still allow relatively efficient computations on them.

In an embodiment, a function evaluation may be applied on a one or more encoded-and-encrypted value by extracting one or more bits from one or more subvalues of the encoded-and-encrypted value(s); converting the extracted bits to GGSW ciphertexts; and applying a lookup table to the GGSW ciphertexts. As explained in more detail elsewhere, this is a particularly efficient way of implementing a function especially for relatively large values, e.g., values for which the message and/or carry message modulus and/or the number of subvalues is relatively large.

In an embodiment, the encrypted computation may at some point comprise an evaluation of a multivariate function (e.g., a bivariate function) on multiple encrypted input values, e.g., subvalues. An important example of a multivariate function is an encrypted multiplication of encryptions of first and second subvalues, e.g., of the same encoded-and-encrypted value or of different ones. For example, such an encrypted multiplication may arise as part of an encrypted multiplication of encoded-and-encrypted values, or of a different type of encrypted operation. In any case, multivariate function evaluation may be performed by determining a combined encryption that represents the respective encrypted input values; and by applying a univariate function to the combined encryption that corresponds to applying the multivariate function to the respective input values, e.g., by applying a programmable bootstrapping to the combined encryption.

This is a particularly efficient way of performing multivariate function evaluation that also combines well with determining a degree of fullness and with using carry. In particular, when the input values are encrypted with carry, there may indeed be enough room in the plaintext space to store the combined encryption; where encrypted carry-reduction may be performed if needed to ensure that the combined encryption does not overflow the carry-message modulus.

The provided techniques for improved computations on encrypted data may be applied in a wide range of practical applications. Such practical applications include the encrypted evaluation of software programs without having access to plain data. For example, one may evaluate medical diagnostic software on medical data without having actual access to said medical data. Medical data may comprise a medical image. A medical image may comprise, e.g., multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

In an embodiment, the provided techniques may be used to evaluate a neural network on encrypted inputs. The party evaluating the neural network may or may not have plaintext access to the trained parameters of the neural network, e.g., weights and biases. In general, the techniques provided herein, e.g., the improved polynomial multiplication, programmable bootstrapping, and external product, improve the efficiency of evaluating the neural network and/or reduce storage and transmission requirements for the used ciphertexts or key material.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1*a* schematically shows an example of an embodiment of a cryptographic device.

DESCRIPTION OF EMBODIMENTS

Figure 1A:
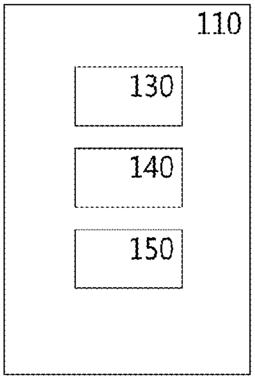
FIG. 1*b* schematically shows an example of an embodiment of a compiler device.
FIG. 1*c* schematically shows an example of an embodiment of an encrypted computation system.

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the subject matter that is presently disclosed is not limited to the embodiments only, but also includes every other combination of features described herein or recited in mutually different dependent claims.

First, some general information and notation is provided that applies to several embodiments. Throughout this specification, the parameter q represents the modulus for encoded-and-encrypted values, e.g., a positive integer. $\mathbb{Z}_q$ denotes the ring $\mathbb{Z}/q\mathbb{Z}$. The parameter N represents the size of various polynomials that are used and is typically a power of two. $\mathfrak{R}$ denotes the ring $\mathbb{Z}[X]/(X^N+1)$ and $\mathfrak{R}_q$ denotes the ring $\mathbb{Z}_q[X]/(X^N+1)$. $\chi_\sigma$ denotes a Gaussian distribution with a mean set to zero and a standard deviation set to σ. The symbol ‖ denotes concatenation. The most (resp. least) significant bits of an integer are referred to as MSB (resp. LSB). A look-up tables is abbreviated LUT.

$$\mathbb{C}_{Alg}^{p_1,\ldots,p_n}$$

denotes (computational) complexity of an algorithm Alg, potentially dependent on some parameters $p_1, \ldots, p_n$.

The Chinese Remainder Theorem (CRT) states the following. Let R be a ring, and let $I_0, I_1, \ldots, I_n$ mutually coprime ideals in R for some $n \in \mathbb{N}$. Then, the following ring isomorphism exists:

$$R \cong R/I_0 \times R/I_1 \times \ldots \times R/I_n$$

In this specification, CRT denotes the morphism from R to $R/I_0 \times R/I_1 \times \ldots \times R/I_n$. The inverse CRT, denoted ICRT, maps $R/I_0 \times R/I_1 \times \ldots \times R/I_n$ to R.

Various embodiments use LWE (Learning With Errors) encryption. Generally, an LWE-type ciphertext may comprise one or more mask values and a body value which is derived from the mask values and the plaintext value. The values are typically integers modulo a given modulus q. Various embodiments also use GLWE (Generalized Learning With Error)-type ciphertexts. A GLWE-type ciphertext may comprise one or more mask polynomials, and a body polynomial which is derived from the mask polynomials and a plaintext polynomial. A GLWE-type ciphertext may be defined modulo a modulus q and a quotient polynomial p(X). A LWE ciphertext may be regarded as a particular kind of GLWE ciphertext where the quotient polynomial has degree one. Another particular kind of ciphertext is a RLWE (Ring Learning With Errors) ciphertext where the number of mask polynomials is one.

In particular, a GLWE ciphertext of a message $M \in \mathfrak{R}_q$ under the secret key $S \in \mathfrak{R}^k$ may be defined as follows:

$$CT = \left(A_1, \ldots, A_k, B = \sum_{i=1}^{k} A_i \cdot S_i + \tilde{M} + E\right) \in GLWE_S^q(\tilde{M}) \subseteq \mathfrak{R}_q^{k+1}$$

Here, $S=(S_1, \ldots, S_k) \in \mathfrak{R}^k$ is the secret key with coefficients sampled e.g., from a uniform binary, uniform ternary or Gaussian distribution. $\tilde{M}$ is an appropriate scaling of the input message.

$$\{A_i\}_{i=1}^{k}$$

are polynomials in $\mathfrak{R}_q$ with coefficients sampled e.g. from the uniform distribution in $\mathbb{Z}_q$, E is a noise (error) polynomial in $\mathfrak{R}_q$ such that its coefficients are sampled e.g. from a Gaussian distribution $\chi_\sigma$. The parameter k is a positive integer and represents the number of polynomials in the GLWE secret key. To simplify notations, $S_{k+1}$ may be defined as −1. In this example, a LWE ciphertext is a GLWE ciphertext with N=1. In this case, the parameter n=k may be considered for the size of the LWE secret key and both the ciphertext and the secret may be denoted with a lower case, e.g. $ct^q$ and s, respectively. A RLWE ciphertext in this example is a GLWE ciphertext with k=1 and N>1, e.g., a 2-power.

Although the integer q is used throughout this specification to denote a ciphertext modulus, it is noted that multiple ciphertext moduli may be used within an encrypted multiplication, e.g., with modulus switching being used to align ciphertexts under the same q when needed.

The above examples describe a secret-key, symmetric variant of GLWE. The techniques provided herein apply equally to public-key variants as are known per se. In the latter, case, for example, the above secret key may be used as the private key, wherein the public key comprises one or more encryptions of zero, e.g., see R. Rothblum, "Homomorphic encryption: From private-key to public-key", Theory of Cryptography (TCC 2011), vol. 6597 of Lecture Notes in Computer Science, pp. 219-234, Springer, 2011 (incorporated herein by reference).

Various embodiments operate in the TFHE setting, meaning that ciphertexts are used that support a programmable bootstrapping (PBS). The programmable bootstrapping may take as input a ciphertext, and output a ciphertext of the same message, or a function of that message, with input-independent noise. The PBS may comprise evaluating the homomorphic decryption of the input ciphertext in the exponent of a polynomial. Generally, it is possible in TFHE-like schemes to pick a secure cryptographic parameter set in order to minimize the computation cost while fitting the needed precision. Interestingly, such parameters may be selected independently from the quantity of homomorphic operations and the depth of the circuit evaluated. Examples of encryption schemes in the TFHE setting that may be combined with the techniques provided herein, are provided in the following references:

[DM15] L. Ducas et al., "FHEW: bootstrapping homomorphic encryption in less than a second", proceedings EUROCRYPT 2015;

[CGGI16] I. Chillotti et al., "Faster fully homomorphic encryption: Bootstrapping in less than 0.1 seconds", proceedings ASIACRYPT 2016;

[CGGI17] I. Chillotti et al., "Faster packed homomorphic operations and efficient circuit bootstrapping for TFHE", proceedings ASIACRYPT 2017.

[BIPPS22] C. Bonte et al., "FINAL: Faster FHE instantiated with NTRU and LWE", Cryptology ePrint Archive, Paper 2022/07

Various embodiments deal with performing encrypted computations on values encrypted as encryptions of subvalues. In this specification, these values are by way of illustration typically presented as integers modulo a certain modulus. Such values modulo an integer may equivalently be regarded as elements of a discretized torus, as is done in several of the references mentioned above. In particular, various references use the real torus $\mathbb{T}=\mathbb{R}/\mathbb{Z}$ to express the message and ciphertext spaces, and implement a discretization of $\mathbb{T}$ by using arithmetic modulo $2^{32}$ or $2^{64}$. This can equivalently be seen to correspond to computing with integers in $\mathbb{Z}_q$ (with $q=2^{32}$ or $q=2^{64}$). Accordingly, integers modulo a given modulus and discretized torus elements may be used interchangeably, in particular, there exists an isomorphism between $\mathbb{Z}_q$ and $1/q\mathbb{Z}/\mathbb{Z}$ as also noted in the literature, e.g., see C. Boura et al., "CHIMERA: Combining Ring-LWE-based Fully Homomorphic Encryption Schemes", J. Math. Cryptol., 14(1): 316-338, 2020.

The programmable bootstrapping operation in TFHE-like schemes makes them an appealing choice for a wide range of applications. Because bootstrapping is relatively efficient compared to many other FHE schemes, it is much more feasible to perform relatively complex computations, e.g., with a multiplicative depth of at least 10, at least 50, or at least 100. In particular, the cryptographic parameters of TFHE-like schemes can be selected based on the desired precision and resulting computational cost, independently from the quantity of homomorphic operations and their circuit depth. In other FHE schemes, in contrast, bootstrapping can be so inefficient that, in practice, these schemes are typically applied in a levelled way, meaning that their parameters are selected depending on a given computation such that it can be performed without the need for bootstrapping. Such a levelled approach is not feasible for more complex computations, however, so in such cases, TFHE-like schemes are particularly beneficial.

Generally, the security of GLWE-based ciphertexts is based on the distribution of the secret key, and on three main parameters: n=kN, where N is the degree of the quotient polynomial, k is the number of random mask polynomials of a ciphertext, and n is the length of the secret key; q, the modulus; and σ, the statistical parameter of the noise, e.g., its standard deviation. Given these parameters, it is known per se how to estimate a degree of security that is provided, see, e.g., M. Albrecht et al., "On the concrete hardness of Learning with Errors", Journal of Mathematical Cryptology, 9(3): 169-203, 2015 (incorporated herein by reference).

In embodiments herein, the parameters of TFHE-like LWE- and GLWE-based ciphertexts that are used may be selected based on a desired security level and based on a desired accuracy of operations such as linear combination of LWE ciphertexts and/or applying a programmable bootstrapping, in other words, a noise level resulting from applying these operations. Interestingly, in the TFHE setting, security parameters may be selected independently of the computational complexity, e.g. independently of the multiplicative depth of the computation. This is unlike for non-TFHE-like schemes, where the security parameters are typically chosen to limit or eliminate bootstrappings.

In particular, LWE-based ciphertexts and/or GLWE-based ciphertexts used in the TFHE setting herein may use a relatively small modulus, e.g., of at most 32 bits, at most 64 bits, or at most 128 bits. This modulus is typically selected independent from the computation to be carried out, e.g., it is selected depending on a desired precision and/or efficiency. Parameters N, k, and/or σ may be selected to achieve a desired security level, also typically independently from the computation to be carried out. For example, N may be set to at least 512 and/or at most 2048 or 4096, e.g., to 1024. For example, in an embodiment, RLWE is used with N at least 512 and/or at most 2048 or 4096, e.g., 1024, and k=1. Such values for N are not typically used in non-TFHE-like encryption schemes, where such values would severely restrict the computations that can be performed; instead, in non-TFHE-like schemes, q and N are typically both selected based on the desired security level, such that q may be much larger.

FIG. 1*a* schematically shows an example of an embodiment of an encrypted computation device 110. Device 110 may be for performing an encrypted computation on a set of one or more encoded-and-encrypted values.

The encoded-and-encrypted values may be encoded-and-encrypted as encryptions of multiple respective subvalues. Here, a subvalue may have a corresponding message modulus and carry-message modulus larger than the message modulus. Of the encoded-and-encrypted values, one or more values may be encoded-and-encrypted without carry. In this case, the non-carry subvalues may be smaller than the corresponding message moduli. Of the encoded-and-encrypted values, one or more values may be encoded-and-encrypted with carry. In this case, at least one with-carry subvalue may be larger than or equal to the corresponding message modulus. The remaining zero or more subvalues may be non-carry subvalues.

Device 110 may comprise a processor system 130, a storage 140, and a communication interface 150. Storage 140 may comprise local storage, e.g., a local hard drive or electronic memory. Storage 140 may comprise non-local storage, e.g., cloud storage. In the latter case, storage 140 may comprise a storage interface to the non-local storage. For example, storage 140 may be for storing one or more encoded-and-encrypted values that are being computed on. Storage 140 may contain additional data, e.g., a bootstrapping key for use in a blind rotation as also discussed elsewhere.

Device 110 may communicate internally, with other devices, external storage, input devices, output devices, and/or one or more sensors over a computer network. The computer network may be an internet, an intranet, a LAN, a WLAN, etc. The computer network may be the Internet. The device may optionally comprise connection interface 150 which is arranged to communicate with other devices as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna. Communication, e.g., internal communication, may use other communication protocols or media, e.g., an internal data bus.

In device 110, the communication interface 150 may be used to send or receive digital data. For example, device 110 may be configured to receive or send data representing one or more encoded-and-encrypted values and/or LWE encryptions, e.g., representing inputs and/or outputs of the encrypted computation. As another example, the communication interface 150 may be used to receive data representing the bootstrapping key.

The execution of device 110 may be implemented in a processor system 130, e.g., one or more processor circuits, e.g., microprocessors, examples of which are shown herein. Device 110 may comprise multiple processors, which may be distributed over different locations. For example, device 110 may use cloud computing.

Processor subsystem 130 may be configured to apply an encrypted operation to at least an input value encoded-and-encrypted with carry to obtain an output value encoded-and-encrypted with carry. Processor subsystem 130 may be further configured to apply an encrypted carry-reduction to the output value encoded-and-encrypted with carry to obtain a further encoding-and-encryption of the output value in which at least one with-carry subvalue is reduced to a non-carry subvalue.

Processor subsystem 130 may be configured to obtain one or more inputs to the encrypted computation, e.g., comprising one or more encoded-and-encrypted values, and/or comprising one or more encrypted but not encoded values that the processor subsystem 130 may optionally convert into encoded-and-encrypted values as described herein. An encoded-and-encrypted value provided as input is typically encoded-and-encrypted without carry, although obtaining an input with carry is also possible in principle. Along with the input, processor subsystem 130 may obtain a bound on the encrypted value, e.g., as a degree of fullness or similar.

Processor subsystem 130 may be configured to output one or more outputs of the encrypted computation, e.g., comprising one or more encoded-and-encrypted values, and/or comprising one or more encrypted but not encoded values that the processor subsystem 130 has e.g. determined by converting an encoded-and-encrypted value into an encrypted value as described herein. When outputting encoded-and-encrypted values, the processor subsystem 130 may be configured to apply the encrypted carry-reduction operation to output the encrypted-and-encoded values without carry.

For example, processor subsystem 130 may obtain the inputs and/or output the outputs from/to storage 130 and/or from/to another party via communication interface 150.

Some of the figures show functional units that may be functional units of the processor system. For example, a figure may be used as a blueprint of a possible functional organization of the processor system. The processor circuit(s) are not shown separate from the units in most figures. For example, the functional units shown in FIGS. 2-6 (see below) may be wholly or partially implemented in computer instructions that are stored at a device such as device 110, e.g., in an electronic memory of device 110, and are executable by a microprocessor of device 110. In hybrid embodiments, functional units are implemented partially in hardware, e.g., as coprocessors, e.g., arithmetic and/or cryptographic coprocessors, and partially in software stored and executed on device 110.

For example, device 110 may be a device for performing an encrypted computation. The encrypted computation may use homomorphic encryption cryptography. For example, the device 110 may be used to perform an encrypted computation, e.g., the device may perform the computation even though said data is received in encrypted form, e.g., from a data provider, and even though the device 110 is not able to decrypt the data. The computation may involve encrypted operations and/or carry reductions as described herein.

For example, storage 140 may store encrypted data items, e.g., received from one or more data providers or generated as intermediate results or end results, e.g., outputs, of the computation. Typically, most or all data items on which the computation of device 110 is performed, are encrypted with a key (or keys) that is not known to device 110—that is device 110 may not be configured to obtain the plain data items corresponding to the encrypted data items, e.g., such as stored in storage 140. The decryption key in plain form is secret for device 110, though the encryption/decryption key may be available in encrypted form.

For example, the processor system may be configured to perform a sequence of homomorphic encryption operations. The encrypted operations may include linear operations, e.g., an addition, a subtraction, and/or a scalar multiplication; multiplications; univariate function evaluations; and the like. Interestingly, using the provided techniques, multiple encrypted arithmetic operations, e.g., an arithmetic circuit with multiplicative depth of at least two, at least three, or at least five, may be performed on a set of encoded-and-encrypted values, wherein said performing does not comprise an encrypted carry-reduction.

Figure 1B:
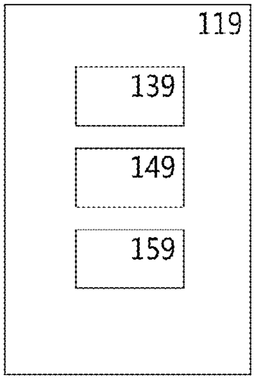

FIG. 1*b* schematically shows an example of an embodiment of a compiler device 119 for compiling a computation into a homomorphic executable. The homomorphic executable may be executable by an encrypted computation engine and causes the encrypted computation engine to perform an encrypted computation on a set of one or more encoded-and-encrypted values as described herein, e.g., by device 110 of FIG. 1*a*. The homomorphic executable may comprise one or more instructions to perform the encrypted carry-reduction operation as described herein, e.g., as part of an encrypted operation or in between the execution of encrypted operations. Device 119 may perform the encrypted computation itself, e.g., device 110 of FIG. 1*a* may be combined with device 119 of FIG. 1*b*.

Device 110 may comprise a processor system 139, a storage 149, and a communication interface 159. Processor system 139, storage 149, and communication interface 159 may be implemented as discussed for the respective components of FIG. 1*a*. Storage 149 may be for storing a description of a homomorphic computation to be compiled into a homomorphic executable, e.g. stored as program code, as an instruction graph, or the like. Communication interface 159 may be used to receive the computation to be compiled. Communication interface 159 may be used to send the homomorphic executable.

Processor subsystem 139 may be configured to generate the homomorphic executable by translating operations to homomorphic computation instructions as is known per se in the art. Interestingly, processor subsystem 139 may be configured to keep track of degrees of fullness of subvalues of encoded-and-encrypted values used in the encrypted computation. This way, encrypted carry-reduction operations may be included in the homomorphic executable where needed. In particular, processor system 139 may be configured to, for a with-carry subvalue that is to be computed, determine a degree of fullness indicating a bound on the with-carry subvalue. If the bound exceeds the corresponding carry-message modulus, processor subsystem 139 may generate an instruction that causes the encrypted computation engine to apply the encrypted carry-reduction prior to computing said with-carry subvalue. Processor subsystem 139 may be configured to optimize one or more parameters of the encrypted computation, such as number and values for the message and carry-message moduli, for the encrypted computation being compiled into an executable.

Figure 1C:
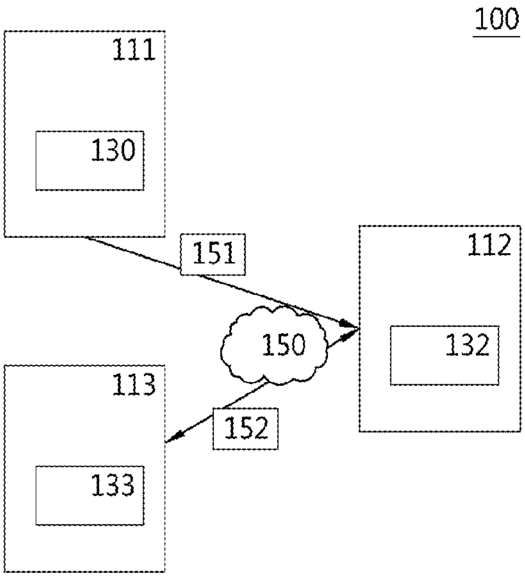

FIG. 1*c* schematically shows an example of an embodiment of an encrypted computation system 100. System 100 is configured for performing an encrypted computation using homomorphic encryption, e.g., fully homomorphic encryption.

The system 100 in this example comprises a compiler device 111, a data provider device 113 and an encrypted computing device 112. Compiler device 111 may be combined with encrypted computing device 112 or data provider device 113 in a single device. Device 112 may be configured to receive encrypted data items from a data provider 113. At least one or more data items may be received in encrypted form. One or more further data items may be received in plain format. Device 112 may be configured to receive a homomorphic executable for performing the encrypted computation from the compiler device 111.

Device 112 may perform the computation as described herein on the received data items and possibly also on stored data items. Interestingly, the computation may be performed by the device on the encrypted data, without decrypting the data, e.g., without converting encrypted data items to data in a plain format.

Device 112 in this example may be based on device 110 of FIG. 1*a*, e.g., may comprise processor system 130, storage 140, and/or communication interface 150 of FIG. 1*a*. Each of the devices 111, 112, 113 may be based on device 119 of FIG. 1*b*, e.g., may each comprise processor system 139, storage 149, and/or communication interface 159 of FIG. 1*b*.

Optionally, the compiler device 111 or data provider device 113 may be further configured to generate key material for the encrypted computing device 112 to perform the encrypted computation, e.g., including a bootstrapping key for performing a programmable bootstrapping as discussed herein. The device generating the key material may provide the bootstrapping key 151 to device 112, e.g., send it via computer network 150, upload it to a shared storage, etc. Key material can also be generated by a separate key generation device (not shown in this figure).

Although not shown in this figure, the encrypted computation system 100 may comprise multiple encrypted computing devices, e.g., two, three or more than three. The encrypted computation may be distributed among the multiple encrypted computing devices. The encrypted computing devices may exchange intermediate computation results, typically encrypted, for example as encoded-and-encrypted values comprising multiple encrypted subvalues, among each other. Each encrypted multiplication device may be implemented like encrypted computing device 112, and may perform encrypted operations and/or encrypted carry-reduction operations as described herein.

Homomorphic encryption schemes can be applied in many settings. For example, encrypted computing device 112 may be operated by a cloud provider. The cloud provider may offer computation and storage services to its clients. By employing homomorphic encryption, data provider device 113, e.g., a client of the cloud provider, can send their data in encrypted form. The cloud provider can still perform the required computations, and/or the required storage, but is not able to know the corresponding to plain data. For example, data provider device 113 may use an encryption key of a type corresponding to the particular homomorphic encryption system used to encrypt the data items. When computations results are received by data provider 113 from encrypted computing device 112, a corresponding decryption key may be used to decrypt the encrypted data items. Encryption and decryption keys may be the same- and typically are so.

For example, encrypted computation system 100 may be configured to train machine-learning models, e.g., image classifiers, e.g., medical models, without the encrypted computing devices having access to the plain data items. For example, linear regression may be performed on the input data, possibly, even without bootstrapping. For example, back-propagation may be performed on the input data, possibly, with bootstrapping. The resulting model parameters may be returned to an entity who is in possession of the decryption key. This enables multiple providers of medical data to pool their data, by sending the data to a cloud provider. The cloud provider then returns the model parameters, without ever having access to the plain data. Encryption keys may be equal to decryption keys.

After the model is trained, the encrypted computation system 100 may be used to offer the model, say, for use with medical data. This can be done with plain model parameters or encrypted model parameters—in both cases with encrypted data, e.g., encrypted input, intermediate and output data. Using plain model parameters is usually much more efficient. In both cases, an effect of the system is that a computation is performed, say an image classification, e.g., a medical image classification, without the computer knowing the plain data items. For example, a mammogram may be evaluated for cancer, without the image ever being in the plain at an encrypted computing device 112 and without any encrypted computing device 112, or a coalition of such devices, knowing what the outcome of the cancer evaluation is. From a privacy point of view it may be acceptable to operate a plain model on encrypted privacy sensitive data, while it might not be acceptable to operate on plain privacy sensitive data.

Other applications involve database services, e.g., looking up encrypted data in an encrypted database; for example, the computation may be a comparison between an input item and a database item. For example, multiple computations may be combined to produce a database index that matches an index. For example, the database, may be a genomic database, and the input a gene sequence. For example, system 100 may be used for protected control of a device. For example, a device, even a large device such as a power plant, may send sensor values to an encrypted computing device 112, and receive encrypted control signals in return. The control signals being computed from the sensor signals. An attacker of the system may be able to determine the contents of data going to and from one or more encrypted computing devices 112, or even gain access to intermediate data of these devices, but he will not be helped by that as the data is encrypted. Even a full break of all encrypted computing devices 112 of a system 100 will not reveal the data, as the decryption key is not known to these devices. Computing the control signal may involve such mathematical operations as linear algebra, averages, matrix multiplication, polynomial evaluations, and so on, all of which are possible to execute with homomorphic encryption operations. In any case, such applications involve computations comprising arithmetic operations on relatively large values that may be implemented efficiently as described herein.

For example, a pool of encrypted data items may be maintained in the encrypted computation system; a subset of these may be received and another subset may be the result of an encrypted computation, e.g., intermediate results. For example, an encrypted computing device 112 may be configured to apply a homomorphic encryption operation to one, two or more encrypted data items in a pool, e.g., a collection of input and/or intermediate and/or output values. The result may be a new encrypted data item that may be stored in the pool. One or more of the values may be encoded-and-encrypted, whereas zero or more other values may be encrypted directly without being encoded, for example. The pool may be stored in a storage of the encrypted computation system. This may be local storage or a distributed storage. In the latter case, it may happen that one or more encrypted data items are represented multiple times in the pool. Encrypted, and in particular encoded-and-encrypted, data items may be sent from one computing device to another, e.g., if their values are needed elsewhere. The pool may be implemented in various ways, e.g., as a register file, an array, various data structure, and so on.

The encrypted data items may represent all kinds of data. For example, encrypted data items may represent numbers that need to be averaged, or which are used for linear regression, etc. For example, the encrypted data items may represent an image. For example, each pixel of the image may correspond to one or more encrypted data items. For example, a grey-scale pixel may be represented by a grey level, which in turn may be represented by a single encrypted data item. For example, 256 grey levels may be encoded in a single encrypted data item. For example, a colour pixel may be represented as multiple colour levels, e.g., RGB levels, which in turn may be represented by a tuple of encrypted data items. For example, three 256-level colours may be encoded as respective encoded, or encoded-and-encrypted, values.

A set of homomorphic encryption operations may be defined for the computation. For example, from the homomorphic encryption operations a network or circuit of operations may be built that together implement the computation, e.g., by a compiler device as described for FIG. 1*b*, or by the computation device itself. For example, the operations may include Boolean operations. The way the homomorphic encryption operations are combined, e.g., which operation is applied to which operand in the pool, determines the computation that is being performed. For example, the computation may be represented as a list of homomorphic encryption operations that are to be performed together with an indication on which encrypted data item they are to be performed. The network or circuit may indicate to the encrypted computation device 112 when to carry out an encrypted carry-reduction, and/or the encrypted computation device 112 may determine whether to carry out an encrypted carry-reduction operation based on keeping track of fullness degrees of subvalues being computed on.

Figure 2A:
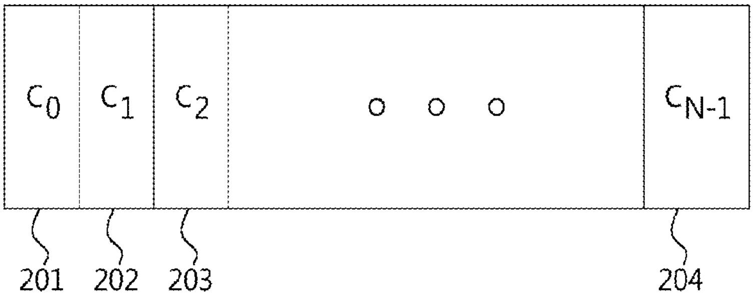
FIGS. 2*a*, 2*b* schematically show examples of lookup table for programmable bootstrapping.
Figure 2B:
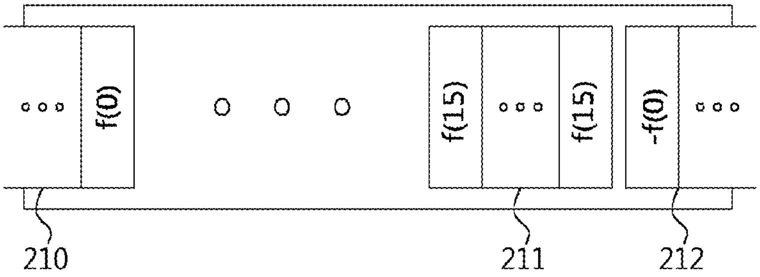

FIGS. 2*a*, 2*b* schematically show examples of lookup tables for a programmable bootstrapping.

In various embodiments, the encrypted computation is an encrypted computation in the TFHE setting. In this setting, the encryption scheme used, e.g., the LWE encryptions, may support a programmable bootstrapping operation. As is known per se, such a programmable bootstrapping may evaluate a LWE decryption in an exponent of a GLWE-encrypted monomial. As known per se, by using respective test polynomials in the programmable bootstrapping operation, the programmable bootstrapping can be used to evaluate various functions on the LWE encryption that it is applied to. As also described elsewhere, the programmable bootstrapping may be used to carry out an encrypted carry-reduction, but also various other operations such as univariate function evaluation.

An example of a programmable bootstrapping operation is now discussed. The bootstrapping may evaluate a univariate function and at the same reduce the noise of the input ciphertext. Throughout this specification, notation PBS is used to denote a programmable bootstrapping. The function that is evaluate on the input may be represented as a look-up table (LUT). The look-up table may correspond to a test polynomial by which a GLWE-encrypted monomial may be multiplied. By computing the GLWE-encrypted monomial and multiplying it by the test polynomial, the look-up table may effectively be rotated in order to output the correct element in the table.

A visual representation of a polynomial storing a LUT is shown in FIG. 2*a*. In this example, an array is shown whose respective elements 201-204 represent respective coefficients of the polynomial $$P(X)=\sum_{i=0}^{N-1} c_i X^i,$$

The function can be the identity function, in which case the programmable bootstrapping may implement a regular bootstrapping.

In various cases, a redundant lookup table may be used. In particular, for a given value r, a r-redundant LUT may be used in which coefficients are repeated r times consecutively. This is illustrated in FIG. 2*b*. The LUT for the function $f$ is in this example represented as an array comprising respective blocks 210, 211, 212 of 16 repetitions of each output value. A PBS with redundancy may be used to reduce noise in the input ciphertext.

The PBS may use a bootstrapping key. The bootstrapping key may comprise GGSW encryptions of respective elements of the secret key that is used to encrypt the input LWE ciphertext of the PBS. The bootstrapping may comprise a modulus switching operation in which an input LWE ciphertext in $$\mathbb{Z}_q^{n+1}$$

is converted into a scaled ciphertext, e.g., an element from $$\mathbb{Z}_{2N}^{n+1}.$$

A blind rotation may be applied to effectively rotate a GLWE encryption of a redundant LUT according to the LWE ciphertext produced by the modulus switching, using the public bootstrapping key. A sample extraction operation may be applied to extract a fixed coefficient, e.g. the constant coefficient, of the GLWE encryption as a LWE ciphertext.

Throughout this specification, the following notation may be used to denote the execution of a programmable bootstrapping operation:

$$ct_{out} \leftarrow PBS(ct_{in}, BSK, P_f),$$

$$\text{where} \begin{cases} s=(s_1,\cdots,s_n)\in\mathbb{Z}^n\text{: a } LWE \text{ input secret key} \\ s'=(s_{1'},\cdots,s'_{kN})\in\mathbb{Z}^{kN}\text{: a } LWE \text{ output secret key} \\ S'=(S'_1,\ldots,S'_k)\in\mathfrak{R}^k\text{: a } GLWE \text{ secret key} \\ ct_{in}=LWE_s(m\cdot\Delta_{in})=(a_1,\cdots,a_n,a_{n+1}=b) \\ BSK=\left\{BSK_i\in GGSW_{S'}^{(\beta,\ell)}(s_i)\right\}_{1\le i\le n} \\ P_f\text{: a } r-\text{redundant } LUT \text{ for } x\mapsto f(x) \end{cases}$$

Using techniques that are known per se, for example from "Programmable bootstrapping enables efficient homomorphic inference of deep neural networks", a PBS may be performed with the following computational complexity:

$$\mathbb{C}_{PBS}^{(n,\ell,k,N)} = \mathbb{C}_{ModulusSwitching}^{(n)} + n\mathbb{C}_{CMUX}^{(n,\ell,k,N)} + \mathbb{C}_{SampleExtract}^{(N)} \text{ with}$$

$$\begin{cases} \mathbb{C}_{ModulusSwitching}^{(n)} & = (n+1)\mathbb{C}_{Scale\&Round} \\ \mathbb{C}_{CMUX}^{(n,\ell,k,N)} & = (k+1)(n+1)\mathbb{C}_{Rotation}^{(N)} + 2n(k+1)N\mathbb{C}_{Add} + \mathbb{C}_{ExternalProduct}^{(n,\ell,k,N)} \\ \mathbb{C}_{ExternalProduct}^{(n,\ell,k,N)} & = n\ell(k+1)N\mathbb{C}_{dec} + n\ell(k+1)\mathbb{C}_{FFT} + n(k+1)\ell(k+1)N\mathbb{C}_{multFFT} + \\ & \quad + n(k+1)(\ell(k+1)-1)N\mathbb{C}_{addFFT} + n(k+1)\mathbb{C}_{iFFT} \end{cases}$$

Various existing implementations of the programmable bootstrapping operation, for example the implementation of "Programmable bootstrapping enables efficient homomorphic inference of deep neural networks", may operate on input ciphertexts of which the most significant bit is zero.

As an example, it is possible to use NTRU-type encryptions for the input ciphertext and/or for the encrypted polynomial product. More generally, the provided techniques can be applied to any bind rotation that results in an encrypted polynomial product of a test polynomial and a bootstrapping polynomial modulo a quotient polynomial different from $X^N+1$, e.g., any accumulator-based blind rotation.

In particular, concerning the use of NTRU for the encrypted polynomial product, it is noted that the discussed "Blind rotation" algorithm per se makes use of an abstract accumulator ACC. While, as discussed, this accumulator can be implemented based on GLWE, this is not necessary. Other types of accumulators are possible, for example based on NTRU. Based on NTRU ciphertexts, a gadget encryption analogous to GGSW encryption can be defined and with it, an external product. A detailed example can be found in C. Bonte et al., "FINAL: Faster FHE instantiated with NTRU and LWE", https://ia.cr/2022/074. Accordingly, the accumulator may be implemented based on NTRU, where its value may for example contain an element in $\mathbb{Z}_{N,q}$ [X] and CMux may be defined.

As an example, applying the blind rotation to an LWE ciphertext c encrypting μ using this type of NTRU-based accumulator may result in an encrypted polynomial product $X^{-m'\cdot\Delta_{in}}\cdot P_f$ of bootstrapping monomial $X^{-m'\cdot\Delta_{in}}$ for a certain scaled plaintext $-m'\cdot\Delta_{in}$ and test polynomial $P_f$. In this case, the encrypted polynomial may be a NTRU ciphertext of the form $c'=g/f+X^{-m'\cdot\Delta_{in}}\cdot P_f$. Using an appropriate key-switching key, an LWE ciphertext encrypting the constant term of $X^{-m'\cdot\Delta_{in}}\cdot P_f$ can optionally be extracted from this encrypted polynomial, as discussed in the "FINAL" reference.

Instead or in addition to the encrypted polynomial, also the input ciphertext needs not to be an LWE-type ciphertext. In particular, a blind rotation can be applied to a NTRU-type ciphertext, as discussed in the "FINAL" reference. It is also possible to obtain an input LWE ciphertext by converting it from a NTRU ciphertext, as discussed in the "FINAL" reference.

Also in such cases, it is desired to define the test polynomial $P_f$ such that the encrypted polynomial product contains a desired output value at a fixed coefficient.

Interestingly, it is also possible to use the techniques provided in this specification in combination with a programmable bootstrapping without padding, meaning that the programmable bootstrapping can operate on input ciphertexts with an arbitrary most significant bit. Such a programmable bootstrapping is provided e.g. in I. Chillotti et al., "Improved programmable bootstrapping with larger precision and efficient arithmetic circuits for TFHE", proceedings ASIACRYPT 2021. In such cases, when using Encode as described elsewhere in this document, $$\Delta = \frac{q}{p}$$

may be used instead of $$\Delta = \frac{q}{2\cdot p}.$$

Still another way of performing a programmable bootstrapping is by extracting respective bits of the ciphertext and converting them to GGSW ciphertexts, for example using circuit bootstrapping as known per se; and applying a lookup table to the respective GGSW ciphertexts. As known per se, the latter may be performed particularly efficiently using mixed packing, e.g., horizontal and/or vertical packing. Also with this technique for performing a programmable bootstrapping, no bit of padding may be needed, e.g., the most significant bit can hold an arbitrary value. This technique is discussed in more detail with respect to FIG. 4.

Generally, a programmable bootstrapping may include a key switching operation performed such that the output ciphertext is an encryption under the same key as the input ciphertext. Throughout this specification, notation PBS-KS may be used to denote such a programmable bootstrapping including a key switching. In this case, the key material PUB used for the programmable bootstrapping may include the key switching key for performing this key switching. Generally, performing the key switching is optional. The complexity of the PBS-KS is:

$$\mathbb{C}_{PBS-KS}^{(n,\ell_{PBS},\ell_{KS},k,N)} = \mathbb{C}_{PBS}^{(n,\ell_{PBS},k,N)} + \mathbb{C}_{KS}^{(n,\ell_{KS},k,N)},$$

where $$\mathbb{C}_{KS}^{(n,\ell_{KS},k,N)}$$

denotes the complexity of the key switch.

Figure 3A:
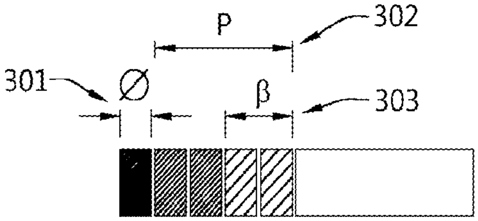
FIG. 3*a* schematically shows an example of a with-carry subvalue.

FIG. 3*a* schematically shows an example of a with-carry subvalue.

In various embodiments, a value may be encoded-and-encrypted as encryptions of multiple respective subvalues, for example, corresponding to respective digits of a radix decompositions of the value. According to this correspondence, the respective subvalues may be associated with a certain modulus, referred to as a message modulus. For example, when using a base-β radix decomposition, the message modulus may be set to β. Accordingly, a value may be encoded-and-encrypted by encoding the value as subvalues modulo the message modulus, and encrypting these subvalues.

Interestingly however, in various embodiments described herein, subvalues may be stored with carry. This means that the subvalue is defined modulo a carry-message modulus p that is larger than the message modulus. Accordingly, the subvalue may be larger than the message modulus.

Respective subvalues may each be encrypted according to the same encryption key, but this is not needed. In the latter case, various operations on the encoded-and-encrypted values, such as carry propagation as described herein, may use key switchings, for example from an encryption key of one subvalue to an encryption key of another subvalues, as needed.

For example, as illustrated in FIG. 3*a*, a ciphertext may encrypt a value characterized by:

- an optional bit of padding 301 set to zero as its most significant bit;
- a carry-message modulus p, 302 and a message modulus β, 303, e.g., the radix decomposition base, such that β≤p (note that p and β do not need to be powers of 2);
- a value x, e.g., a non-carry value x that is smaller than β or a with-carry value that is greater than or equal to β and smaller than p.

For example, the carry-message modulus p may be at least four times the message modulus β; at least eight times the message modulus, or at least 32 times the message modulus. For example, the carry-message modulus may be at most 128, at most 256, or at most 512. Given a message of a certain size (e.g., at most 8 or at most 16 bits), the remaining room of the carry-message modulus may be used for the carry.

For example, the figure illustrates a value with message modulus $\beta=4=2^2$ and carry-message modulo $p=16=2^{2+2}$. An encryption using this message modulus and carry-message modulus may have 2 bits of carry that are set to 0 for a non-carry value and that may be advantageously be used for encrypted operations.

For example, a non-carry value m may be LWE-encrypted by scaling the value according to the following algorithm and then using the scaled version m̃ in the encryption, e.g., $$\left(a_1, \ldots, a_k, b = \sum_{i=1}^{k} a_i \cdot s_i + \tilde{m} + e\right).$$

This example algorithm takes an integer between 0 and p while providing one bit of padding and more room to compute levelled operations.

---

Algorithm. $\tilde{m} \leftarrow \text{Encode}(m, p, \beta)$

---

Context: $\begin{cases} q \in \mathbb{Z}\text{: the ciphertext modulus} \\ \beta \le p \\ \Delta = \dfrac{q}{2 \cdot p} \in \mathbb{R} \end{cases}$ Input: $\begin{cases} m \in \mathbb{Z}_p\text{: a message} \\ p \in \mathbb{Z}\text{: the carry-message modulus} \\ \beta \in \mathbb{Z}\text{: the message modulus} \end{cases}$ Output: $\tilde{m} \in \mathbb{Z}_q$ begin
$\tilde{m} \times \leftarrow \lfloor m \cdot \Delta \rceil$
end

---

The encrypted operations may cause the encrypted value to increase and in particular to become larger than the message modulus. In particular, the most significant part of the encrypted value corresponding to dividing the encrypted value by the message modulus (e.g., the most significant bits), may represent a carry and may be referred to herein as the "carry buffer".

Figure 3B:
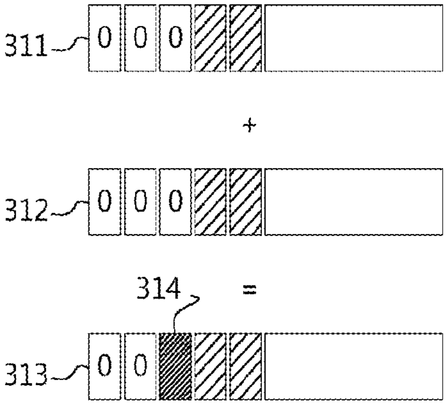
FIG. 3*b* schematically shows an example of an addition of with-carry subvalues.
Figure 3C:
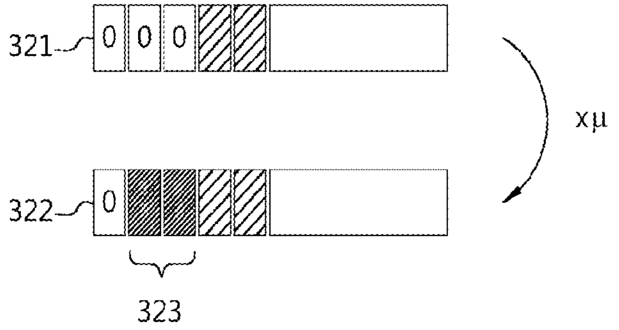
FIG. 3*c* schematically shows an example of a scalar multiplication of a with-carry subvalue.

Two examples of this are illustrated with respect to FIGS. 3*b* and 3*c*. FIG. 3*b* illustrates computing an encrypted addition of two values 311, 312 encrypted without carry (e.g., having carry buffer and bit of padding set to zero). As illustrated in the figure, the value encrypted by the resulting ciphertext 313 may exceed the message modulus, i.e., the value may be a with-carry subvalue. In this particular case, as shown, one carry bit 314 may be consumed due to the addition.

A further example is illustrated in FIG. 3*c*. This figure illustrates a scalar multiplication of an encryption 321 of a non-carry value by a scalar (i.e., a non-encrypted value) μ<β, resulting in an encrypted value 322. In this case, a number of carry bits 323 may be affected is proportional to the size of the constant.

Returning to FIG. 3*a*. As illustrated with respect to FIG. 3*b* and FIG. 3*c*, various encrypted operations may lead to values encoded-and-encrypted with carry; that is, to values that have a with-carry subvalue that is larger than or equal to the corresponding message modulus. Or at least, for some subvalues, it may not be guaranteed that they do not contain carry. Although it is possible to directly perform an encrypted carry-reduction operation to such a with-carry value to reduce its value to below the message modulus, the inventors realized that this is not always needed. It is possible in some cases to keep subvalues encrypted with carry, and to use such a value encoded-and-encrypted with carry as an input to another encrypted operation.

At some point, however, an encrypted carry-reduction may be needed, e.g., if an encrypted operation or a sub-operation to be applied may potentially lead to a value exceeding the corresponding carry-message modulus. Accordingly, it may be determined whether to perform an encrypted carry-reduction on a with-carry value at some point during the encrypted computation.

Interestingly, to determine whether to perform an encrypted carry-reduction, the inventors envisaged to keep track of a degrees of fullness of with-carry subvalues computed as part of the encrypted operation. The degree of fullness may indicate a bound on the with-carry subvalue. The degree of fullness may be regarded as metadata that is associated to a ciphertext. The degree of fullness may indicate whether it is possible to apply an encrypted, e.g., levelled, homomorphic operation to the ciphertext, or whether its carry needs to be emptied first. When it is still possible to compute levelled operations, the degree of fullness may quantify an amount of levelled operations that can still be performed.

The degree of fullness is typically computed dynamically while performing the encrypted computation, although it can also be computed by a compiler device as also discussed elsewhere. Keeping track of the degree of fullness during the computation may be referred to here as the "smart" variant of performing an encrypted computation with encrypted carry-reduction. A smart encrypted computation may verify certain conditions to decide automatically if a carry buffer has to be emptied or if another levelled operation can still be performed. In that sense, a smart encrypted computation may be regarded as an improvement of gate bootstrapping to the setting where subvalues do not need to be binary, and where carry can be preserved between encrypted operation to perform more levelled operations between bootstrappings. Interestingly, it may not be needed during design time of an encrypted computation to determine when to perform an encrypted carry-reduction, because a smart encrypted computation can determine automatically whether to perform an encrypted carry-reduction.

In particular, a ciphertext may be used to encrypt a subvalue in a certain interval, defined by the degree of fullness. The encrypted subvalues may be used as input for levelled homomorphic operations which may result in a different, typically larger, interval. In particular, the most significant part of a subvalue may be filled with carries. This part of the encrypted subvalue may be referred to as the carry buffer.

In particular, an encrypted value m (e.g., a subvalue of an encoded-and-encrypted value) encrypted under a secret key s may be represented along with its associated degree of fullness as a so-called Arith ciphertext $C^{ari}$ defined as follows:

$$C^{ari} \in Arith_s(m) := \begin{cases} ct \in LWE_s(\tilde{m}) & : \text{an } LWE \text{ ciphertext} \\ deg \in \mathbb{R} & : \text{a degree of fullness} \\ p \in \mathbb{Z} & : \text{a carry-message modulus} \\ \beta \in \mathbb{Z} & : \text{a message modulus} \\ q \in \mathbb{Z} & : \text{a ciphertext modulus} \end{cases}$$

where $\tilde{m}$=Encode(m, p, β)∈ $\mathbb{Z}_q$ .

In particular, the degree of fullness may be defined as follows. Let p∈ $\mathbb{Z}$ be a carry-message modulus, and let β∈ $\mathbb{Z}$ be a message modulus (which may or may not be a power of two), e.g., a radix decomposition base, such that β≤p. Let ct be a ciphertext encrypting a value m<p. Let μ be a known worst case for m, e.g., the biggest integer that m can be, so that 0≤m≤μ. The degree of fullness of ct∈$LWE_s(\tilde{m})$ with $\tilde{m}$=Encode(m, p, β) may be defined as the following value:

$$deg := \frac{\mu}{p-1}.$$

Using this definition, if the degree of a ciphertext ct reaches 1, it means that this ciphertext is potentially encrypting the value p−1 which is the biggest integer such ciphertext can store without consuming the bit of padding (or without overlapping, if no bit of padding is used). Therefore, when deg≈1, a carry-reduction may be performed. In other words, for a with-carry subvalue that is to be computed, its resulting degree of fullness may be determined, and if it is larger than 1, then the encrypted carry-reduction may be performed prior to computing the with-carry subvalue.

Although the above is used as an illustrative definition of the degree of fullness throughout this specification, other definitions are possible as well. For example, the degree of fullness may be defined by the integral size of the interval of possible values of the value, or the degree of fullness may be defined by the minimum and maximum possible value that is encrypted, or the like. In any case, the degree of fullness may indicate a bound on the with-carry subvalue, and if it is determined that his bound exceeds the corresponding carry-message modulus for a with-carry subvalue that is to be computed, the encrypted carry-reduction may be applied prior to computing said with-carry subvalue.

In particular, the degree of fullness of an encrypted value may be more granular than indicating whether or not the value contains carry, and may also be more granular than counting an integral number of carry bits that the value has. Thereby, a tighter worse case estimate is obtained of the level of consumption of the carry bits, allowing increase the number of levelled arithmetic operations before a carry extraction is performed.

It is now illustrated how a degree of fullness may be computed for various homomorphic arithmetic operations on encrypted values, in particular, for addition, subtraction, scalar multiplication. Generally, the degree of fullness may be determined by determining a bound of an output of an operation based on bounds on respective inputs. Such bounds can in general depend on how the operation is implemented and can in many cases be derived from the implementation.

It is further shown how permit checks can be defined for homomorphic operations to determine if the operation can be performed without exceeding the carry-message modulus. As discussed elsewhere in this specification, operations on encoded-and-encrypted values may be implemented in terms of such operations on encrypted values.

In the discussion below, two Arith ciphertexts $$C_1^{ari} \text{ and } C_2^{ari}$$

are referred to as being "compatible" when:

$$(C_1^{ari}::q = C_2^{ari}::q) \wedge (C_1^{ari}::p = C_2^{ari}::p) \wedge (C_1^{ari}::\beta = C_2^{ari}::\beta)$$

In particular, a degree of fullness may be computed of an encrypted addition. Below this is illustrated for the homomorphic addition of two ciphertexts $$C_1^{ari} \text{ and } C_2^{ari}$$

with degree of fullness $deg_1$ and $deg_2$ respectively. The output is a new ciphertext $$C_{out}^{ari}$$

encrypting the addition of the two original messages with an updated degree of fullness.

Algorithm. $C_{out}^{ari} \leftarrow Arith::\text{Add}(C_1^{ari}, C_2^{ari})$

Context: $\begin{cases} q := C_1^{ari}::q,\ p := C_1^{ari}::p,\ \beta := C_1^{ari}::\beta \\ s \in \mathbb{Z}^n: \text{the secret key} \end{cases}$ Input: $\begin{cases} C_1^{ari} \in Arith_s(m_1) \\ C_2^{ari} \in Arith_s(m_2) \end{cases}$ Output: $C_{out}^{ari} \in Arith_s(m_1 + m_2)$ $ct := (0, \ldots, 0) \in \mathbb{Z}_q^{n+1}$ for i ∈ [0; n] do $ct[i] \leftarrow C_1^{ari}::ct[i] + C_2^{ari}::ct[i] \bmod q$ end $deg := C_1^{ari}::deg + C_2^{ari}::deg$ return $C_{out}^{ari} := Arith\{ct, deg, p, \beta, q\}$ This algorithm may be applied if the inputs are compatible and $$C_1^{ari}::\text{deg} + C_2^{ari}::\text{deg} \le 1.$$

The computational complexity $$\mathbb{C}_{Arith::Add}^{(n)}$$

of the addition algorithm may be $$\mathbb{C}_{Arith::Add}^{(n)} = (n+1) = O(n).$$

As another example, a degree of fullness may be determined of an encrypted negation. In particular, this is illustrated below for a homomorphic modular negation of a ciphertext $\mathcal{C}^{ari}$ encrypting a message m. The output is a new ciphertext $$C_{out}^{ari}$$

encrypting the negation of the original message with updated degree of fullness $\text{deg}_{out}$. Define ζ as:

$$z = \zeta(C^{ari}) = C^{ari}::\beta \cdot \left\lceil \frac{C^{ari}::\text{deg} \cdot (C^{ari}::p - 1)}{C^{ari}::\beta} \right\rceil$$

This value is useful for the Neg algorithm. By definition of the degree, $$C_{out}^{ari}::\text{deg} := \frac{\mu}{p-1}$$

such that 0≤m≤μ. Then without the "$\mathcal{C}^{ari}$" notation:

$$z = \beta \cdot \left\lceil \frac{\text{deg} \cdot (p-1)}{\beta} \right\rceil = \beta \cdot \left\lceil \frac{\frac{\mu}{p-1} \cdot (p-1)}{\beta} \right\rceil = \beta \cdot \left\lceil \frac{\mu}{\beta} \right\rceil.$$

Accordingly, z may represent the smallest multiple of β such that μ≤z. This value may represent the worst case for the negation.

| Algorithm. $C_{out}^{ari} \leftarrow Arith::Neg(C^{ari})$ |
| --- |
| Context: $\begin{cases} q := C_1^{ari}::q,\ p := C^{ari}::p,\ \beta := C^{ari}::\beta \\ s \in \mathbb{Z}^n\text{: the secret key} \end{cases}$ |
| Input: $C^{ari} \in Arith_s(m)$ |
| Output: $C_{out}^{ari} \in Arith_s(-m)$ |

-continued

| Algorithm. $C_{out}^{ari} \leftarrow Arith::Neg(C^{ari})$ |
| --- |
| $z \leftarrow \zeta(\mathcal{C}^{ari})$ |
| $\tilde{z} \leftarrow$ Encode (z, p, β) |
| ct ← $(-\mathcal{C}^{ari}+z::\text{ct}[0], \ldots, -\mathcal{C}^{ari}::\text{ct}[n-1], \tilde{z} - \mathcal{C}^{ari}::\text{ct}[n])$ |
| $deg := \frac{z}{p-1}$ |
| return $C_{out}^{ari} := Arith\{ct, deg, p, \beta, q\}$ |

This algorithm may be applied if $$\frac{\zeta(C^{ari})}{p-1} \le 1.$$

The computational complexity $$\mathbb{C}_{Neg}^{(n)}$$

may be $$\mathbb{C}_{Neg}^{(n)} = \mathbb{C}_{Arith::Add}^{(n)} + O(1) = O(n).$$

Another example is the computation of a degree of fullness for an encrypted subtraction. Below a homomorphic modular subtraction is illustrated of two LWE ciphertexts $$C_1^{ari} \text{ and } C_2^{ari}.$$

The output is a new ciphertext $$C_{out}^{ari}$$

encrypting the subtraction of the two original messages with an updated degree of fullness.

| Algorithm. $C_{out}^{ari} \leftarrow Arith::\ Sub(C_1^{ari}, C_2^{ari})$ |
| --- |
| Context: $(s \in \mathbb{Z}^n$: the secret key |
| Input: $\begin{cases} C_1^{ari} \in Arith_s(m_1) \\ C_2^{ari} \in Arith_s(m_2) \end{cases}$ |
| Output: $C_{out}^{ari} \in Arith_s(m_1 - m_2)$ |
| $C_{tmp}^{ari} \leftarrow Neg(C_2^{ari})$ |
| $C_{out}^{ari} \leftarrow Arith::\ \text{Add}(C_1^{ari}, C_{tmp}^{ari})$ |
| return $C_{out}^{ari}$ |

The algorithm may be applied if the inputs are compatible and $$(C_1^{ari}::\text{deg}) + \frac{\zeta(C_2^{ari})}{p-1} \le 1.$$

The computational complexity $$\mathbb{C}^{(n)}_{Arith::Sub}$$

of the subtraction may be:

$$\mathbb{C}^{(n)}_{Arith::Sub} = \mathbb{C}^{(n)}_{Arith::Add} + \mathbb{C}^{(n)}_{Neg} = O(n).$$

Another example is an encrypted scalar multiplication, in other words, a multiplication by a value known to the party performing the encrypted multiplication. Below, a homomorphic scalar multiplication is illustrated between a ciphertext $\mathcal{C}^{ari}$ and a known integer μ. The output is a new ciphertext $$C^{ari}_{out}$$

encrypting the product of the original message with μ.

---

Algorithm. $C^{ari}_{out} \leftarrow Arith::ScalarMul(C_1^{ari}, \mu)$

---

Context: $\begin{cases} q := C^{ari}::\ q,\ p := C^{ari}::\ p,\ \beta := C^{ari}::\ \beta \\ s \in \mathbb{Z}^n\text{: the secret key} \end{cases}$ Input: $\begin{cases} C^{ari} \in Arith_s(m) \\ \mu \in [0, \beta - 1] \end{cases}$ Output: $C^{ari}_{out} \in Arith_s(\mu \cdot m)$ $ct := (0, \ldots, 0) \in \mathbb{Z}_q^{n+1}$ for $i \in [0; n]$ do $ct[i] \leftarrow \mu \cdot C^{ari}::\ ct[i] \bmod q$ $deg := \mu \cdot C^{ari}::\ deg$ $C^{ari}_{out} := Arith\{ct, deg, p, \beta, q\}$

---

This algorithm may be applied if μ·($\mathcal{C}^{ari}$ ::deg)≤1. The computational complexity $$\mathbb{C}^{(n,\mu)}_{Arith::ScalarMul}$$

of the scalar multiplication algorithm may be $$\mathbb{C}^{(n)}_{Arith::ScalarMul} = O(n).$$

An alternative way of performing the multiplication is by using a programmable bootstrapping. The programmable bootstrapping typically resets the degree of fullness to that of a value that does not hold carry.

Figure 3D:
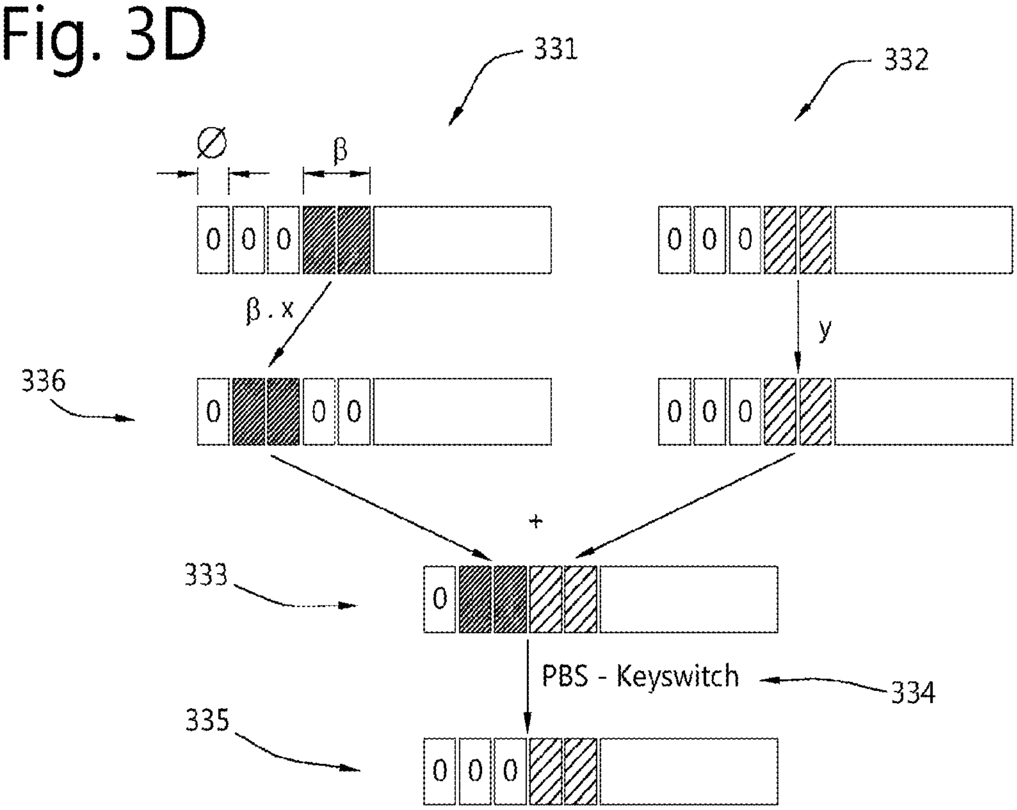
FIG. 3*d* schematically shows an example of an embodiment an encrypted multiplication operation of encryptions of first and second subvalues.

FIG. 3*d* schematically shows an example of an embodiment an encrypted multiplication operation of encryptions of first and second encrypted values. For example, the values may be subvalues of respective encrypted-and-encoded values of which a product is being computed. It is also illustrated how to compute a degree of fullness.

This technique of computing an encrypted multiplication of two ciphertexts may be of independent interest and may for example also be used in an encrypted computation that does not involve values encoded-and-encrypted with carry, or may even be used in an encrypted computation that does not involve encoded-and-encrypted values at all. Such an encrypted computation may accordingly comprise accessing a set of encrypted values and performing the encrypted computation, comprising computing one or more encrypted multiplications as discussed with respect to this figure.

The encrypted multiplication operation may be used to compute a most significant part of the product of two encrypted values 331, 332, e.g., a product $$\left\lfloor \frac{x \cdot y}{\beta} \right\rfloor$$

of two values defined modulo β; or a least significant part, e.g., a product x·y mod β of two values defined modulo β.

The encrypted multiplication operation may be performed by first determining a combined encryption 333 that contains both the first and the second subvalue; and then applying a programmable bootstrapping 334 to the combined encryption 333 to obtain the result 335. In particular, to obtain the combined encryption 333, the first encrypted value 331 may be scaled, or in other words, shifted; and the shifted ciphertext 336 may be added to the unscaled second encrypted value 332.

In particular, the least significant part of the product may be computed:

---

Algorithm. $C^{ari}_{out} \leftarrow Arith::MulLSB(C_1^{ari}, C_2^{ari}, PUB)$

---

Context: $\begin{cases} q{:=}C_1^{ari}{::}q,\ p{:=}C_1^{ari}{::}p,\ \beta{:=}C_1^{ari}{::}\beta \\ s \in \mathbb{Z}^n\text{: the secret key} \\ \mu_1{:=}(p-1)\cdot C_1^{ari}{::}deg + 1 \\ P\text{: a } LUT \text{ for } x \to ((x \bmod \mu_1)) \cdot \left( \left\lfloor \frac{x}{\mu_1} \right\rfloor \bmod \beta \right) \bmod \beta \end{cases}$ Input: $\begin{cases} C_1^{ari} \in Arith_s(m_1) \\ C_2^{ari} \in Arith_s(m_2) \\ PUB\text{: public materials for } PBS - KS \end{cases}$ Output: $C^{ari}_{out} \in Arith_s(m_1 \cdot m_2 \bmod \beta)$ // Shift $m_2$ by a factor $\mu_1$ $C^{ari}_{2,tmp} \leftarrow Arith::ScalarMul(C_2^{ari}, \mu_1)$ // Build a plaintext where we have $m_1 \| m_2$ $C^{ari}_{tmp} \leftarrow Arith::\text{Add}(C_1^{ari}, C^{ari}_{2,tmp})$ // Compute the multiplication with a PBS $ct \leftarrow PBS - KS(C^{ari}_{tmp}, PUB, P)$ -continued Algorithm. $C_{out}^{ari} \leftarrow Arith::MulLSB(C_1^{ari}, C_2^{ari}, PUB)$ // The worst case for the degree is $\beta - 1$ $deg \leftarrow \min\left(\frac{\beta-1}{p-1}, (p-1)\cdot(C_1^{ari}::deg)\cdot(C_2^{ari}::deg)\right)$ return $C_{out}^{ari}:=Arith\{ct, deg, p, \beta, q\}$ This technique may be applied to compatible ciphertexts $$C_1^{ari}::deg + \mu_1 \cdot (C_2^{ari}::deg) \le 1.$$

The computational complexity $$\mathbb{C}_{Arith::MulLSB}^{(n,\beta,\ell,k,N)}$$

of the LSB multiplication algorithm may be $$\mathbb{C}_{Arith::MulLSB}^{(n,\beta,\ell,k,N)} = \mathbb{C}_{Arith::ScalarMul}^{(n,\beta)} + \mathbb{C}_{Arith::Add}^{(n)} + \mathbb{C}_{PBS-KS}^{(n,\ell,k,N)}.$$

A similar algorithm can be used to compute the MSB instead of the LSB. A different lookup table is used for the final programmable bootstrapping:

Algorithm. $C_{out}^{ari} \leftarrow Arith::MulMSB(C_1^{ari}, C_2^{ari}, PUB)$

Context: $\begin{cases} q:=C_1^{ari}::q,\ p:=C_1^{ari}::p,\ \beta:=C_1^{ari}::\beta \\ s \in \mathbb{Z}^n\text{: the secret key} \\ \mu_1:=(p-1)\cdot C_1^{ari}::deg+1 \\ P\text{: a } LUT \text{ for } x \to \left\lfloor \frac{(x \bmod \mu_1)\cdot\left(\left\lfloor \frac{x}{\mu_1}\right\rfloor \bmod \beta\right)}{\beta} \right\rfloor \end{cases}$ Input: $\begin{cases} C_1^{ari} \in Arith_s(m_1) \\ C_2^{ari} \in Arith_s(m_2) \\ PUB\text{: public materials for } PBS-KS \end{cases}$ Output: $C_{out}^{ari} \in Arith_s\left(\left\lfloor \frac{m_1 \cdot m_2}{\beta} \right\rfloor\right)$ // Shift $m_2$ by a factor $\mu_1$ $C_{2,tmp}^{ari} \leftarrow Arith::ScalarMul(C_2^{ari}, \mu_1)$ // Build a plaintext where we have $m_1 \| m_2$ $C_{tmp}^{ari} \leftarrow Arith::\mathrm{Add}(C_1^{ari}, C_{2,tmp}^{ari})$ // Compute the multiplication with a PBS $ct \leftarrow PBS-KS(C_{tmp}^{ari}, PUB, P)$ // The worst case for the degree is $\beta - 1$ $\deg \leftarrow \left\lfloor \frac{\mu_1 - 1}{\beta} \right\rfloor \cdot \left\lfloor \frac{\mu_2 - 1}{\beta} \right\rfloor$ return $C_{out}^{ari} := Arith\{ct, deg, p, \beta, q\}$ As above, the computational complexity of this algorithm may be:

$$\mathbb{C}_{Arith::MulMSB}^{(n,\beta,\ell,k,N)} = \mathbb{C}_{Arith::MulLSB}^{(n,\beta,\ell,k,N)}.$$

More generally, a multivariate function evaluation may be performed on one or more input ciphertexts, e.g., encrypted subvalues, by determining a combined encryption that represents the respective encrypted input values; and applying a univariate function to the combined encryption, e.g., by programmable bootstrapping. MulLSB and MulLSB are examples of this, but this technique also works for other multivariate (e.g., bivariate) functions. Interestingly, this way, a multivariate function may be evaluated efficiently using a single programmable bootstrapping.

In particular, consider a bivariate function, e.g., a look-up table, $l(m_1, m_2)$. In this case, the two messages $m_1$, $m_2$ may be combined e.g. by shifting one of the two ciphertexts. Thereby, the message may effectively be moved higher in the MSB. The shifted ciphertext may be added to the other ciphertext. For example, the ciphertext $ct_2$ may be multiplied by $(\mu_1+1)$, and added to $ct_1$. This way, even in the worst-case scenario, no information may be mixed. This may be possible if both ciphertexts and the results of the combination (e.g., multiplication times a constant and addition) respect conditions on the degrees and the noise. Once the two messages are combined in a single ciphertext, the bi-variate function l may be evaluated as a univariate LUT l' on the concatenation.

The same technique can be applied to multivariate functions with more than two inputs, if the degrees of the ciphertexts involved in the computation as well as their error amount allow to perform the steps leading to the concatenation. In the same way that the output degree for a univariate function is computed, the output degree may be computed also when the function is multivariate.

Returning to FIG. 3*a*.

An alternative to the encrypted multiplication of FIG. 3*d* is now discussed that is less efficient but may be preferred in some situations since it needs less precision. Also for this alternative it is illustrated how a degree of fullness may be determined.

In this example, the LSB result of a homomorphic multiplication of two ciphertexts $$C_1^{ari} \text{ and } C_2^{ari}$$

is determined. The output is a new ciphertext $$C_{out}^{ari}$$

encrypting the LSB part of the product of the two original messages with its updated degree of fullness. Interestingly, the two input messages just need to contain enough space to compute an LWE addition/subtraction. This implementation relies on the relation $$x \cdot y = \frac{(x+y)^2}{4} - \frac{(x-y)^2}{4}.$$

Accordingly, a multiplication may be performed in terms of an LWE addition; an LWE subtraction; evaluations of an appropriate univariate function using a programmable bootstrapping, in this case the function $$\frac{(\cdot)^2}{4};$$

a further LWE subtraction; and an optional programmable bootstrapping that carry-reduces the result:

---

Algorithm. $C_{out}^{ari} \leftarrow Arith::MulLSB_{3PBS}(C_1^{ari}, C_2^{ari}, PUB)$

---

$$\text{Context:} \begin{cases} q := C_1^{ari}::q,\ p := C_1^{ari}::p,\ \beta := C_1^{ari}::\beta \\ s \in \mathbb{Z}^n\text{: the secret key} \end{cases}$$

$$\text{Input:} \begin{cases} C_1^{ari} \in Arith_s(m_1) \\ C_2^{ari} \in Arith_s(m_2) \\ PUB\text{: public material } PBS-KS \\ P_1\text{: } a\ r-\text{redundant } LUT \text{ for } x \rightarrow \left\lfloor \frac{x^2}{4} \right\rfloor \bmod \beta \\ P\text{: } a\ r-\text{redundant } LUT \text{ for } x \rightarrow x \bmod \beta \end{cases}$$

$$\text{Output: } C_{out}^{ari} \in Arith_s\ (m_1 \cdot m_2 \bmod \beta)$$

// Computes the biggest possible message for $m_2$ $z \leftarrow \zeta(C_2^{ari})$ $P_2 \leftarrow \left(r-\text{redundant } LUT \text{ for } x \rightarrow \left\lfloor \frac{(x-z)^2}{4} \right\rfloor \bmod \beta\right)$ $C_{add}^{ari} \leftarrow Arith::\text{Add}(C_1^{ari}, C_2^{ari})$ $C_{sub}^{ari} \leftarrow Arith::\text{Sub}(C_1^{ari}, C_2^{ari})$ $C_{add}^{ari}::ct \leftarrow PBS-KS(C_{add}^{ari}, PUB, P_1)$ $C_{sub}^{ari}::ct \leftarrow PBS-KS(C_{sub}^{ari}, PUB, P_2)$ $C_{out}^{ari} \leftarrow Arith::\text{Sub}(C_{add}^{ari}, C_{sub}^{ari})$ $C_{out}^{ari}::ct \leftarrow PBS-KS(C_{out}^{ari}, PUB, P)$ // The worst case for the degree is $\beta - 1$ $deg \leftarrow \min\left(\frac{\beta-1}{p-1}, (p-1)\cdot(C_1^{ari}::deg)\cdot(C_2^{ari}::deg)\right)$ return $C_{out}^{ari}$

---

The above procedure may be applied to compatible inputs where the parameters of Arith::Sub are appropriate for that algorithm, and $$C_1^{ari}::deg + C_2^{ari}::deg \leq 1.$$

The computational complexity $$\mathbb{C}_{MulLSB_{3PBS}}^{(n,\ell,k,N)}$$

of this version of the LSB multiplication algorithm may be:

$$\mathbb{C}_{Arith::MUlLSB_{3PBS}}^{(n,\ell,k,N)} = \mathbb{C}_{Arith::Add}^{(n)} + 2\cdot\mathbb{C}_{Arith::Sub}^{(n)} + 3\cdot\mathbb{C}_{PBS-KS}^{(n,\ell,k,N)}.$$

Another example of an operation for which a degree of fullness may be determined, is the extraction of the carry of a ciphertext. This operation may be used to implement encrypted carry-reduction, as also discussed elsewhere. In particular, the algorithm below takes as input a Arith ciphertext with a certain degree of fullness and performs a PBS to extract the part of the message overflowing the base β into another Arith ciphertext.

---

Algorithm. $C_{out}^{ari} \leftarrow Arith::CarryExtract(C^{ari}, PUB)$

---

$$\text{Context:} \begin{cases} q := C^{ari}::q,\ p := C^{ari}::p,\ \beta := C^{ari}::\beta \\ s \in \mathbb{Z}^n\text{: the secret key} \\ P\text{: } a\ r-\text{redundant } LUT \text{ for } x \rightarrow \left\lfloor \frac{x}{\beta} \right\rfloor \end{cases}$$

$$\text{Input:} \begin{cases} C^{ari} \in Arith_s(m) \\ PUB\text{: public material } PBS-KS \end{cases}$$

$$\text{Output: } C_{out}^{ari} \in Arith_s\left(\left\lfloor \frac{m}{\beta} \right\rfloor\right)$$

ct ← PBS − KS($C^{ari}$, PUB, P)

$$deg \leftarrow \frac{\left\lfloor \frac{(C^{ari}::deg)\cdot(p-1)}{\beta} \right\rfloor}{p-1}$$

return $C_{out}^{ari} := Arith\{ct, deg, p, \beta, q\}$

---

This procedure may be applied if $C^{ari}$ ::deg≤1. The computational complexity may be $$\mathbb{C}_{Arith::CarryExtract}^{(n,l,k,N)} = \mathbb{C}_{PBS-KS}^{(n,l,k,N)}.$$

Another operation of which a degree of fullness may be determined is the extraction of the message modulo the message modulus. Specifically, the algorithm below takes as input a Arith ciphertext with a certain degree of fullness and performs a PBS to extract the part of the message not overflowing β into another Arith ciphertext.

---

Algorithm. $C_{out}^{ari} \leftarrow Arith::MessageExtract(C^{ari}, PUB)$

---

$$\text{Context:} \begin{cases} q := C^{ari}::q,\ p := C^{ari}::p,\ \beta := C^{ari}::\beta \\ s \in \mathbb{Z}^n\text{: the secret key} \\ P\text{: } a\ r-\text{redundant } LUT \text{ for } x \rightarrow x \bmod \beta \end{cases}$$

$$\text{Input:} \begin{cases} C^{ari} \in Arith_s(m) \\ PUB\text{: public material } PBS-KS \end{cases}$$

$$\text{Output: } C_{out}^{ari} \in Arith_s(m \bmod \beta)$$

ct ← PBS − KS($C^{ari}$, PUB, P)

$deg \leftarrow \min\left(\frac{\beta-1}{p-1}, C^{ari}::deg\right)$ return $C_{out}^{ari}$ := Arith{$ct, deg, p, \beta, q$}

---

The above procedure may be applied if $\mathcal{C}^{ari}$ ::deg≤1. The computational complexity may be $$\mathbb{C}^{(n,l,k,N)}_{Arith::MessageExtract} = \mathbb{C}^{(n,l,k,N)}_{PBS-KS}.$$

Further, a basis change operation may be defined. In some cases it may be needed to change the basis of a $\mathcal{C}^{ari} \in \text{Arith}_s(m)$ ciphertext during an encrypted computation, for example, to ensure compatibility between ciphertexts. For this purpose, an algorithm may be defined that takes as input $\mathcal{C}^{ari}$ and a basis ($p_{out}$, $\beta_{out}$) and returns a ciphertext $$C^{ari}_{out} \in Arith_s(m)$$

encrypting m in the new basis. This algorithm may be implemented by a programmable bootstrapping, and may be denoted:

$$C^{ari}_{out} \leftarrow Arith::BasisChange(C^{ari}_{in}, p_{out}, \beta_{out}, PUB).$$

This algorithm may be used if $\mathcal{C}^{ari}$ ::deg·($\mathcal{C}^{ari}$ ::p−1)<$p_{out}$ and may have computational complexity $$\mathbb{C}^{(n,\ell,k,N)}_{Arith::BasisChange} = \mathbb{C}^{(n,\ell,k,N)}_{PBS-KS}.$$

In a further operation, an encrypted value may be multiplied by a scalar (i.e., a value known to the party performing the encrypted computation) while at the same time changing the basis (β,p) of the ciphertext. This operation may be implemented as follows:

Algorithm. $C^{ari}_{out} \leftarrow Arith::ScalarMultBasisChange(C^{ari}, \lambda, p_{out}, \beta_{out}, PUB)$ Context: $\begin{cases} q := C^{ari}::q,\ p := C^{ari}::p,\ \beta := C^{ari}::\beta,\ \kappa := |C^{ari}| \\ s \in \mathbb{Z}^n\text{: the secret key} \\ P\text{: a } LUT \text{ for } x \to (\lambda \cdot x \bmod \beta_{out}) \cdot \frac{q}{2 \cdot p_{out}} \end{cases}$ Input: $\begin{cases} C^{ari} \in Arith_s(m) \\ \lambda \in \mathbb{N} \\ (\beta_{out}, p_{out}) \in \mathbb{N}^2 \\ PUB\text{: public material } PBS-KS \end{cases}$ Output: $C^{ari}_{out} \in Arith_s(\lambda \cdot x)$ ct ← PBS − KS($\mathcal{C}^{ari}$, PUB, P)

$deg \leftarrow \frac{\beta_{out} - 1}{p_{out} - 1}$ return $C^{ari}_{out} := Arith\{ct, deg, p_{out}, \beta_{out}, q\}$ This algorithm may be used if $\mathcal{C}^{ari}$ ::deg≤1 and may have computational complexity $$\mathbb{C}^{(n,\ell,k,N)}_{Arith::BasisChange} = \mathbb{C}^{(n,\ell,k,N)}_{PBS-KS}.$$

In general, for a with-carry value to be computed during an encrypted computation, such as a with-carry subvalue of an encoded-and-encrypted value, the degree of fullness may be determined, and, if so indicated by the degree of fullness, an encrypted carry-reduction may be applied to an input that is used to compute the with-carry value.

To this end, it may be verified if the carry buffer may overflow when computing a with-carry value, and if so, the carry may be reduced by clearing (e.g., for a CRT representation) or propagating (e.g., for a radix representation representation) it, as appropriate. For an encoded-and-encrypted value to be computed, none, one or more, or all of the subvalues may be carry-reduced as appropriate. In case of operations having multiple input values (e.g., addition), carry reductions can in general be applied to none, one or more, or all of the input values. The encrypted operation obtained in this way, which corresponds to the original operation but verifies for respective sub-operations whether the carry buffer may overflow and, in this case, performs a carry-reduction, may be referred to as the "smart version" of the encrypted operation.

Figure 4:
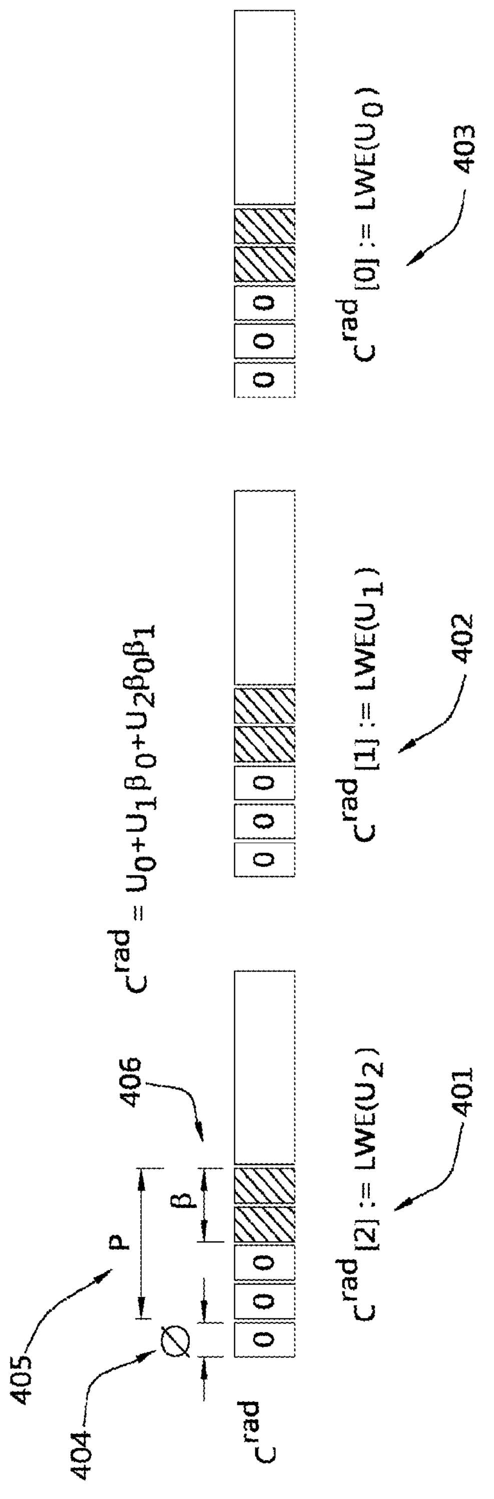
FIG. 4 schematically shows an example of a value encoded-and-encrypted based on a radix decomposition.

FIG. 4 schematically shows an example of a value encoded-and-encrypted based on a radix decomposition, also referred to as the RadModInt representation.

In particular, a value may be encoded into a set of multiple respective subvalues $m_i$ according to the relation $$m = m_0 + \sum_{i=1}^{\kappa-1} m_i \prod_{\alpha=0}^{i-1} \beta_\alpha \in \mathbb{Z}_M.$$

Figure 6:
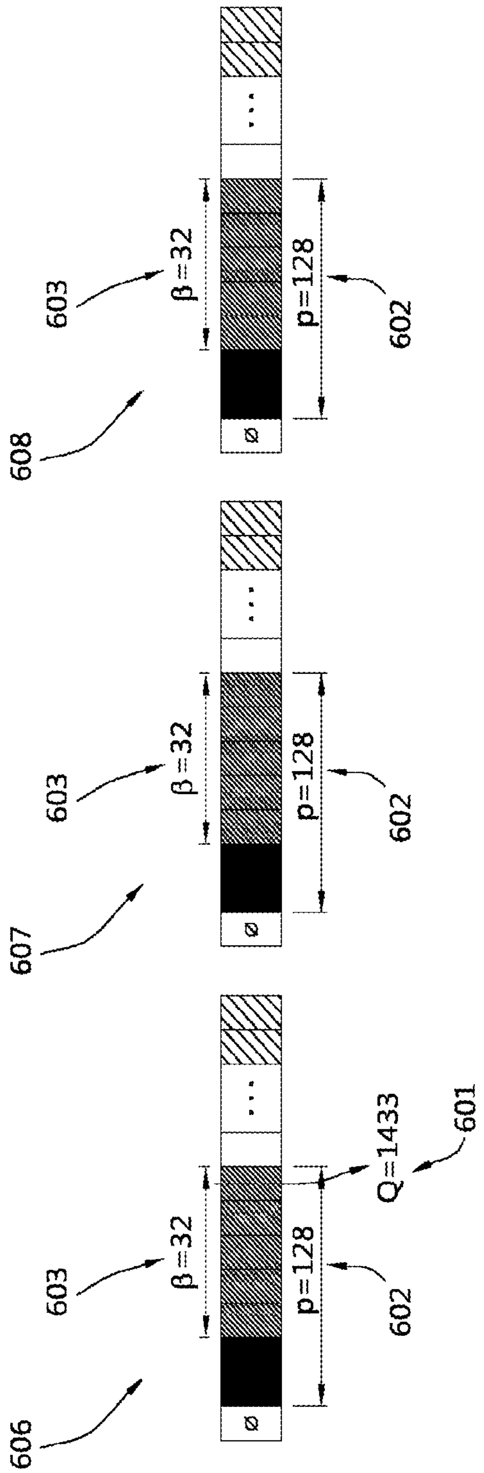
FIG. 6 schematically shows an example of a value encoded-and-encrypted based on a radix decomposition and using a modulus smaller than the maximum value representable by the radix decomposition.

Here, the vector $\vec{\beta} = (\beta_0, \ldots, \beta_{\kappa-1})$ is referred to as the basis of the radix decomposition. As in a traditional radix decomposition, the basis elements may all be equal to the same value b, in which the radix decomposition may also be referred to as a base-b radix decomposition. However, it is also possible that not all elements of the basis are the same. This is also referred to as a mix-radix representation. This increases the flexibility in terms of moduli that can be represented. In any case, the encoded value may be defined as a value modulo the overall modulus $$M = \prod_{\alpha=0}^{i-1} \beta_\alpha$$

of the radix decomposition (or a smaller modulus as discussed with respect to FIG. 6).

In particular, a value 0≤m<M may be encoded-and-encrypted by encoding the value according to the following procedure and then encrypting the resulting encoded subvalues:

Algorithm. $\vec{m} \leftarrow \text{RadixEncode}(m, \vec{p}, \vec{\beta})$

Context: $\begin{pmatrix} q \in \mathbb{Z}\text{: the ciphertext modulus} \\ \beta_i \le p_i \\ \kappa \in \mathbb{N}\text{: block number} \\ m_i \in \mathbb{Z}_{\beta_i} \\ M = \prod_{\alpha=0}^{i-1} \beta_\alpha \end{pmatrix}$ Input: $\begin{cases} m = m_0 + \sum_{i=1}^{\kappa-1} m_i \prod_{\alpha=0}^{i-1} \beta_\alpha \in \mathbb{Z}_M\text{: a message} \\ \vec{p} \in \mathbb{Z}^\kappa\text{: the carry-message modulus} \\ \vec{\beta} \in \mathbb{Z}^\kappa\text{: the message modulus} \end{cases}$ Output: $\vec{m} = (\vec{m}_0, \ldots, \vec{m}_{\kappa-1}) \in \mathbb{Z}_q^+$ -continued

| Algorithm. $\tilde{m} \leftarrow$ RadixEncode(m, $\vec{p}$, $\vec{\beta}$) |
|---|
| for $0 \le i \le \kappa - 1$ do<br>// encoding<br>$\tilde{m}_i \leftarrow$ Encode($m_i$, $p_i$, $\beta_i$)<br>end<br>return $\tilde{m}$:= ($\tilde{m}_0$, . . . , $\tilde{m}_{\kappa-1}$) |

It is noted that this encoding can be combined with a programmable bootstrapping that uses a bit of padding or a PBS without padding, as desired.

By using the radix decomposition, encrypted computations may be performed on values defined modulo an overall modulus M, where M is the product of the basis elements. The basis elements may for example be at most 32, or at most 64, or at most 128. The basis elements do not need to be powers of two. One, more, or all of the basis elements may be at least 3, at least 5, or at least 10. For example, a basis of size k at least two, at least four, or at least eight may be used. Using such basis elements allows the computation in terms of subvalues to be implemented relatively efficiently. The overall modulus can for example be at least 256, at least 512, or at least 1024. Thus computations may be enabled on values that are not as efficiently implementable without a decomposition into subvalues.

Using the radix decomposition, modular integers may be implemented as a chain of $\kappa$ encrypted blocks modulo $\beta_i$ with $0 \le i < \kappa$. For a block, a pair $(\beta_i, p_i) \in \mathbb{N}^2$ may be defined comprising a message modulus and a carry-message modulus. The pair $(\vec{\beta}, \vec{p})$ may be referred to as the basis associated to a modular integer. This way, computations on integers modulo $$M = \prod_{i=0}^{\kappa-1} \beta_i$$

may be implemented.

This is illustrated by way of example in FIG. 4. In this example, three respective blocks 401-403 are used, i.e., $\kappa=3$. For all $0 \le i < \kappa$, $\beta_i=4$ and $p_i=16$; and $M=4^3$. In this figure, a fresh RadModInt is shown with subvalues that do not hold carry. In particular, the plaintext of the block 401 can be seen to involve a bit of padding 404; a carry-message modulus 405; and a message modulus 406.

Interestingly, when using the radix decomposition, various parameters of the encrypted computation can be varied, including but not limited to the modulo M and the basis $(\vec{\beta}, \vec{p})$. Accordingly, the total computation cost can be reduced by optimizing these parameters, e.g., automatically by a compiler device, for a particular use case.

Several examples are now discussed in detail of encrypted operations that may be performed on values encoded-and-encrypted using a radix decomposition. First some notation is introduced. An encoded-and-encrypted ciphertext $\mathcal{C}^{rad}$ encrypting an integer $m \in \mathbb{Z}_\tau$ decomposed according to a basis $\vec{\beta} \in \mathbb{N}^\kappa$, e.g., $$m = m_0 + \sum_{i=1}^{\kappa-1} m_i \prod_{j=0}^{i-1} \beta_j, \text{ with } \tau \in \prod_{j=0}^{\kappa-1} \beta_j,$$

under a secret key s, may be denoted as:

$$C^{rad} = (C_0^{ari}, C_1^{ari}, \ldots, C_{\kappa-1}^{ari}) \in RadModInt_s(m)$$

Below, the $$i^{th} C_i^{ari} \in Arith_s(m_i)$$

encrypted subvalue of a $\mathcal{C}^{rad}$ encoded-and-encrypted ciphertext may be denoted $\mathcal{C}^{rad}$ [i], and similarly for basis elements $\vec{\beta}$[i], $\vec{p}$[i]. $\mathcal{C}^{rad}$ [i,j], with $i \le j$, is short for $$C^{rad}[i, j] = (C_i^{ari}, C_{i+1}^{ari}, \ldots, C_j^{ari}),$$

and similarly for $\vec{\beta}$[i,j], $\vec{p}$[i,j]. The size of a $\mathcal{C}^{rad} \in$ RadModInt$_s$(m) is denoted $\kappa=|\mathcal{C}^{rad}|$.

As also noted elsewhere, respective encrypted subvalues $$C_i^{ari}$$

can be encrypted according to different encryption keys, with key switchings used to convert between encryption keys as needed.

Further, compatibility of $\mathcal{C}^{rad}$ ciphertexts may be defined as follows. Let $$C_1^{rad}, C_2^{rad}$$

be two RadModInt ciphertexts. Two RadModInt ciphertexts $$C_1^{rad} \text{ and } C_2^{rad}$$

may be defined as compatible if $$|C_1^{rad}| = |C_1^{rad}| = \kappa$$

and:

$$\forall\, i \in [0, \kappa-1], \begin{cases} C_1^{rad}[i]::p = C_2^{rad}[i]::p \\ C_1^{rad}[i]::q = C_2^{rad}[i]::q \\ C_1^{rad}[i]::\beta = C_2^{rad}[i]::\beta \end{cases}$$

Let $(\vec{p}, \vec{\beta})$ be a basis, then $p_i=\vec{p}[i]$ and $\beta_i=\vec{\beta}[i]$. The following functions are used in the examples that follow. Function $q_{i,\vec{\beta}}$ is defined recursively for $i \in \mathbb{Z}_{\geq -1}$ as:

$$q_{i,\vec{\beta}}(x) = \begin{cases} x, & \text{if } i = -1 \\ \left\lfloor \frac{q_{i-1,\vec{\beta}}(x)}{\beta_i} \right\rfloor, & \text{if } i \geq 0 \end{cases}$$

and $r_{i,\vec{\beta}}$ as:

$$r_{i,\vec{\beta}}(x) = q_{i-1,\vec{\beta}}(x) - q_{i,\vec{\beta}}(x) \cdot \beta_i,\ i \geq 0$$

and $\gamma_{\vec{\beta}}$ as:

$$\gamma_{\vec{\beta}}(x) = \begin{cases} \min(i \in \Omega), & \text{for } \Omega = \left\{ i < |\vec{\beta}|,\ q_{i,\vec{\beta}}(x) = 0 \right\} \\ |\vec{\beta}|, & \text{if } \Omega = \emptyset. \end{cases}$$

The following illustrates an operation wherein a ciphertext $\mathcal{C}^{ari} \in$ Arith is decomposed into a $\mathcal{C}^{rad} \in$ RadModInt with a basis $(\vec{p}, \vec{\beta}) \in \mathbb{N}^{\kappa^2}$, in other words wherein an encoding-and-encryption of a value using the radix decomposition is determined from an encryption of that value. Determining the encoding-and-encryption may comprise using a PBS to compute successively Euclidian divisions of the input ciphertext by respective members of the basis $\vec{\beta}$, with the remainders being stored non-carry subvalues encrypted as Arith ciphertexts. The remainders may be shifted according to the corresponding carry-message modulus $p_i$ in order to be consistent with the set of carry-message moduli $\vec{p}$.

Algorithm. $C_{out}^{rad} \leftarrow \text{Decompose}\left(C_{in}^{ari}, \vec{p}, \vec{\beta}, PUB\right)$ $$\text{Context: } \begin{cases} q := C_{in}^{ari} :: q,\ p := C_{in}^{ari} :: p,\ deg := C_{in}^{ari} :: deg \\ \mu := deg \cdot (p-1) \\ \gamma := \gamma_{\vec{\beta}}(\mu) \\ s \in \mathbb{Z}^n\text{: the secret key} \\ P_{i,\vec{\beta}}\text{: a } LUT \text{ for } x \to r_{i,\vec{\beta}}(x) \cdot \frac{q}{2 \cdot p_i},\ i \in [0, \kappa-1] \end{cases}$$

$$\text{Input: } \begin{cases} C_{in}^{ari} \in Arith_s(m) \\ (\vec{p}, \vec{\beta}) \in \mathbb{N}^{\kappa^2} \\ PUB\text{: public material for } PBS-KS \end{cases}$$

Output: $C^{rad} \in RadModInt_s(m)$ for $i \in [0, \gamma]$ do $ct_i \leftarrow PBS-KS\left(C^{ari}, PUB, P_i\right)$ $C_i^{ari} \leftarrow Arith\left\{ct_i, \min\left(\frac{\beta_i - 1}{p_i - 1}, \frac{q_{i-1}(\mu)}{p_i - 1}\right), p_i, \beta_i, q\right\}$ return $C_{out}^{rad} := \left(C_j^{ari}\right)_{j \in [0,\gamma]}$ This algorithm may be used if $\mu \leq p-1$ and may have a computational complexity of $$\mathbb{C}_{Decompose}^{(n,l,k,N,\gamma)} = (\gamma + 1) \cdot \mathbb{C}_{PBS-KS}^{(n,l,k,N)}.$$

The following illustrates an operation to increase the number of subvalues used to encode-and-encrypt a value using the radix decomposition. To this end, the encoding-and-encryption may be extended with encryptions of zero. Interestingly, this operation is very efficient for radix decomposition-based encodings. This operation may be denoted RadModIntCT::Padding and may change the size of a $$C_{in}^{rad} \in RadModInt$$

from $$\left|C_{in}^{rad}\right| = \kappa \text{ to } |\overrightarrow{\beta_{out}}| = \kappa_{out}.$$

To do so, the iphertext may be completed with $\mathcal{C}^{ari} \in \text{Arith}_0(0)$, e.g., trivial encryptions of zero. This is useful for example in combination with the Decompose algorithm since its output ciphertext $$C_{out}^{rad}$$

may not be or length $\kappa$. This operation may be denoted:

$$C_{out}^{rad} \leftarrow RadModIntCT::Padding\left(C_{in}^{rad}, \alpha, \overrightarrow{p_{out}}, \overrightarrow{\beta_{out}}\right).$$

This operation may be used if the elements of the basis of $$C_{in}^{rad}$$

are equal to the elements of $\overrightarrow{\beta_{out}}$ from the index $\alpha$, therefore $\kappa_{out} \geq \kappa + \alpha$. Formally, let $$\vec{p} = \left(C_{in}^{rad}[i]::p\right)_{i \in 0, \kappa-1}$$

and $$\vec{\beta} = \left(C_{in}^{rad}[i]::\beta\right)_{i \in 0, \kappa-1}.$$

Then for $[\alpha \in 0, \kappa_{out} - \kappa]$, $\beta_i = \beta_{out,\alpha+i}$ and $p_i = p_{out,\alpha+i}$ for all $i \in [0, \kappa-1]$.

The following illustrates an addition operation between two encoded-and-encrypted values using the radix decomposition $$C_1^{rad} \in RadModInt_s(m_1)$$

and $$C_2^{rad} \in RadModInt_s(m_2).$$

The addition may be performed by adding the respective corresponding subvalues. Interestingly, this operation may thus be parallelized. Specifically, an Arith::Add may be called between each $$C_1^{rad}[i] \text{ and } C_2^{rad}[i]$$

for each i.

---

Algorithm. $C_{out}^{rad} \leftarrow RadModIntCT::\mathrm{Add}(C_1^{rad}, C_2^{rad})$

---

$$\text{Context: } \begin{cases} \text{Fullfill condition 4.3} \\ \kappa := |C_1^{rad}| = |C_2^{rad}| \\ s \in \mathbb{Z}^n\text{: the secret key} \end{cases}$$

Input: $C_i^{rad} \in RadModInt_s(m_i),\ i \in 1, 2$

Output: $C_{out}^{rad} \in RadModInt_s(m_1 + m_2)$ for $i \in [0; \kappa - 1]$ do $C_{out}^{rad}[i] \leftarrow Arith::\mathrm{Add}(C_1^{rad}[i], C_2^{rad}[i])$ return $C_{out}^{rad}$

---

This operation may be used if the inputs are compatible and $$\forall\, i \in 0, \kappa - 1,\ C_1^{rad}[i]::deg + C_2^{rad}[i]::deg \le 1.$$

The computational complexity may be $$\mathbb{C}_{RadModIntCT::Add}^{(n,\kappa)} = \kappa \cdot \mathbb{C}_{Arith::Add}^{(n)}.$$

The following illustrates a subtraction of two values encoded-and-encrypted using the radix decomposition, $$C_1^{rad} \in RadModInt_s(m_1)$$

and $$C_2^{rad} \in RadModInt_s(m_2).$$

Similarly to addition, this operation may be implemented as subtractions of the respective subvalues, and may thus be parallelized. In particular, this operation may be implemented by computing an Arith::Sub between each $$C_1^{rad}[i] \text{ and } C_2^{rad}[i]$$

for each i.

---

Algorithm. $C_{out}^{rad} \leftarrow RadModIntCT::\ Sub(C_1^{rad}, C_2^{rad})$

---

Context: (s $\in \mathbb{Z}^n$ : the secret key

Input: $C_i^{rad} \in RadModInt_s(m_i),\ i \in 1, 2$

Output: $C_{out}^{rad} \in RadModInt_s(m_1 - m_2)$ for $i \in [0, \kappa - 2]$ do // to ensure that subtraction is possible $z \leftarrow \zeta(C_2^{rad}[i])$ $\tilde{z} \leftarrow \mathrm{Encode}(z, p_i, \beta_i)$ $C_{out}^{rad}[i] \leftarrow Arith::Sub(C_1^{rad}[i], C_2^{rad}[i])$ // compensate on the next block because of the z term $C_2^{rad}[i+1]::\ [n] + \dfrac{\tilde{z}}{\beta_\iota}$ $C_{out}^{rad}[\kappa - 1] \leftarrow Arith::\ Sub(C_1^{rad}[\kappa - 1], C_2^{rad}[\kappa - 1])$ return $C_{out}^{rad}$

---

This operation may be used of the inputs are compatible with each other, and $$\forall\, i \in 0, \kappa - 1,\ C_1^{rad}[i]::deg + \frac{\zeta\left(C_2^{rad}[i] + \dfrac{\zeta(C_2^{rad}[i-1])}{\beta_{i-1}}\right)}{p_i - 1} \le 1.$$

The computational complexity may be $$\mathbb{C}_{RadModIntCT::Sub}^{(n,\kappa)} = \kappa \cdot \mathbb{C}_{Arith::Sub}^{(n)}.$$

The following illustrates an encrypted carry-reduction operation that may be used to reduce a with-carry subvalue of an encoded-and-encrypted value to a non-carry subvalue. To this end, the with-carry subvalue may be decomposed into encryptions of respective subvalues of the subvalue. The resulting encryptions may then be added to encryptions of corresponding subvalues of the output value. In this way, the carry of that subvalue may be propagated to subvalues of higher index. In particular, let $\mathcal{C}^{rad} \in \mathrm{RadModInt}_s(m)$ be a ciphertext. For example, the carry reduction may be applied at an index $\alpha \in [0, \kappa-1]$ to encrypted subvalue $\mathcal{C}^{rad}[\alpha]$.

---

Algorithm. $C_{out}^{rad} \leftarrow RadModIntCT::\mathrm{ClearCarry}(C_{in}^{rad}, \alpha, PUB)$

---

$$\text{Context: } \begin{cases} \vec{p} := \left(C_{in}^{rad}[i]::\ p\right)_{i \in 0,\kappa-1} \\ \vec{\beta} := \left(C_{in}^{rad}[i]::\ \beta\right)_{i \in 0,\kappa-1} \\ s \in \mathbb{Z}^n\text{: the secret key} \end{cases}$$

$$\text{Input: } \begin{cases} C_{in}^{ari} \in RadModInt_s(m) \\ \alpha \in [0, \kappa - 1] \\ PUB\text{: public material for } PBS - KS \end{cases}$$

Output: $C_{out}^{rad} \in RadModInt_s(m)$

// decomposing the $\alpha^{th}$ block starting from the $\beta_{th}$

-continued

Algorithm. $C_{out}^{rad} \leftarrow RadModIntCT::\text{ClearCarry}(C_{in}^{rad}, \alpha, PUB)$ $C_{carry}^{rad} \leftarrow \text{Decompose}(C_{in}^{rad}[i]::deg[\alpha], (\beta_i)_{i\in\alpha\kappa-1}, (p_i)_{i\in\alpha,\kappa-1}, PUB)$ //padding the carry to fit with $C_{in}^{rad}[i]$ $C_{carry}^{rad} \leftarrow RadModIntCT::\text{Padding}(C_{in}^{rad}, \alpha, \vec{\beta}, \vec{p})$ // add carry blocks to the most significant blocks of $C_{in}^{rad}$ $C_{tmp}^{rad} \leftarrow RadModIntCT::\text{Add}(C_{in}^{rad}[\alpha+1, \kappa-1], C_{carry}^{rad}[\alpha+1, \kappa-1])$ // recompose the $C_{out}^{rad}$ $C_{out}^{rad} \leftarrow (C_{in}^{rad}[0, \alpha-1], C_{carry}^{rad}[\alpha], C_{tmp}^{rad})$ return $C_{out}^{rad}$ This operation may be applied if $$\forall\, i \in \alpha+1, \kappa-1, C_{in}^{rad}[i]::deg \le 1 - \frac{\beta_i - 1}{p_i - 1},$$

or, in terms of the internal state of the algorithm $$C_{carry}^{rad}, \text{ if } \forall\, i \in \alpha+1, \kappa-1, C_{in}^{rad}[i]::deg \le 1 - C_{carry}^{rad}[i]::deg.$$

The computational complexity may be $$\mathbb{C}_{RadModIntCT::ClearCarry}^{(n,l,k,N,\kappa,\alpha)} = \mathbb{C}_{Decompose}^{(n,l,k,N,\kappa,\alpha)} + \mathbb{C}_{RadModIntCT::Add}^{(n,\kappa-\alpha-l)}.$$

The following illustrates an encrypted carry-reduction operation by which a value encoded-and-encrypted with carry may be converted into an encoding-and-encryption without carry. To this end, encrypted carry-reductions may be applied to respective subvalues, starting from the least significant subvalue. In this way, the respective carries may be propagated. If a subvalue does not hold carry even after previous carry reductions, then its carry reduction may be skipped. In particular, let $\mathcal{C}^{rad} \in \text{RadModInt}_s(m)$ be a ciphertext. The following algorithm may be used:

Algorithm. $C_{out}^{rad} \leftarrow RadModIntCT::\text{ClearAllCarries}(C_{in}^{rad}, PUB)$ Context (s $\in \mathbb{Z}^n$: the secret key Input: $\begin{cases} C_{in}^{rad} \in RadModInt_s(m) \\ PUB: \text{public material for } PBS\text{-}KS \end{cases}$ Output: $C_{out}^{rad} \in RadModInt_s(m)$ $C_{out}^{rad} \leftarrow C_{in}^{rad}$ for $i \in [0, \kappa-1]$ do $C_{out}^{rad} \leftarrow RadModIntCT::\text{ClearCarry}(C_{out}^{rad}, i, PUB)$ return $C_{out}^{rad}$ This operation may be used if, $\forall i \in [0,\kappa-1]$ the parameters $$(C_{out}^{rad}, i)$$

allow ClearCarry to be used. The computational complexity may be $$\mathbb{C}_{RadModIntCT::ClearAllCarries}^{(n,l,k,N,\kappa)} = \sum_{i=0}^{k-1} \mathbb{C}_{RadModIntCT::ClearCarry}^{(n,l,k,N,\kappa,i)}.$$

The following illustrates an encrypted operation in which a value encoded-and-encrypted using the radix decomposition, is multiplied by a scalar, e.g., a known integer, λ. In this example this is done by multiplying the respective subvalues by the scalar, possibly in parallel. This algorithm is suitable for relatively small λ.

Algorithm. $C_{out}^{rad} \leftarrow RadModIntCT::SmallScalarMul(C_{in}^{rad}[i], \lambda)$ Context: $\begin{cases} s \in \mathbb{Z}^n: \text{the secret key} \\ \kappa := |C_{in}^{rad}| \end{cases}$ Input: $\begin{cases} C^{ari} \in ARadModInt_s(m) \\ \lambda \in \mathbb{N} \end{cases}$ Output: $C_{out}^{rad} \in RadModInt_s(\lambda \cdot m)$ for $i \in [0; \kappa-1]$ do $C_{out}^{rad} \leftarrow Arith::ScalarMul(C_{in}^{rad}, \lambda)$ return $C_{out}^{rad}$ This operation may be applied if $$\forall\, i \in 0, \kappa-1, C_{in}^{rad}[i]::deg \cdot \lambda \le 1.$$

The computational complexity may be $$\mathbb{C}_{RadModIntCT::SmallScalarMul}^{(n,\kappa)} = \kappa \cdot \mathbb{C}_{Arith::ScalarMul}^{(n)}.$$

The following illustrates an encrypted operation in which a value that is encrypted but not encoded, e.g., a subvalue of an encoded-and-encrypted value, is multiplied by a scalar λ. Interestingly, this operation can be used for relatively large scalars. The operation may result in an encoding-and-encryption of the product. The respective subvalues of the encoded-and-encrypted product may be computed by respective programmable bootstrapping operations corresponding to respective subvalues of the scalar. In particular, scalar multiplication between an integer in clear λ and a $\mathcal{C}^{ari}$ ciphertext $\mathcal{C}^{ari} \in \text{Arith}_s(m)$ may result into a $\mathcal{C}^{rad}$ ciphertext with a basis $(\vec{p}, \vec{\beta})$. This may be implemented as follows.

Algorithm. $C_{out}^{rad} \leftarrow RadModIntCT{::}\ ScalarMulDecomp(C^{ari}, \lambda, \vec{p}, \vec{\beta}, PUB)$ $$\text{Context:} \begin{cases} q := C^{ari}{::}\ q,\ p := C^{ari}{::}p,\ \beta := C_1^{ari}{::}\beta \\ s \in \mathbb{Z}^n\text{: the secret key} \\ \mu := (p-1)\cdot C^{ari}{::}\ deg \\ \gamma := \gamma_{\vec{\beta}}(\lambda\cdot\mu) \\ \{P_{r_{i,}}\}_{0\le j\le\gamma}\text{: a } LUT \text{ for } x \to r_{i,\vec{\beta}}(\lambda\cdot x)\cdot\dfrac{q}{2\cdot p_i} \end{cases}$$

$$\text{Input:} \begin{cases} C^{ari} \in Arith_s(m) \\ \lambda \in \mathbb{N} \\ (\vec{p}, \vec{\beta}) \in \mathbb{N}^{\kappa^2} \\ PUB\text{: public material for } PBS{-}KS \end{cases}$$

Output: $C_{out}^{ari} \in Arith_s(\lambda\cdot m)$ for $i \in [0, \gamma]$ do $C_{out}^{rad}[i] \leftarrow PBS{-}KS(C^{ari}, PUB, P_{r_{i,\vec{\beta}}})$ $C_{out}^{rad}[i]{::}\ deg \leftarrow \min\left(\dfrac{\beta_i - 1}{p_i - 1}, \dfrac{q_{i-1}(\lambda\cdot\mu)}{p_i - 1}\right)$ return $C_{out}^{rad}$ This operation may be used if $\mu \le p-1$. The computational complexity may be $$\mathbb{C}_{RadModIntCT::ScalarMulDecomp}^{(n,\ell,k,N,\gamma)} = (\gamma+1)\cdot\mathbb{C}_{PBS-KS}^{(n,\ell,k,N)}.$$

The following illustrates an encrypted operation in which a value encoded-and-encrypted using the radix decomposition, is multiplied by a scalar λ. This operation may be implemented by performing scalar multiplications of respective subvalues by the scalar λ, resulting in respective encoded-and-encrypted products, and combining the resulting encoded-and-encrypted products. Interestingly, this operation can also be used for relatively large scalars. In particular, let $\lambda \in \mathbb{N}$ and $\mathcal{C}^{rad} \in \mathrm{RadModInt}_s(m)$. This operation may be implemented as follows:

Algorithm. $C_{out}^{rad} \leftarrow RadModInt{::}\ ScalarMul(C^{rad}, \lambda, PUB)$ $$\text{Context:} \begin{cases} \kappa := |C_{out}^{rad}| \\ \beta_i := C^{rad}[i]{::}\ \beta,\ p_i := C^{rad}[i]{::}\ p,\ deg_i := C^{rad}[i]{::}\ deg \\ \vec{\beta_i} := \vec{\beta}[i, \kappa-1],\ \vec{p_i} := \vec{p}[i, \kappa-1] \\ \mu_i := (p_i - 1)\cdot deg_i \\ \gamma_i := \gamma_{\vec{\beta_i}}(\lambda\cdot u_i) \\ \{P_{r_{j,\vec{\beta_i}}}\}_{0\le j\le\gamma_i, 0\le i\le\kappa-1}\text{: a } LUT \text{ for } x \to r_{j,\vec{\beta_i}}(\lambda\cdot x)\cdot\dfrac{q}{2\cdot p_{i+j}} \end{cases}$$

$$\text{Input:} \begin{cases} C_{in}^{rad} \in RadModInt_s(m) \\ \lambda \in \mathbb{N} \\ PUB\text{: public material for } PBS{-}KS \end{cases}$$

Output: $C_{out}^{rad} \in RadModInt_s(\lambda\cdot m)$ for $i \in [0; \kappa-1]$ do // scalar multiply-decompose one block $C_{tmp}^{rad} \leftarrow RadModIntCT{::}\ ScalarMulDecomp(C^{rad}[i], \lambda, (\vec{p_i}, \vec{\beta_i}), PUB)$ // pad the result -continued Algorithm. $C_{out}^{rad} \leftarrow RadModInt{::}\ ScalarMul(C^{rad}, \lambda, PUB)$ $C_{tmp}^{rad} \leftarrow RadModIntCT{::}\ \text{Padding}(C_{tmp}^{rad}, i, \vec{p}, \vec{\beta})$ // add the results of the scalar multiplications together $C_{out}^{rad} \leftarrow RadModIntCT{::}\ \text{Add}(C_{out}^{rad}, C_{tmp}^{rad})$ return $C_{out}^{rad}$ This operation may be used if the subroutines RadModIntCT::ScalarMulDecomp and RadModIntCT::Add can be applied to their respective inputs. The computational complexity may be $$\mathbb{C}_{RadModInt::ScalarMul}^{(n,\ell,k,N,\kappa,\{\gamma_i\}_{0\le i\le\kappa-1})} = \kappa\cdot\mathbb{C}_{RadModIntCT::Add}^{(n,\kappa)} + \sum_{i=0}^{\kappa-1}\mathbb{C}_{RadModIntCT::ScalarMulDecomp}^{(n,\ell,k,N,\gamma_i)}.$$

The following illustrates an encrypted multiplication between respective values that are encrypted but not encoded, e.g., between subvalues of one or two different encoded-and-encrypted values. The encrypted multiplication may result in an encoded-and-encrypted value. The input values may be combined into a single encrypted value by scaling and addition, and the respective subvalues of the encoded-and-encrypted value may be determined by applying respective programmable bootstrappings. In particular, two compatible $\mathcal{C}^{ari}$ ciphertexts $$C_1^{ari} \in Arith_s(m_1)$$

and $$C_2^{ari} \in Arith_s(m_2)$$

may be multiplied. The result may be decomposed into a $\mathcal{C}^{rad}$ ciphertext with a basis $(\vec{p}, \vec{\beta})$ such that $$(\vec{p}[0], \vec{\beta}[0]) = (C_1^{ari}{::}p, C_1^{ari}{::}\beta).$$

Algorithm. $C_{out}^{rad} \leftarrow RadModIntCT{::}\ MulDecomp(C_1^{ari}, C_2^{ari}, \vec{p}, \vec{\beta}, PUB)$ $$\text{Context:} \begin{cases} q := C_1^{ari}{::}\ q,\ p := C_1^{ari}{::}\ p,\ \beta := C_1^{ari}{::}\ \beta \\ s \in \mathbb{Z}^n\text{: the secret key} \\ \mu_i := (p-1)\cdot C_i^{ari}{::}\ deg + 1,\ i \in [1, 2] \\ \gamma := \gamma_{\vec{\beta}}((\mu_1 - 1)\cdot(\mu_2 - 1)) \\ \{P_{r_{i,}}\}_{0\le i\le\gamma}: a\ LUT \text{ for } x \to r_{i,\vec{\beta}}\left((x \bmod \mu_1)\cdot\left\lfloor\dfrac{x}{\mu_1}\right\rfloor\right)\cdot\dfrac{q}{2\cdot p_i} \end{cases}$$

-continued

Algorithm. $C_{out}^{rad} \leftarrow RadModIntCT::\ MulDecomp\left(C_1^{ari}, C_2^{ari}, \vec{p}, \vec{\beta}, PUB\right)$ Input: $\begin{cases} C_1^{ari} \in Arith_s(m_1) \\ C_2^{ari} \in Arith_s(m_2) \\ \left(\vec{p}, \vec{\beta}\right) \in \mathbb{N}^{\kappa^2} \\ PUB\text{: public material for } PBS-KS \end{cases}$ Output: $C_{out}^{ari} \in Arith_s(m_1 \cdot m_2)$ // shift $m_2$ by a factor $\mu_1$ $C_{2,tmp}^{ari} \leftarrow Arith::\ ScalarMul\left(C_2^{ari}, \mu_1\right)$ // build a plaintext where we have $m_1 \| m_2$ $C_{tmp}^{ari} \leftarrow Arith::\ \mathrm{Add}\left(C_1^{ari}, C_{2,tmp}^{ari}\right)$ // compute the multiplication-decomposition with PBS for $i \in [0, \gamma]$ do $C_{out}^{rad}[i] \leftarrow PBS-KS\left(C_{tmp}^{ari}, PUB, P_{r_{i,\vec{\beta}}}\right)$ $C_{out}^{rad}[i]::\ deg \leftarrow \min\left(\frac{\beta_i - 1}{p_i - 1}, \frac{q_{i-1,\vec{\beta}}((\mu_1 - 1)\cdot(\mu_2 - 1))}{p_i - 1}\right)$ return $C_{out}^{rad}$ This operation may be used if Arith::ScalarMul can be applied to $$C_2^{ari},$$

The computational complexity may be $$\mathbb{C}_{RadModIntCT::MulDecomp}^{(n,\ell,k,N,\mu_1,\gamma)} = \mathbb{C}_{Arith::ScalarMul}^{(n,\mu_1)} + \mathbb{C}_{Arith::Add}^{(n)} + (\gamma + 1)\cdot\mathbb{C}_{PBS-KS}^{(n,\ell,k,N)}.$$

The following illustrates an encrypted multiplication between an encrypted-but-not-encoded value, and an encoded-and-encrypted value. This operation may be implemented by multiplying the respective subvalues of the encoded-and-encrypted value by the encrypted-but-not-encoded value, resulting in respective encoded-and-encrypted products; and combining the encoded-and-encrypted products. In particular, let $C^{ari} \in \mathrm{Arith}_s(m_1)$ and $C^{rad} \in \mathrm{RadModInt}_s(m_2)$, then the homomorphic multiplication of $m_1$ and $m_2$ may be implemented as follows:

Algorithm. $C_{out}^{rad} \leftarrow RadModIntCT::\ OneBlockMul\left(C^{ari}, C^{rad}, PUB\right)$ Context: $\begin{cases} \kappa := \left|C^{rad}\right| \\ \beta_i := C^{rad}[i]::\ \beta,\ p_i := C^{rad}[i]::\ p,\ deg_i := C^{rad}[i]::\ deg \\ \vec{\beta_i} := \vec{\beta}[i, \kappa - 1],\ \vec{p_i} := \vec{p}[i, \kappa - 1] \\ \mu := C^{ari}::\ deg\cdot\left(C^{ari}::\ p - 1\right) + 1 \\ \mu_i := (p_i - 1)\cdot\ deg_i + 1 \\ \gamma_i := \gamma_{\vec{\beta_i}}((\mu - 1)\cdot(\mu_i - 1)) \\ \left\{P_{r_{j,\vec{\beta_i}}}\right\}_{0 \le j \le \gamma_i, 0 \le i \le \kappa - 1} : a\ LUT\ \text{for } x \to \\ \qquad r_{j,\vec{\beta_i}}\left((x \bmod \mu)\cdot\left\lfloor\frac{x}{\mu}\right\rfloor\right)\cdot\frac{q}{2\cdot p_{i+j}} \end{cases}$ Input: $\begin{cases} C_1^{ari} \in Arith_s(m_1) \\ C_2^{rad} \in RadModInt_s(m_2) \\ PUB\text{: public material for } PBS-KS \end{cases}$ Output: $C_{out}^{rad} \in RadModInt_s(m_1 \cdot m_2)$ for $i \in [0, \kappa - 1]$ do // put two blocks in the same basis $C_{m_{1,i}}^{ari} \leftarrow Arith::\ \mathrm{BasisChange}\left(C^{ari}, p_i, \beta_i, PUB\right)$ // multiply-decompose the two blocks $C_{tmp}^{rad} \leftarrow RadModIntCT::\ MulDecomp\left(C_{m_{1,i}}^{ari}, C^{rad}[i], \left(\vec{p_i}, \vec{\beta_i}\right), PUB\right)$ // pad the result $C_{tmp}^{rad} \leftarrow RadModIntCT::\ \mathrm{Padding}\left(C_{tmp}^{rad}, i, \vec{\beta}, \vec{p}\right)$ // add the results of the multiplications together $C_{out}^{rad} \leftarrow RadModIntCT::\ \mathrm{Add}\left(C_{out}^{rad}, C_{tmp}^{rad}\right)$ return $C_{out}^{rad}$ This operation may be used if, $\forall i \in 0, \kappa-1$, RadModIntCT::MulDecomp and RadModIntCT::Add can be applied to their respective arguments. The computational complexity may be $$\mathbb{C}_{RadModIntCT::OneBlockMul}^{(n,\ell,k,N,\kappa,\mu,\{\gamma_i\}_{0\le i\le\kappa-1})} = \kappa\cdot\left(\mathbb{C}_{Arith::BasisChange}^{(n,\ell,k,N)} + \mathbb{C}_{RadModIntCT::Add}^{(n,\kappa)}\right) + \sum_{0=1}^{\kappa-1}\mathbb{C}_{RadModIntCT::MulDecomp}^{(n,\ell,k,N,\mu,\gamma_i)}.$$

The following illustrates an encrypted multiplication of first and second encoded-and-encrypted values. This multiplication may be implemented by multiplying respective subvalues of the first and second encoded-and-encrypted values, with these multiplications resulting in encoded-and-encrypted results; and combining, e.g., adding, the encoded-and-encrypted results. In particular, e.g., in terms of the operation OneBlockMul discussed above, the encrypted multiplication may be implemented by multiplying respective subvalues of the first encoded-and-encrypted value by the second encrypted value. In particular, given two ciphertexts $$C_1^{int} \in RadModInt(m_1)$$

and $$C_2^{int} \in RadModInt(m_2),$$

multiplication-decompositions may be computed between pairs of blocks $$\left(C_1^{int}[i], C_2^{int}[j]\right)$$

with $$i \in \left[0, \left|C_1^{int}\right| - 1\right],\ j \in \left[0, \left|C_2^{int}\right| - 1\right].$$

It is noted that the encoded-and-encrypted inputs $$C_1^{int}$$

and $$C_2^{int}$$

do not need to be compatible. In this example, the result of the multiplication is expressed in the base of $$C_2^{int}.$$

---

Algorithm. $C_{out}^{rad} \leftarrow RadModInt::\ Mult\left(C_1^{rad}, C_2^{rad}, PUB\right)$

---

Context: $\begin{cases} \kappa_j := \left|C_i^{rad}\right|,\ j \in 1, 2 \\ \mu_{j,i} := C_j^{rad}[i]::deg \cdot \left(C_j^{rad}[i]::p - 1\right) + 1,\ j \in [1, 2],\ i \in [0, \kappa_j - 1] \\ \beta_i := C_2^{rad}[i]::\beta,\ p_i := C_2^{rad}[i]::p \\ \vec{\beta} := C_2^{rad}::\vec{\beta},\ \vec{p} := C_2^{rad}::\vec{p} \\ \vec{\beta_i} := \vec{\beta}[i, \kappa - 1],\ \vec{p_i} := \vec{p}[i, \kappa - 1] \\ \gamma_{i,j} := \gamma_{\overrightarrow{\beta_J}}((\mu_{1,i} - 1) \cdot (\mu_{2,j} - 1)) \\ \left\{P_{i, r_k, \overleftarrow{\beta_J}}\right\}_{0 \le i \le \kappa_1 - 1, 0 \le j \le \kappa_2 - 1, 0 \le \kappa \le \gamma_{i,j}}; \\ \text{a } LUT \text{ for } x \to r_{\kappa, \overleftarrow{\beta_J}}\left((x \bmod \mu_i) \cdot \left\lfloor \frac{x}{\mu_i} \right\rfloor\right) \cdot \frac{q}{2 \cdot p_{k+j}} \end{cases}$ Input: $\begin{cases} C_i^{rad} \in RadModInt_s(m_i),\ i \in 1, 2 \\ PUB\text{:public material for } PBS - KS \end{cases}$ Output: $C_{out}^{rad} \in RadModInt(m_i \cdot m_2)$ for $i \in [0; \kappa_1 - 1]$ do -continued

---

Algorithm. $C_{out}^{rad} \leftarrow RadModInt::\ Mult\left(C_1^{rad}, C_2^{rad}, PUB\right)$

---

// Put the block to the right basis to start the multiplication-decomposition $C_{tmp}^{ari} \leftarrow Arith::BasisChange\left(C_1^{rad}[i], p_0, \beta_0, PUB\right.$ // Compute the multiplication-decomposition $C_{tmp}^{rad} \leftarrow RadModIntCT::OneBlockMul\left(C_{tmp}^{ari}, C_2^{rad}, PUB\right)$ // Add the results of the multiplications together $C_{out}^{rad} \leftarrow RadModIntCT::\text{Add}\left(C_{out}^{rad}, C_{tmp}^{rad}\right)$ return $C_{out}^{rad}$

---

This operation may be used if the parameters if ∀i∈[0,κ$_1$−1], RadModIntCT::OneBlockMul and RadModIntCT::Add can be applied to their respective parameters. The computational complexity may be $$\mathbb{C}_{RadModInt::Mult}^{\left(n,\ell,k,N,\kappa\{\mu_{1,i}\}_{0\le i\le\kappa-1},\{\gamma_{i,j}\}_{0\le i\le\kappa_1-1,0\le j\le\kappa_2-1}\right)} = \kappa_1 \cdot \left(\mathbb{C}_{Arith::BasisChange}^{(n,\ell,k,N)} + \mathbb{C}_{RadModIntCT::Add}^{(n,\kappa)}\right) + \sum_{i=0}^{\kappa_1-1} \mathbb{C}_{RadModIntCT::OneBlockMul}^{\left(n,\ell,k,N,\kappa_2,\mu_{1,i},\{\gamma_{i,j}\}_{0\le j\le\kappa_2-1}\right)}.$$

It is also possible to perform an encrypted evaluation of a univariate function on a value encoded-and-encrypted using a radix decomposition. For example, the univariate function being evaluated may be an inverse or a division. This operation can be implemented in various ways.

One way to evaluate a univariate function is by applying a tree programmable bootstrapping. The use of a tree programmable bootstrapping to evaluate a large look-up table on multiple ciphertexts encoding one input of the look-up table is known per se from A. Guimarães et al., "Revisiting the functional bootstrap in TFHE", IACR Trans. Cryptogr. Hardw. Embed. Syst., 2021(2):229-253, 2021 (incorporated herein by reference). This reference uses plaintext integers that are all encrypted under the same basis β. Interestingly, the inventors realized that these techniques are also applicable in the present setting, in particular also when not all basis elements of the radix decomposition are the same. This way, a multi-radix tree programmable bootstrapping can be obtained.

Specifically, let $$P = \left[l_0, l_1, \ldots, l_{\prod_{i=0}^{\kappa-1}\beta_i - 1}\right]$$

be a look-up table with $$\prod_{i=0}^{\kappa-1}\beta_i$$

elements. This look-up table may be applied to an encoded-and-encrypted value $\mathcal{C}^{rad}$ encrypting an x with a multi-radix representation:

$$x = x_0 + \sum_{i=1}^{\kappa-1} x_i \prod_{j=0}^{i-1} \beta_j.$$

Univariate function evaluation using the multi-radix tree PBS may take as input a $\mathcal{C}^{rad}$ ciphertext and a large look-up table P and return a $\mathcal{C}^{ari}$ ciphertext, and may be denoted:

$$C_{out}^{ari} \leftarrow RadModInt::TreePBS(C_{in}^{rad}, PUB, P).$$

The multi-radix tree programmable bootstrapping may be implemented iteratively by in an iteration, selecting a largest remaining basis element, splitting the remaining lookup table according to the largest remaining basis element, and applying programmable bootstrappings to the respective lookup table components using the subvalue corresponding to the largest remaining basis element as selector, and combining the results into an updated lookup table.

In particular, let $B=\{\beta_i|i\in 0,\kappa-1\}$ and let $\vartheta(\beta)$ be the component of x associated to $\beta$. In an iteration, define $\beta_{max}=\max(\beta\in B)$. Split P into $$v = \frac{\prod_{\beta_i\in B}\beta_i}{\beta_{max}}$$

smaller look-up tables that each contain $\beta_{max}$ different elements of P. Compute a PBS on each of the v look-up tables using the ciphertext encrypting $\vartheta(\beta_{max})$ as a selector. The new large look-up table P is composed of the results of the v iterations of the PBS. Remove $\beta_{max}$ from $B:B=B-\beta_{max}$. This iterative process may be repeated until B is empty. In the first iteration, the splitting may be performed on a plaintext look-up table P; in next iterations, splitting may be performed using key-switching.

Concerning the computational complexity, in the worst case, $\beta_i=\beta_{max}$ for all $i\in[0,\kappa-1]$. Therefore, the worst-case complexity in terms of PBS may be $$\mathbb{C}_{RadModInt::TreePBS}^{(n,\ell,k,N,\kappa)} = \sum_{i=0}^{\kappa-1}\beta_{max}^{i}\cdot\mathbb{C}_{PBS-KS}^{(n,\ell,k,N)} = \frac{1-\beta_{max}^{\kappa}}{1-\beta_{max}}\cdot\mathbb{C}_{PBS-KS}^{(n,\ell,k,N)}.$$

A particularly efficient technique for performing a function evaluation on an encoded-and-encrypted value is now discussed. This technique operates by extracting the bits needed to evaluate the function from the respective encrypted subvalues; converting the extracted bits to GGSW ciphertexts; and applying a lookup table to the respective GGSW ciphertexts. The technique is illustrated for univariate function evaluation but applies to multivariate function evaluation as well.

The inventors realized that, in the present setting, this approach has several advantages over using a programmable bootstrapping based directly on a blind rotation (although it will be understood that this approach may also indirectly use a programmable bootstrapping based on blind rotation, e.g., for the conversion to GGSW).

By operating bitwise, at the level of an individual subvalue, it is avoided to use a blind rotation with a polynomial that scales exponentially in the size of the message modulus and/or carry message modulus. As a consequence, the proposed univariate function evaluation can operate on subvalues with larger message moduli and/or carry-message moduli, e.g., the size of the message modulus and/or carry-message modulus of a subvalue may be at least 10, at least 13, at least 15, or at least 16 bits. By using larger moduli for the subvalues, the efficiency of computing on encoded-and-encrypted values may greatly improve. In particular, fewer carry-reductions may be needed, because the encrypted subvalue may have more room for carry and/or fewer encrypted subvalues may be needed to represent a given value.

Moreover, at the level of the overall encoded-and-encrypted value, the proposed univariate function evaluation also provides a greatly improved scaling in the size of the encrypted values, because a lookup table can be applied to the respective GGSW ciphertexts much more efficiently, e.g., using mixed packing, than using a Tree-PBS. In particular, whereas the Tree-PBS may scale exponentially in the number of subvalues, the application of lookup table to GGSW ciphertexts of bits can be performed much more efficiently, for example, even linear in the number of subvalues.

Another advantage of the proposed univariate function evaluation is that there is no need for a bit of padding at the most significant bit of the encrypted value, e.g., it does not need to be ensured that the most significant bit remains zero, as is the case for some existing implementations of programmable bootstrapping. This means that with a given ciphertext modulus q, a higher precision can be obtained.

Further efficiency improvements are offered by the improved univariate function evaluation because it is possible to round respective encrypted subvalues to a desired precision before applying the LUT. Moreover, multiple univariate function evaluations can be performed on the same input(s) using the same GGSW-encrypted bits, making it particularly efficient to apply multiple functions.

The proposed WoP-PBS may take as input a bootstrapping key, and a LUT L that may or may not be encrypted. The WoP-PBS may output the homomorphic evaluation of the LUT on the input message, e.g., a LWE or GLWE encryption of L[m].

In particular, bits may be extracted from the encrypted subvalues by extracting respective least significant bits using a programmable bootstrapping that is scaled such that it operates on the respective bit as least significant bit. This operation can be performed efficiently using a generalized programmable bootstrapping e.g. as proposed in I. Chillotti et al., "Improved programmable bootstrapping with larger precision and efficient arithmetic circuits for TFHE" (incorporated herein by reference). In particular, the generalized programmable bootstrapping may comprise a modulus switching that reads directly next to the bit to be extracted, and it may be used to evaluate the sign function re-scaled to the j-th bit.

In many cases, all bits of the input value may be extracted, but, if the function does not depend on one or more bits (e.g., the function only uses a number of least significant bits), extracting these bits may be avoided, further improving efficiency.

When using the described generalized programmable bootstrapping, further improvements are possible by choosing a value of $\vartheta>0$ and using a PBSmanyLUT as described in "Improved programmable bootstrapping with larger precision and efficient arithmetic circuits for TFHE". The programmable bootstrapping also need not be applied for each bit e.g. if at the moment of the extraction of the information from the inputs the bit extracted is already at the right re-scaling (or close to it).

To convert the bits to GGSW ciphertexts, it is for example possible to use circuit bootstrapping, e.g., see I. Chillotti et al., "Faster packed homomorphic operations and efficient circuit bootstrapping for TFHE", proceedings of ASIA- CRYPT 2017 (incorporated herein by reference). For the circuit bootstrapping, it is noted that its second step may be improved similarly to H. Chen et al., "Onion ring ORAM: efficient constant bandwidth oblivious RAM from (leveled) TFHE", proceedings CCS 2019 (incorporated herein by reference). Namely, an initial not-functional LWE-to-GLWE KS may be applied to the outputs of the programmable bootstrappings, and an external product times the GGSW encryption of the GLWE secret key may be performed.

noted that although the improved univariate function evaluation typically internally uses a programmable bootstrapping based on blind rotation (e.g., a circuit bootstrapping may involve a constant number of programmable bootstrappings, etc.), at a higher level the improved univariate function evaluation may be used to replace programmable bootstrappings performed in the encrypted computation, especially when applied with large message moduli.

In particular, a univariate function evaluation based on conversion to bits may be implemented as follows:

---

Algorithm. $ct_{out} \leftarrow$ WoP − PBS(($ct_0, \ldots, ct_{\kappa-1}$), PUB, L)

---

Context:
$$\begin{cases} \Delta_i: \text{scaling factor for the ciphertext } ct_i \\ \delta_i: \text{bits occupied by message in ciphertext } ct_i \text{ starting from } \Delta_i \\ \Omega = 2\sum_{i=0}^{\kappa-1}\delta_i \\ (\beta_{CB}, \ell_{CB}): \text{base and level of output } GGSW \text{ ciphertexts to circuits bootstrapping} \\ (\kappa, \vartheta) \in \mathbb{N}\times\mathbb{N} \text{ defining the modulu } sswitching \text{ in the} \\ generalizedPBS \end{cases}$$

Input:
$$\begin{cases} (ct_0, \ldots ct_{\kappa-1}): LWE \text{ ciphertexts encrypting } msg = (m_0, \ldots m_{\kappa-1}) \\ \text{with for all } 0 \le i < \kappa, \text{Decode(Decrypt}(ct_i)) = m_i \\ PUB: \text{public keys for the algorithm} \\ L = [l_0, l_1, \ldots, l_{\Omega-1}]: \text{a } LUT, \text{ s.t.} l_h \in \mathbb{Z}_\omega \end{cases}$$

Output: $ct_{out}$ encrypting $l_{msg}$ for i ∈ [0; κ− 1] do
  for j ∈ [0; $\delta_i$ − 2] do
    // extract from the LSB of the message using generalized PBS, e.g., see [CLOT21]

$$\alpha_{ij} = \frac{\Delta_i \cdot 2^j}{2}$$

$L_{i,j} = [-\alpha_{i,j}, \ldots, -\alpha_{i,j}]$
    $c_i \leftarrow$ KS − PBS($ct_i + (0, \ldots, 0, \alpha_{i,j})$, PUB, $L_{i,j}$, ($\varkappa = \log_2({}_{66\ i}) + j, \vartheta = 0$))
    $c'_i \leftarrow c_i - (0, \ldots, 0, \alpha_{i,j})$
    // subtract the extracted bit from the origial ciphertext
    $ct_i \leftarrow$ Sub($ct_i$, $c_{i'}$)
    // circuit bootstrap the extracted bit into a GGSW, e.g., see [CGGI20]
    $\overline{C}_{i,j} \leftarrow$ CircuitBootstrap($c'_i$, PUB, ($\beta_{CB}$, $\ell_{CB}$), ($\varkappa = \log_2(\Delta_i) + j, \vartheta = 0$))
  // circuit bootstrap the last bit into a GGSW, e.g., see [CGGI20]
  $\overline{C}_{i,j} \leftarrow$ CircuitBootstrap($ct_i$, PUB, ($\beta_{CB}$, $\ell_{CB}$), ($\varkappa = \log_2(\Delta_i) + 67_{\ i} - 1, \vartheta = 0$))
// Vertical Packing LUT evaluation, e.g., see [CGGI20]

$$ct_{out} \leftarrow VPLut\left(\left\{\overline{\overline{C}}_{i,j}\right\}_{i\in 0;\kappa-1}^{j\in 0;\delta_i-1}, L\right)$$

return $ct_{out}$

---

Thereby, the size of public evaluation keys may be reduced, and efficiency may be improved by virtue of using an FFT.

A lookup table may be efficiently applied to the GGSW ciphertexts by using a packing lookup table evaluation, e.g., see I. Chillotti et al., "Faster packed homomorphic operations and efficient circuit bootstrapping for TFHE", proceedings of ASIACRYPT 2017 (incorporated herein by reference). Generally, such a packing LUT evaluation may use mixed packing, of which horizontal and vertical packing are two particular examples.

Interestingly, the above approach works on encoded-and-encrypted values, regardless of whether carry is used; and it also works on values that are encrypted but not encoded as respective subvalues. Also in the latter case, many of the discussed advantages apply. Accordingly, a method of performing an encrypted computation and an encrypted computation device are envisaged that use the described univariate function evaluation, without necessarily also using carry or encoded-and-encrypted values. In general, it is Although the above example illustrates vertical packing, it is also possible to use horizontal or mixed packing. Moreover, it is also possible to output a GLWE ciphertext instead of a LWE ciphertext as illustrated above. The above example moreover generalizes to multivariate function evaluation with multiple encoded-and-encrypted inputs (e.g., at least two or at least three) by extracting the desired bits from the respective inputs and applying the lookup table to the bits from the respective inputs.

As also discussed elsewhere, performing an encrypted computation may comprise keeping track of degrees of fullness of respective with-carry subvalues. If a with-carry subvalue that is to be computed has a degree of fullness indicating that the corresponding carry-message modulus may be exceeded, an encrypted carry-reduction may be applied prior to computing the with-carry subvalue. In particular, the encrypted carry-reduction operation can be performed before the encrypted operation or during the encrypted operation, as needed. An operation that is configured to automatically perform the carry-reduction when needed to ensure that the carry-buffer does not overflow, is referred to as a "smart" operation.

Figure 5:
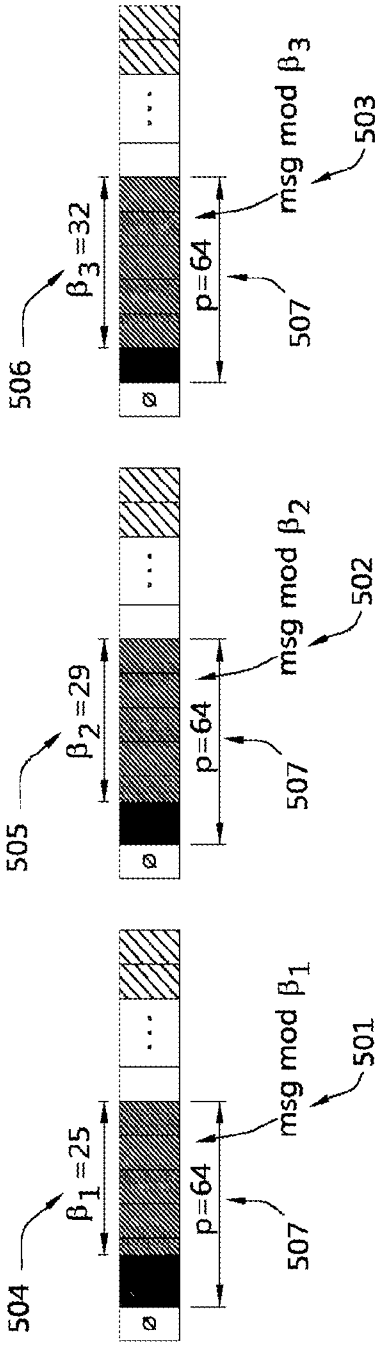
FIG. 5 schematically shows an example of a value encoded-and-encrypted based on a residue number system representation.

FIG. 5 schematically shows an example of a value encoded-and-encrypted based on a residue number system representation. It is demonstrated how, in an encrypted computation, various encrypted operations can be applied to such encoded-and-encrypted value.

Such an encrypted computation may involve the use of carry in encoded-and-encrypted values, but this is not needed, e.g., a carry reduction may be applied directly after each operation or sub-operation described herein so that encrypted operations are only applied to values that are encoded-and-encrypted without carry.

In particular, the mapping between the value and its subvalues may be according to a residue number system representation, in particular, based on the Chinese Remainder Theorem (CRT). The encoded-and-encrypted value may be encrypted as encryptions of κ subvalues with respective message moduli $\beta_i$, $0 \le i \le \kappa-1$. Typically, the moduli $\beta_i$, $\beta_j$, $i \ne j$, are pairwise co-prime enabling to use the CRT to reconstruct the value from the subvalues. Generally, any modulus can be used as carry-message modulus, for example, the subvalues may use a common carry-message modulus. To encrypt a value into an encoded-and-encrypted value, a CRT representation of the value may be computed, and the respective elements of the representation may be encrypted. Similarly, the inverse CRT may be used to decode an encoded-and-encrypted value.

Interestingly, the use of a residue number system encoding may provide particularly efficient encrypted carry-reduction. In particular, carry-reduction may be performed by performing respective modulo reductions for the respective subvalues, e.g., no carries may be forwarded from one subvalue to a next one. This makes the carry-reduction fast and multithread-friendly. For example, one, more, or all of the message moduli may be at least 2 and/or at most 32. For example, one, more, or all of the message moduli may be at least 3, at least 5, or at least 10. In particular, the figure illustrates a value being encoded-and-encrypted as encryptions of three respective subvalues 501, 502, 503 defined modulo respective message moduli 504, 505, 506, equal to 25, 29, and 32, respectively. Accordingly, the encoded-and-encrypted value may be defined modulo M=32×29×25, with κ=3. A common carry-message modulus 507, equal to 64, is used in this example.

In particular, an encoding of a value into subvalues may be determined as follows:

Algorithm. e,otl m ← CrtEncode(m, $\vec{p}$, $\vec{\beta}$)

$$\text{Context:}\begin{cases} q \in \mathbb{Z}\text{: the ciphertext modulus} \\ \forall\, 0 \le i < \kappa,\ \beta_i \le p_i \\ \forall\, 0 \le i,\ j < \kappa,\ i,\ \beta_i \text{ coprime with } \beta_i \\ \kappa \in \mathbb{N}\text{: block number} \\ M = \prod_{i=0}^{\kappa-1} \beta_i \in \mathbb{Z}\text{: the modulus outside of the } CRT \end{cases}$$

$$\text{Input:}\begin{cases} m \in \mathbb{Z}_M\text{: a message} \\ \vec{p} = (p_0, \ldots, p_{\kappa-1})\text{: a list of the carry-message moduli} \\ \vec{\beta} = (\beta_0, \ldots, \beta_{\kappa-1})\text{: a list of } CRT \text{ moduli} \end{cases}$$

Output: $\tilde{m} = (\tilde{m}_0, \ldots, \tilde{m}_{\kappa-1}) \in \mathbb{Z}_q^{\kappa}$ -continued Algorithm. e,otl m ← CrtEncode(m, $\vec{p}$, $\vec{\beta}$)

```
for 0 ≤ i < κ do
  // compute the CRT
  m_i ← m mod β_i
  // encoding
  m̃_i ← Encode(m_i, p_i, β_i)
return m̃:= (m̃_0, . . . , m̃_{κ−1})
```

Some notation concerning encodings based on a residue number system is now introduced. Let $\vec{\beta}=(\beta_0, \beta_1, \beta_2, \ldots, \beta_{\kappa-1}) \in \mathbb{Z}^{\kappa}$ be an CRT base such that for all $0 \le i, j < \kappa$, the pair of integers $(\beta_i, \beta_j)$ is co-prime when $i \ne j$. The associated total CRT-modulus τ may be defined as $$\tau = \prod_{i=0}^{\kappa-1} \beta_i.$$

To encode-and-encrypt a value m mod τ, its respective residues $m_i = m \bmod \beta_i$ modulo the respective basis may be encrypted as k different Arith ciphertexts.

To decrypt a value m encoded-and-encrypted using this CRT representation over multiple Arith ciphertexts, first, the Arith ciphertexts encrypting the subvalues may be decrypted. Then, the encrypted integer may be decoded modulo τ as is known per se.

Accordingly, a CrtModInt ciphertext $\mathcal{C}^{crt}$ encrypting an integer $m \in \mathbb{Z}_\beta$ under the CRT base $\vec{\beta}=(\beta_0, \ldots, \beta_{\kappa-1})$ with $$\tau = \prod_{i=0}^{\kappa-1} \beta_i$$

may be defined as:

$$C^{crt} = (C_0^{ari}, \ldots, C_{\kappa-1}^{ari}) \in CrtModInt(m),$$

where, for all $$0 \le i < \kappa,\ C_i^{ari} \in Arith_s(m_i),$$

and $$C_i^{ari}::\beta = \beta_i$$

and $m \equiv m_i \bmod \beta_i$. The ith Arith ciphertext may be denoted $\mathcal{C}^{crt}[i]$. As also discussed elsewhere, the ciphertexts $$C_i^{ari}$$

may each be according to a common encryption key, but this is not strictly needed.

Two CrtModInt ciphertexts $$C_1^{crt}$$

and $$C_2^{crt}$$

may be referred to as being compatible if $$|C_1^{crt}| = |C_2^{crt}|$$

and if:

$$\forall\, 0 \le i < \kappa \begin{cases} C_1^{crt}[i]::p = C_2^{crt}[i]::p \\ C_1^{crt}[i]::q = C_2^{crt}[i]::q \\ C_1^{crt}[i]::\beta = C_2^{crt}[i]::\beta \end{cases}.$$

Various operations on values encoded-and-encrypted using the CRT are now discussed. Interestingly, when using the CRT representation, in many cases, an encrypted operation can be applied by applying respective sub-operations separately to the respective encryptions of the subvalues of the input values. This makes the operations efficient to implement and parallelizable. This is the case in particular for addition, subtraction, and multiplication.

In particular, homomorphic addition may be implemented by adding blocks of same index together, e.g.:

Algorithm. $C_{out}^{crt} \leftarrow CrtModInt::\mathrm{Add}(C_1^{crt}, C_2^{crt})$ Context: $(\kappa := |C_1^{crt}| = |C_2^{crt}|$ Input: $\begin{cases} C_1^{crt} \in CrtModInt(m_1) \\ C_2^{crt} \in CrtModInt(m_2) \end{cases}$ Output: $C_{out}^{crt} = CrtModInt(m_1 + m_2)$ for i $\in [0; \kappa - 1]$ do set $C_i^{ari} := Arith::\mathrm{Add}(C_1^{crt}[i], C_2^{crt}[i])$ return $C_{out}^{crt} := CrtModInt\{(C_0^{ari}, \ldots, C_{\kappa-1}^{ari})\}$ This operation may be applied if the inputs are compatible, and ∀0≤i<κ, Arith::Add can be applied. Computational complexity may be $$\mathbb{C}_{crtModInt:::Add}^{(n,\kappa)} = \kappa \cdot (n+1) = O(\kappa \cdot n).$$

Also homomorphic subtraction may be implemented by subtracting blocks of same index, e.g.:

Algorithm. $C_{out}^{crt} \leftarrow CrtModInt::Sub(C_1^{crt}, C_2^{crt})$

Input: $\begin{cases} C_1^{crt} \in CrtModInt(m_1) \\ C_2^{crt} \in CrtModInt(m_2) \end{cases}$ Output: $C_{out}^{crt} = CrtModInt(m_1 - m_2)$ for $i \in [0; \kappa - 1]$ do set $C_i^{ari} := Arith::\mathrm{Add}(C_1^{crt}[i], C_2^{crt}[i])$ return $C_{out}^{crt} := CrtModInt\{(C_0^{ari}, \ldots, C_{\kappa-1}^{ari})\}$ This operation may be applied if the inputs are compatible, and ∀0≤i<κ, Arith::Sub can be applied. Computational complexity may be $$\mathbb{C}_{crtModInt:::Sub}^{(\kappa)} = \sum_{i=0}^{\kappa-1} \mathbb{C}_{Arith:::Add}^{(n_i)} + \mathbb{C}_{Neg}^{(n_i)}.$$

Multiplication by a scalar known to the party performing the encrypted multiplication, may be performed by multiplying respective blocks by the scalar u modulo the respective message modulus $\beta_i$, e.g.:

Algorithm. $C_{out}^{crt} \leftarrow CrtModInt::ScalarMul(C^{crt}, u)$

Context: $\begin{cases} \kappa := |C^{crt}| \\ \vec{\beta} := (\beta_0, \ldots, \beta_{\kappa-1}) \text{: the } CRT\text{-base of } C^{crt} \\ \forall\, 0 \le i < \kappa, \text{ set } u_i := u \bmod \beta_i \end{cases}$ Input: $\begin{cases} C^{crt} \in CrtModInt(m) \\ u \in \mathbb{Z} \end{cases}$ Output: $C_{out}^{crt} \in CrtModInt(u \cdot m)$ for i $\in [0; \kappa - 1]$ do set $C_i^{ari} := Arith::ScalarMul(C^{crt}[i], u_i)$ return $C_{out}^{crt} := CrtModInt\{(C_0^{ari}, \ldots, C_{\kappa-1}^{ari})\}$ This operation may be applied if ∀0≤i<κ, Arith::ScalarMul can be applied. The computational complexity may be $$\mathbb{C}_{CRTModInt:::ScalarMul}^{(\kappa)} = \sum_{i=0}^{\kappa-1} \mathbb{C}_{Arith:::ScalarMul}^{(n_i)}.$$

An alternative way of implementing scalar multiplication is for example by applying a programmable bootstrapping.

Interestingly, when using a CRT representation, an encrypted carry-reduction may be applied to with-carry subvalue by reducing the with-carry subvalue modulo the corresponding message modulus, for example, using a programmable bootstrapping. This may not affect other subvalues, and accordingly, carry-reductions of multiple or all subvalues of an encoded-and-encrypted value can be performed separately and possibly in parallel. No propagation may be needed. For example, a single with-carry subvalue may be carry-reduced as follows:

Algorithm. $C_{out}^{crt} \leftarrow CrtModInt::ClearCarry(C^{crt}, i, PUB)$

Context: $(\kappa := |C^{crt}|$

Input: $\begin{cases} C^{crt} \in CrtModInt(m) \\ i \in \{0, \ldots, \kappa - 1\} \\ PUB\text{: public material for } PBS\text{-}KS \end{cases}$ Output: $C_{out}^{crt} \in CrtModInt(m)$ set $C_i^{ari} := Arith::MessageExtract(C^{crt}[i], BSK)$ return $C_{out}^{crt} := CrtModInt\{(C^{crt}[0], \ldots, C^{crt}[i-1], C_i^{ari}, C^{crt}[i+1], \ldots, C^{crt}[\kappa-1])\}$ This operation may be applied if $\mathcal{C}^{crt}$ [i]::deg≤1 and may have computational complexity $$\mathbb{C}_{CrtModInt::}^{(n,l,k,N)} = \mathbb{C}_{Arith:::MessageExtract}^{(n,l,k,N)}.$$

Multiple subvalues may be carry-reduced by extracting of the messages modulo $\beta_i$ for each $\mathcal{C}^{ari}$ ciphertext composing the CrtModInt, e.g.:

Algorithm. $C_{out}^{crt} \leftarrow CrtModInt::ClearAllCarries(C^{crt}, PUB)$

Context: $(\kappa := |C^{crt}|$

Input: $\begin{cases} C^{crt} \in CrtModInt(m) \\ PUB\text{: public material for } PBS\text{-}KS \end{cases}$ Output: $C_{out}^{crt} \in CrtModInt(m)$ // duplicate the input set $C_{out}^{crt} := C^{crt}$ for $i \in [0; \kappa - 1]$ do update $C_{out}^{crt} := CrtModInt::ClearCarry(C_{out}^{crt}, i, PUB)$ return $C_{out}^{crt}$ This operation may be applied if $\forall 0 \leq i < \kappa, \mathcal{C}^{crt}$ [i]::deg≤1. The computational complexity may be $$\mathbb{C}_{CrtModInt:::ClearAllCarries}^{(n,l,k,N,\kappa)} = \kappa \cdot \mathbb{C}_{Arith:::MessageExtract}^{(n,l,k,N)}.$$

Homomorphic multiplication may be implemented by multiplying together respective corresponding subvalues x mod $\beta_i$, y mod $\beta_i$ modulo $\beta_i$ with i∈[0, κ−1], e.g.:

Algorithm. $C_{out}^{crt} \leftarrow CRTModIntCT::Mul(C_1^{crt}, C_2^{crt}, PUB)$ Context: $(\kappa := |C^{crt}|$ Input: $\begin{cases} C_1^{crt} \in CrtModInt(m_1) \\ C_2^{crt} \in CrtModInt(m_2) \\ PUB\text{: public material for } PBS\text{-}KS \end{cases}$ -continued Algorithm. $C_{out}^{crt} \leftarrow CRTModIntCT::Mul(C_1^{crt}, C_2^{crt}, PUB)$ Output: $C_{out}^{crt} \in CrtModInt(m_1 \cdot m_2)$ for $i \in [0; \kappa - 1]$ do set $C_i^{ari} := Arith::MulLSB(C_1^{crt}[i], C_2^{crt}[i], PUB)$ return $C_{out}^{crt} := CrtModInt\{(C_0^{ari}, \ldots, C_{\kappa-1}^{ari})\}$ This operation may be applied if ∀i∈[0,κ−1], Arith::MulLSB can be applied. The computational complexity may be $$\mathbb{C}_{CRTModIntCT::Mul}^{(n,\beta,\ell,k,N,\kappa)} = \kappa \cdot \mathbb{C}_{Arith::MulLSB}^{(n,\beta,\ell,k,N)}.$$

It is also possible use other techniques for the multiplication of the subvalues, e.g., Arith::$MulLSB_{3PBS}$.

Various techniques may be used to apply univariate functions to values $\mathcal{C}^{crt}$ encoded-and-encrypted using the CRT. In particular, it is possible to use a tree programmable bootstrapping, or to apply a lookup table to GGSW-encrypted extracted bits, as both further discussed with respect to FIG. 4. Depending on the function, it may also be possible to evaluate a univariate function by separately applying it to the respective subvalues. This can for example be case for functions that can be expressed in terms of sums and products over $\mathbb{Z}_\tau$, e.g., arithmetic functions. In such cases, a univariate function may for example be applied as follows:

Algorithm. $C_{out}^{crt} \leftarrow CRTModInt::PBS(C^{crt}, PUB, P)$

Context: $(\kappa := |C^{crt}|$

Input: $\begin{cases} C^{crt} \in CrtModInt(m) \\ PUB\text{: public material for } PBS\text{-}KS \\ P_f: r\text{-redundant } LUT \text{ for } x \mapsto f(x) \end{cases}$ Output: $C_{out}^{crt} = CrtModInt(f(m))$ for $i \in [0; \kappa - 1]$ do set $C_i^{ari} := PBS(C^{crt}[i], PUB, P)$ return $C_{out}^{crt} := CrtModInt\{(C_0^{ari}, \ldots, C_{\kappa-1}^{ari})\}$ This operation may be applied if, for all i such that $0 \le i < \kappa$, CrtModInt[i]::deg<1 and the function $f: \mathbb{Z}_\tau \mapsto \mathbb{Z}_\tau$ splits over the elements of the CRT representation. The computational complexity may be $$\mathbb{C}^{(n,\ell,k,N,\kappa)}_{CRTModInt::PBS} = \kappa \cdot \mathbb{C}^{(n,\ell,k,N)}_{PBS-KS}.$$

FIG. 6 schematically shows an example of a value encoded-and-encrypted based on a radix decomposition. In this case, interestingly, the value is defined using a modulus M which is smaller than the maximum value representable by the radix decomposition. This has the advantage that the modulus M does not need to be equal to a product of basis elements.

In particular, to encode-and-encrypt a value modulo M, a base $\vec{\beta} = (\beta_1, \ldots, \beta_\kappa) \in \mathbb{Z}^\kappa$ may be chosen such that the modulus M is smaller than the maximum value $$M_{max} = \prod_{i=1}^{\kappa} \beta_i$$

representable by the radix decomposition. The base may be as discussed with respect to FIG. 4.

For example, the figure illustrates the case where the modulus 601 is M=1433. It is note that 1433 is a prime number so a radix or CRT representation could not be used directly for decomposition with respect to this modulus. The figure illustrates a basis $\vec{\beta} = (\beta, \beta, \beta)$ with a common basis element $\beta = 2^5$, 602, with $\kappa = 3$, and with a common carry-message-modulus $\vec{p} = (p, p, p)$ with $p = 2^7$. Thus, in this case, values may be encoded-and-encrypted as three encrypted subvalues 606-608.

Encrypted operations may be performed as discussed with respect to FIG. 4, except that carry-reduction may involve applying a correction due to the modular reduction modulo M. The latter may be performed by performing an encrypted modulo reduction of the encryption of the most significant subvalue of the output value. In particular, as also discussed elsewhere, the carry and message may be extracted from the most significant block, and the modulo may be computed homomorphically by redistribution over the remaining blocks. For this, several approaches are possible as discussed elsewhere in more detail.

In more detail, an encoded-and-encrypted ciphertext $\mathcal{C}^{rad^+}$ encrypting an integer $m \in \mathbb{Z}_Q$ decomposed according to a basis $\vec{\beta} \in \mathbb{N}^\kappa$, e.g., $$m = m_0 + \sum_{i=1}^{\kappa-1} m_i \prod_{j=0}^{i-1} \beta_j, \text{ with } \prod_{j=0}^{\kappa-2} \beta_j < Q < \prod_{j=0}^{\kappa-1} \beta_j,$$

under a secret key s may be denoted:

$$C^{rad^+} \in RadModInt_s^+(m) = \begin{cases} C_0^{ari}, C_1^{ari}, \ldots, C_{\kappa-1}^{ari} \\ Q \in \mathbb{Z} \end{cases}$$

where $$C_i^{ari} \in Arith_s(m_i).$$

The $i^{th}$ Arith ciphertext composing $\mathcal{C}^{rad^+}$ may be defined as $$C^{rad^+}[i] := C_i^{ari}.$$

In the above definition, the modulus Q is set up to be in the most significant block, $\kappa-1$. It is noted that it is possible to add one or more Arith ciphertext blocks in the MSB of the RadModInt+ structure. The algorithms described herein to perform homomorphic modulus reduction may be adapted to perform the modular reduction on the RadModInt+ ciphertext with the additional Arith ciphertext blocks.

Two RadModInt+ ciphertexts $$C_1^{rad^+}$$

and $$C_1^{rad^+}$$

may be defined as being compatible if:

$$\begin{cases} |C_1^{rad^+}| & = |C_2^{rad^+}| \\ (C_1^{rad^+}::Q) & = (C_2^{rad^+}::Q) \end{cases}$$

where $|C_i^{rad^+}| = \kappa$, and:

$$\forall\, i \in 0, \kappa-1 \begin{cases} C_1^{rad^+}[i]::p & = C_2^{rad^+}[i]::p \\ C_1^{rad^+}[i]::q & = C_2^{rad^+}[i]::q \, ; \\ C_1^{rad^+}[i]::\beta & = C_2^{rad^+}[i]::\beta \end{cases}$$

e.g., the ciphertexts $$C_1^{rad^+}[i]$$

and $$C_2^{rad^+}[i]$$

may be compatible.

Various operations can be performed as discussed as discussed with respect to FIG. 4. Several examples of this are now discussed.

In particular, modular addition may be computed as for RadModInt ciphertexts. To this end, $\text{RadModInt}^+$ ciphertexts may be viewed as RadModInt ciphertexts. This operation may be denoted $$C_{out}^{rad^+} \leftarrow RadModInt^+ :: \text{Add}\left(C_1^{rad^+}, C_2^{rad^+}\right).$$

Also modular subtraction may be performed as for RadModInt ciphertexts, viewing the $\text{RadModInt}^+$ ciphertexts as RadModInt ciphertexts. This operation may be denoted $$C_{out}^{rad^+} \leftarrow RadModInt^+ :: \text{Sub}\left(C_1^{rad^+}, C_2^{rad^+}\right).$$

Modular padding may also be performed as for RadModInt ciphertexts, viewing the $\text{RadModInt}^+$ ciphertexts in output as RadModInt ciphertexts. The input, generally coming from a decomposition, may be a RadModInt. This operation may be denoted $$C_{out}^{rad^+} \leftarrow RadModInt^+ :: \text{Padding}\left(C_1^{rad}, \alpha, \overrightarrow{p_{out}}, \overrightarrow{\beta_{out}}\right).$$

Applying an encrypted carry-reduction to a with-carry subvalue may also be performed as for RadModInt ciphertexts, viewing the $\text{RadModInt}^+$ ciphertexts as RadModInt ciphertexts. This operation may be denoted $$C_{out}^{rad^+} \leftarrow RadModInt^+ :: ClearCarry\left(C_{in}^{rad^+}, \alpha, \text{PUB}\right).$$

When carry-reducing the most significant subvalue, a modular reduction may be performed. Two possible ways of performing the modulo reduction are now discussed. Their relative efficiency may depend on the distance between the modulus M and the bound $M_{max}$.

A first way of performing the modulo reduction is by applying programmable bootstrappings to the most significant encrypted subvalue to propagate the subvalue to the respective encrypted subvalues, thereby obtaining the reduced value modulo Q.

In particular, a carry-reduction may involve emptying and propagating carries for subvalues of an encoded-and-encrypted values, excepting the most significant subvalues. Thereby, all carries but the one in the most significant block may be empty. This can be done if the carry of the most significant block is able to support this carry propagation without exceeding. In the most significant block, both the carry and the message may be extracted and transformed using programmable bootstrappings. The transformed extracted carry and message may be redistributed into the respective blocks.

A detailed example is now given with respect to the parameters illustrated in FIG. 6, namely, Q=1433, κ=3, $\vec{\beta}=(\beta,\beta,\beta)$ with $\beta=2^5$ and $\vec{p}=(p,p,p)$ with $p=2^7$. The most significant block may encrypt a message $m<2^p$, rescaled to the quantity $\beta^2$. The modulo reduction may use respective PBSs to reduce the quantity $m\beta^2$ modulo Q and to decompose it at the same time in the base powers to redistribute it to the respective blocks. Say $m'=m\beta^2 \bmod Q$. Then m' may be decomposed as $$m' = \sum_{i=0}^{2} m_i' \cdot \beta^i = m_2' \cdot (2^5)^2 + m_1' \cdot 2^5 + m_0'.$$

The PBS LUTs may be built in order to take as input an encryption of m and output the encryption of these decomposition values ($m'_2$, $m'_1$, $m'_0$). Then, the reduced ciphertext may be obtained as follows:

- in block 0: by the addition between the previous block 0 and the encryption of $m'_0$;
- in block 1: by the addition between the previous block 1 and the encryption of $m'_1$;
- in block 2: by the encryption of $m'_2$ which has a smaller degree than the original.

As a detailed example, modular reduction may be implemented as follows:

---

Algorithm. $C_{out}^{rad^+} \leftarrow RadModInt^+ :: \text{ModularReduction}_1\left(C^{rad^+}, PUB\right)$

---

Context: $\begin{cases} P_j: \kappa r - \text{redundant } LUT \text{ for } x \in \mathbb{Z}_{C^{rad^+}[\kappa-1]::p} \rightarrow Decomp_j\left(x \cdot \prod_{h=0}^{\kappa-2} \beta_h \bmod Q\right) \\ \text{where } Decomp_j \text{ is the } j^{th} \text{ element in the decomposition in base } \vec{\beta} \end{cases}$ Input: $\begin{cases} C^{rad^+} \in RadModInt_s^+(m) \\ PUB: \text{public material for } PBS - KS \end{cases}$ Output: $C_{out}^{rad^+} \in RadModInt_s^+(m)$ for $j \in [0; \kappa - 1]$ do $\quad ct_j \leftarrow PBS - KS\left(C^{rad^+}[\kappa - 1], PUB, P_j\right)$ for $j \in [0; [\kappa - 2]$ do $\quad C_{out}^{rad^+}[j] \leftarrow Arith :: \text{Add}\left(ct_j, C^{rad^+}[j]\right)$ $C_{out}^{rad^+}[\kappa - 1] \leftarrow ct_{\kappa-1}$ return $C_{out}^{rad^+}$

---

This operation may be applied if $\mathcal{C}^{rad^+}[\kappa-1]$ satisfies $\mathcal{C}^{rad^+}[\kappa-1]$::deg≤1 and Arith::Add can be applied to the ciphertexts $ct_j$ and $\mathcal{C}^{rad^+}[j]$ for all $j\in[0;\kappa-2]$. The computational complexity may be $$\mathbb{C}^{(n,\ell_{PBS},\ell_{KS},k,N)}_{(RadModInt^+::ModularReduction)_1} = \kappa\cdot\mathbb{C}^{(n,\ell_{PBS},\ell_{KS},k,N)}_{PBS-KS} + (\kappa-1)\cdot\mathbb{C}^{(n)}_{Arith::Add}.$$

It is noted that it is possible to evaluate the respective programmable bootstrappings as a single programmable bootstrapping using the "PBS many LUT" technique disclosed in "Improved programmable bootstrapping with larger precision and efficient arithmetic circuits for TFHE".

An alternative technique to perform modulo reduction is based on a linear relation modulo the smaller modulo Q between a subvalue corresponding to the most significant basis element, and a set of subvalues corresponding to the remaining basis elements. Based on such a relation, an encoded-and-encrypted value may be modulo-reduced into an encoded-and-encrypted value for which the most significant subvalue is zero. In particular, to obtain the linear relation, the product or $$\prod_{h=0}^{\kappa-2}\beta_h$$

of the basis elements except $\beta_{\kappa-1}$ modulo Q may be decomposed in the base=$(\beta_0, \beta_1, \ldots, \beta_{\kappa-1})$:

$$\prod_{h=0}^{\kappa-2}\beta_h \bmod Q = v_0 + v_1\cdot\beta_0 + v_2\cdot\beta_0\beta_1 + \ldots + v_{\kappa-1}\cdot\prod_{j=0}^{\kappa-2}\beta_j.$$

This method may be used if $v_{\kappa-1}=0$ in the decomposition. In this case, the most significant block multiplied by the constant $v_j$ may be added to the j-th block and then the new most significant block may be set to zero. This technique is particularly efficient if the elements of the decomposition $v_0, v_1, \ldots, v_{\kappa-2}$ are small or even zero, and for some applications, it may be possible to select a suitable modulus Q such that this modulo reduction is efficient, thus obtaining particularly efficient encrypted computations.

As an example, refer to the parameters illustrated in FIG. 6: smaller modulus Q=1433, number of subvalues κ=3, basis of message-moduli $\vec{\beta}=(\beta,\beta,\beta)$ with $\beta=2^5$ and carry-message-moduli $\vec{p}=(p,p,p)$ with $p=2^7$. In this example, it may be observed that $(2^5)^2 \bmod 1433=-409=-12\cdot2^5-25$, so that modulo reduction may be performed by, in least significant block 608, adding together the previous least significant block 608 and the most significant block 606 multiplied by −25; in the middle block 607, adding together the previous middle block 607 and the previous most significant block 606 multiplied by −12; and setting the most significant block 606 to zero.

Another example, in which the present modulus reduction is particularly efficient, is where Q=1087, κ=3, $\vec{\beta}=(\beta,\beta,\beta)$ with $\beta=2^5$ and $\vec{p}=(p,p,p)$ with $p=2^7$, as before. In this case, it may be observed that $(2^5)^2 \bmod 1087=-63=-2\cdot2^5+1$ so that the modulus reduction may be implemented by scalar multiplication with small scalars.

It is noted that this technique may be efficiently implemented without a programmable bootstrapping. A carry propagation via bootstrapping can optionally be performed afterwards. For example, the technique may be implemented as follows:

Algorithm. $C^{rad^+}_{out} \leftarrow RadModInt^+$:: ModularReduction$_2(C^{rad^+}, PUB)$ Context: $\begin{cases} v=(v_0, v_1, \ldots, v_{\kappa-1}) \text{ s.t. } \prod_{h=0}^{\kappa-2}\beta_h \bmod Q = \\ v_0+v_1\cdot\beta_0+v_2\cdot\beta_0\beta_1+\cdots+v_{\kappa-2}\cdot\prod_{j=0}^{\kappa-3}\beta_j\text{: a convenient decomposition} \\ LWE_s(0)\text{: a e.g. trivial encryption of zero} \end{cases}$ Input: $C^{rad^+} \in RadModInt^+_s(m)$ Output: $C^{rad^+}_{out} \in RadModInt^+_s(m)$ // Copy input and set the $\kappa-1$ block to zero $C^{rad^+}_{out} \leftarrow (C^{rad^+}_{in}\ 0, \kappa-2, LWE_s(0))$ // multiply block $\kappa-1$ times $v_j$ for $j\in[0;\kappa-2]$ do if $v_j<0$ then $ct_j \leftarrow Arith::ScalarMul(C^{rad^+}[\kappa-1], -v_j)$ else $ct_j \leftarrow Arith::ScarlarMul(C^{rad^+}[\kappa-1], v_j)$ // Decomposing the $ct_j$ block starting from the $\beta_j$ $C^{rad}_j \leftarrow$ Decompose$(ct_j, (\beta_i)_{i\in j,\kappa-1}, (p_i)_{i\in y,\kappa-1}, PUB)$ // Padding the carry to fit with $C^{rad^+}_{out}$ -continued Algorithm. $C_{out}^{rad^+} \leftarrow RadModInt^+::\text{ModularReduction}_2(C^{rad^+}, PUB)$

---

$C_{carry}^{rad^+} \leftarrow RadModInt^+::\text{Padding}\left(C_j^{rad}, j, \vec{\beta}, \vec{p}\right)$ // Update the output if $v_j < 0$ then $C_{out}^{rad^+} \leftarrow RadModInt^+::\text{Sub}(C_{out}^{rad^+}, C_{carry}^{rad^+})$ else $C_{out}^{rad^+} \leftarrow RadModInt^+::\text{Add}(C_{out}^{rad^+}, C_{carry}^{rad^+})$ return $C_{out}^{rad^+}$

---

This procedure may be applied if, in the decomposition v, the coefficient $v_{\kappa-1}=0$, and for all $j\in[0; \kappa-2]$, Arith::ScalarMul can be applied to the ciphertext $c^{rad^+}[\kappa-1]$ and the scalar $v_j$; the decomposition does not overflow the decomposition base; and RadModInt$^+$::Padding, RadModInt$^+$::Sub, and RadModInt$^+$::Add can be applied to their respective inputs. Letting $\kappa_+<\kappa$ be the number of positive elements in decomposition and let $\kappa_-<\kappa$ be the number of negative elements in the decomposition. Then the computational complexity of the technique may be:

$$\mathbb{C}_{RadModInt^+:::ModularReduction_2}^{(n,\kappa_+,\kappa_-,\kappa,\ell,k,N)} = (\kappa_+ + \kappa_-)\cdot\left(\mathbb{C}_{Arith::ScalarMul}^{(n)} + \mathbb{C}_{Decompose}^{(n,\ell,k,N,\kappa)}\right) + \kappa_+\cdot\mathbb{C}_{Arith::Add}^{(n)} + \kappa_-\cdot\mathbb{C}_{RadModIntCT::Sub}^{(n,\kappa)}.$$

It may be noted that, if the $v_j$ coefficient is equal to zero, the loop can be skipped for that coefficient, making this technique particularly efficient if the parameters are chosen such that one or more coefficients $v_j$ are zero.

Performing an encrypted carry-reduction operation to all subvalues of a value that is encoded-and-encrypted using RadModInt$^+$, may be performed by applying the encrypted carry-reduction to respective subvalues except the most significant subvalue, and applying an encrypted modulo to the most significant subvalue. In particular, this operation may be implemented as follows:

---

Algorithm. $C_{out}^{rad^+} \leftarrow RadModInt^+::\text{ClearAllCarries}(C_{out}^{rad}, PUB)$

---

Context: ($s \in \mathbb{Z}^n$ : the secret key

Input: $\begin{cases} C_{in}^{rad^+} \in RadModInt_s^+(m) \\ PUB\text{: public material for } PBS\text{-}KS \end{cases}$ Output: $C_{out}^{rad^+} \in RadModInt_s^+(m)$ // Copy the input $C_{out}^{rad^+} \leftarrow C_{in}^{rad^+}$ // Clear all the carries but the one in last block for $i \in [0, \kappa-2]$ do $C_{out}^{rad^+} \leftarrow RadModInt^+::\text{ClearCarry}(C_{out}^{rad^+}, i, PUB)$ // Modular reduction (e.g., using one of the discussed techniques)

-continued

---

Algorithm. $C_{out}^{rad^+} \leftarrow RadModInt^+::\text{ClearAllCarries}(C_{out}^{rad}, PUB)$

---

$C_{out}^{rad^+} \leftarrow (RadModInt^+::\text{ModularReduction})_{1,2}(C_{out}^{rad^+}, PUB)$ return $C_{out}^{rad^+}$

---

It is noted that, although RadModInt$^+$::ClearCarry may reduce a with-carry subvalue to a non-carry subvalue, the overall result of RadModInt$^+$::ClearAllCarries may have with-carry subvalues because of the additions performed in the modular reduction. Optionally, further encrypted carry-reductions, e.g., using RadModInt$^+$::ClearCarry, may be applied to reduce such with-carry subvalues to non-carry subvalues if desired, e.g., if this allows to carry out one or more next operations.

The above procedure may be applied if, for all $i\in[0,\kappa-2]$, RadModInt$^+$::ClearCarry can be applied, and if RadModInt$^+$::ModularReduction$_{1,2}$ can be applied to the result. Depending on which modular reduction is used, the computational complexity may be $$\mathbb{C}_{RadModInt^+::ClearAllCarries}^{(n,\ell,\ell_{PBS},\ell_{KS},k,N,\kappa)} = \sum_{i=0}^{\kappa-2}\mathbb{C}_{RadModInt^+::ClearCarry}^{(n,\ell,k,N,\kappa,i)} + \mathbb{C}_{RadModInt^+::ModularReduction_1}^{(n,\ell_{PBS},\ell_{KS},k,N)}$$

or $$\mathbb{C}_{RadModInt^+::ClearAllCarries}^{(n,\ell,\kappa_+,\kappa_-,\ell_{mod},k,N,\kappa)} = \sum_{i=0}^{\kappa-2}\mathbb{C}_{RadModInt^+::ClearCarry}^{(n,\ell,k,N,\kappa,i)} + \mathbb{C}_{RadModInt^+::ModularReduction_2}^{(n,\kappa_+,\kappa_-,\ell_{mod},k,N)}$$

Scalar multiplication may be performed as discussed for RadModInt ciphertexts with the SmallScalarMul operation. This may be particularly suitable for relatively small scalars. To this end, RadModInt$^+$ ciphertexts may be viewed as RadModInt ciphertexts. This operation may be denoted $$C_{out}^{rad^+} \leftarrow RadModInt^+::SmallScalarMul(C_{in}^{rad^+}, \mu).$$

Scalar multiplication may also be performed as discussed for RadModInt ciphertexts with the ScalarMulDecomp operation, viewing the RadModInt$^+$ ciphertexts as RadModInt ciphertexts. In particular, respective subvalues of the encoded-and-encrypted value may be multiplied and the resulting encodings-and-encryptions may be combined. The scalar multiplication may further comprise performing a modular reduction. The overall scalar multiplication operation may pe denoted $$C_{out}^{rad^+} \leftarrow RadModInt^+::ScalarMul(C_{in}^{rad^+}, \mu, PUB).$$

One way of implementing the modular reduction in this case is by including one or more additional subvalues in the encoded-and-encrypted product such that exact multiplication is supported, in other words, such that the encoded-and-encrypted product can be computed without modular reduction (with the number of subvalues to be added being chosen suitably for the scalar to be multiplied with); performing the exact multiplication; and applying respective modular reductions to the respective added subvalues and the originally most significant subvalue, e.g., going from most to least significant.

An alternative is to iteratively perform respective modular reductions to respective resulting encodings-and-encryptions before combining them. In this case, adding additional subvalues can be avoided.

Multiplication of encoded-and-encrypted values may be performed as discussed for RadModInt ciphertexts, viewing the RadModInt$^+$ ciphertexts as RadModInt ciphertexts. In particular, the first encoded-and-encrypted value may be multiplied with respective subvalues of the second encoded-and-encrypted value, and the results may be combined. The multiplication may comprise a modular reduction. The overall multiplication may be denoted $$C_{out}^{rad^+} \leftarrow RadModInt^+::Mult(C_1^{rad^+}, C_2^{rad^+}, PUB).$$

To perform the modular reduction, one or more subvalues may be included in the encoded-and-encrypted product such that an exact multiplication of the encoded-and-encrypted values may be performed (with the number of subvalues being chosen suitably for the values to be multiplied); an exact multiplication may be performed; and respective modular reductions may be applied to the added blocks and the originally most significant subvalue, e.g., going from most to least significant.

Another way of performing the modular reduction is to perform the modular reduction iteratively during the computation, e.g., before overlapping the result in the most significant block. This way, no extra subvalues may need to be added.

Figure 7:
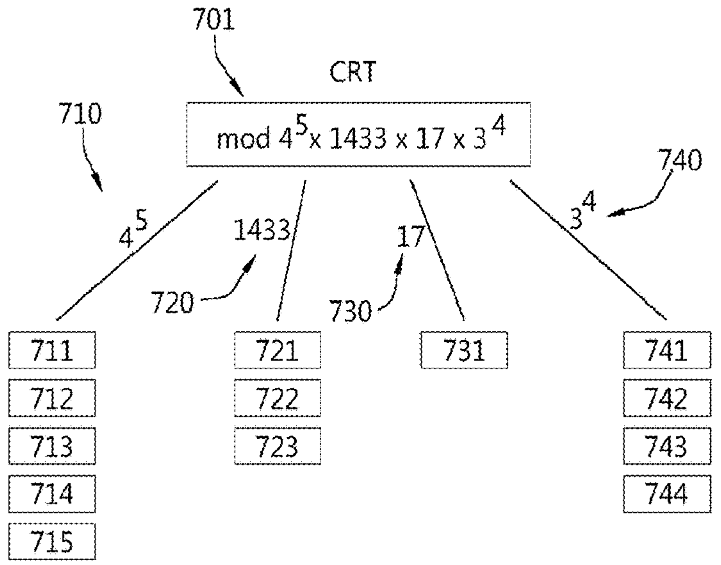
FIG. 7 schematically shows an example of a value encoded-and-encrypted based on a residue number system representation and based further on a radix decomposition of an element of the residue number system representation.

FIG. 7 schematically shows an example of a value encoded-and-encrypted based on a residue number system representation and based further on a radix decomposition of an element of the residue number system representation. Such a representation is referred to herein as a "hybrid" encoding-and-encryption. In particular, an encoded-and-encrypted value may comprise one or more respective encodings-and-encryptions according to a residue number system representation of respective subvalues defined according to the residue number system representation.

Interestingly, this way, it is possible to combine the advantage of the residue number system representation that many carry propagation can be avoided, while not having the problem of needing many small co-primes. In particular, by using the hybrid approach, it is possible to perform encrypted computations relatively efficiently using particularly large moduli, e.g., the modulus may be at least $2^{10}$, at least $2^{20}$, or at least $2^{30}$. For example, the number of residues of the residue number system representation may be at most or at least three, at most or at least six, or at most or at least ten.

For example, the figure illustrates a hybrid encoding-and-encryption using the modulus $(4^5)\times1433\times17\times(3^4)$. This modulus may be decomposed according to the residue number system into four residues $4^5$, 710; 1433, 720; 17, 730; and $3^4$, 740. For respective residues of the residue number system decomposition, the encoding-and-encryption of a given value may comprise respective sets of one or more encrypted values, representing the respective elements of the residue number system decomposition of the value.

In particular, for zero, one, or more residues of the residue number system, the corresponding element may be encrypted as an encrypted-but-not-encoded value with message modulus equal to the residue, as discussed with respect to FIG. 5. This is the case for the residue 17, 730, in the figure, which may be encrypted as an encryption 740 modulo the residue itself.

For zero, one, or more further residues, the corresponding element may be encoded as an encoded-and-encrypted value according to a radix decomposition of the element. Here, the residue may be equal to the maximum value representable by the radix decomposition, e.g., using the encoding-and-encryption of FIG. 4; and/or the residue may be smaller than the maximum value representable by the radix decomposition, e.g., using the encoding-and-encryption of FIG. 6.

This is illustrated in the figure where an element modulo the residue $4^5$, 710 may be encoded-and-encrypted as 5 subvalues 711-715 modulo 4, e.g., as discussed with respect to FIG. 4; and an element modulo the residue $3^4$, 740, may be encoded-and-encrypted as 4 subvalues 741-743 modulo 3. An element modulo the residue 1433, 720, may in this example be encoded-and-encrypted as 3 subvalues 721-723 modulo $2^5$, e.g., as discussed with respect to FIG. 6.

In particular, given a list of multiple integers $(Q_0, \ldots, Q_{\kappa-1})$ co-prime to each other, the hybrid approach may be used to encode-and-encrypt values m mod $\tau$ with $$\tau = \prod_{i=0}^{\kappa-1} Q_i.$$

The value may be encoded-and-encrypted by determining respective elements of a CRT representation of the value m mod $Q_i$, $i \in [0, \kappa-1]$, where respective values may be encrypted, encoded-encrypted as RadModInt, and/or encoded-and-encrypted as encrypted in a RadModInt$^+$.

A detailed example is now provided where RadModInt$^+$ is used for all residues. This example may be adapted to the case where for one, more, or all of the residues, RadModInt or a single encryption is used. In this example, a ModInt ciphertext encrypting an integer $m \in \mathbb{Z}_\tau$ under the CRT base $(Q_0, \ldots, Q_{\kappa-1})$ will $$\tau = \prod_{i=0}^{\kappa-1} Q_i$$

may be defined as $$C^{mod} \in ModInt(m) = \left\{ \begin{matrix} (C_0^{rad^+}, \ldots, C_{\kappa-1}^{rad^+}) \\ t \in \mathbb{Z} \end{matrix} \right.$$

where for all $$0 \le i \le \kappa - 1, C_i^{rad^+} \in RadModInt_s^+(m_i),$$

such that $m \equiv m_i \bmod Q_i$. In this example, denote the $i^{th}$ RadModInt+ ciphertext composing $$C^{mod} \text{ as } C^{mod}[i] := C_i^{rad^+}.$$

Then, $|\mathcal{C}^{mod}[i]| = \kappa_i$ and $\mathcal{C}^{mod}[i]::Q = Q_i$.

ModInt ciphertexts $$C_1^{mod}$$

and $$C_2^{mod}$$

may be defined as being compatible if:

$$\begin{cases} |C_1^{mod}| = |C_2^{mod}| \\ (C_1^{mod} : : \tau) = (C_2^{mod} : : \tau) \end{cases}$$

where $$|C_i^{mod}| = \kappa,$$

and if ciphertexts $$C_1^{mod}[i]$$

and $$C_2^{mod}[i]$$

are compatible, $\forall i \in [0, \kappa-1]$.

Generally, various computations, including encrypted operations and encrypted carry-reductions, may be performed as discussed for the regular residue number system-based encoding-and-encryption of FIG. 5. For example, an encrypted addition, subtraction, scalar multiplication, carry reduction, clearing of all carries, multiplication, and/or univariate function evaluation may be applied.

Where performing such a computation comprises performing a subcomputation on one or more elements of the CRT representation, the subcomputation may be applied to the respective encoded-and-encrypted elements using the techniques discussed with respect to FIG. 4 or FIG. 6. For example, an operation on a ModInt may be computed separately on respective components RadModInt+ (m mod $Q_i$), $i \in [0, \kappa-1]$, where, instead of using Arith-based algorithms, the RadModInt+-based algorithms described herein may be used to compute on the $$C_i^{rad^+}$$

or the ModInt.

Figure 8:
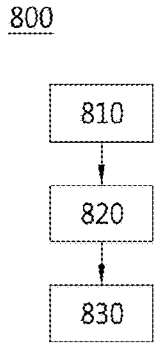
FIG. 8 schematically shows an example of an embodiment of a cryptographic method of performing an encrypted computation.

FIG. 8 schematically shows an example of an embodiment of a cryptographic method 800 of performing an encrypted computation on a set of one or more encoded-and-encrypted values. Method 800 may be computed-implemented. A value may be encoded-and-encrypted as encryptions of multiple respective subvalues. A subvalue may have a corresponding message modulus and carry-message modulus larger than the message modulus. A value may be encoded-and-encrypted without carry by non-carry subvalues smaller than the corresponding message moduli. A value may be encoded-and-encrypted with carry by at least one with-carry subvalue larger than or equal to the corresponding message modulus.

The method 800 may comprise accessing 810 the one or more encoded-and-encrypted values. The method 800 may comprise applying 820 an encrypted operation to at least an input value encoded-and-encrypted with carry to obtain an output value encoded-and-encrypted with carry. The method 800 may comprise applying 830 an encrypted carry-reduction to the output value encoded-and-encrypted with carry to obtain a further encoding-and-encryption of the output value in which at least one with-carry subvalue is reduced to a non-carry subvalue.

Figure 9:
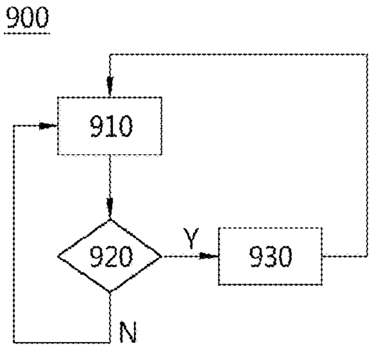
FIG. 9 schematically shows an example of an embodiment of a compiler method.

FIG. 9 schematically shows an example of an embodiment of compiler method 900 of compiling a computation into a homomorphic executable. The homomorphic executable may be executable by an encrypted computation engine and may cause the encrypted computation engine to perform an encrypted computation on a set of one or more encoded-and-encrypted values as described herein, e.g., according to method 800 of FIG. 8. The homomorphic executable may comprise one or more instructions to perform the encrypted carry-reduction operation as described herein, e.g., as part of an encrypted operation or in between the execution of encrypted operations. The compiler method 900 may be computer-implemented.

The compiler method 900 may comprise, for a with-carry subvalue that is to be computed, determining 910 a degree of fullness indicating a bound on the with-carry subvalue; and, if 920 the bound exceeds the corresponding carry-message modulus, generating 930 an instruction that causes the encrypted computation engine to apply the encrypted carry-reduction prior to computing said with-carry subvalue.

Many different ways of executing the method(s) 800, 900 are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started. It is also possible to combine the methods 800, 900, e.g., method 800 of performing an encrypted computation may be performed according to a homomorphic executable previously compiled according to method 900.

Embodiments of the methods may be executed using software, which comprises instructions for causing a processor system to perform method 800 or 900. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Typically, the devices described herein, e.g., in FIG. 1*a*-1*c*, comprise one or more microprocessors which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, the systems may comprise circuits for the evaluation of cryptographic primitives.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 10:
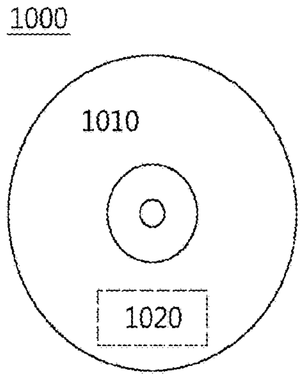
FIG. 10 schematically shows a computer readable medium having a writable part according to an embodiment.

FIG. 10 shows a computer readable medium 1000 having a writable part 1010. Computer readable medium 1000 is shown in the form of an optically readable medium. Computer readable medium 1000 may store data 1020 wherein the data may indicate instructions, which when executed by a processor system, cause a processor system to perform an embodiment of a method of performing an encrypted computation, and/or a compiler method, according to an embodiment.

Instead or in addition, the data 1020 may represent a homomorphic executable compiled according to a compiler method described herein.

Instead or in addition, the data 1020 may represent a set of one or more encoded-and-encrypted values comprising zero or more valued encoded-and-encrypted without carry and one or more values encoded-and-encrypted with carry as described herein.

The data 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable.

Figure 11:
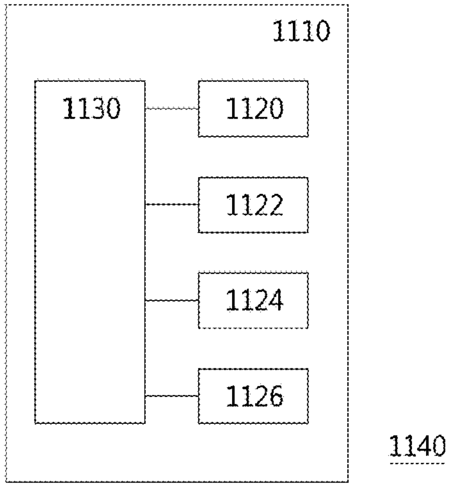
FIG. 11 schematically shows a representation of a processor system according to an embodiment.

FIG. 11 shows in a schematic representation of a processor system 1140 according to an embodiment of a device for performing an encrypted computation or determining a test polynomial. The processor system comprises one or more integrated circuits 1110. The architecture of the one or more integrated circuits 1110 is schematically shown in the figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device for performing the encrypted computation or compilation, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1110 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1110 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A cryptographic method (800) of performing an encrypted computation on a set of one or more encoded-and-encrypted values, wherein:

- a value is encoded-and-encrypted as encryptions of multiple respective subvalues, wherein a subvalue has a corresponding message modulus and carry-message modulus larger than the message modulus;
- a value is encoded-and-encrypted without carry by non-carry subvalues smaller than the corresponding message moduli; and
- a value is encoded-and-encrypted with carry by at least one with-carry subvalue larger than or equal to the corresponding message modulus, wherein the method comprises:

- accessing (810) the one or more encoded-and-encrypted values;
- applying (820) an encrypted operation to at least an input value encoded-and-encrypted with carry to obtain an output value encoded-and-encrypted with carry;
- applying (830) an encrypted carry-reduction to the output value encoded-and-encrypted with carry to obtain a further encoding-and-encryption of the output value in which at least one with-carry subvalue is reduced to a non-carry subvalue.

2. The method (800) of claim 1, wherein the encryptions of the subvalues are LWE encryptions, wherein the LWE encryptions support a programmable bootstrapping operation, wherein a programmable bootstrapping evaluates a LWE decryption in an exponent of a GLWE-encrypted monomial, and wherein the encrypted carry-reduction uses the programmable bootstrapping operation.

3. The method (800) of claim 1, comprising computing the output value by performing multiple encrypted arithmetic operations on a set of encoded-and-encrypted values, wherein said performing does not comprise an encrypted carry-reduction.

4. The method (800) of claim 1, wherein the encrypted operation is applied by applying respective sub-operations separately to the respective encryptions of the subvalues of the input value, wherein the separately applied encrypted operations are performed at least in part in parallel.

5. The method (800) of claim 1, wherein an encoding of a value as non-carry subvalues is based on a residue number system representation of the value.

6. The method (800) of claim 5, wherein the encoding is based further on a radix decomposition of an element of the residue number system representation.

7. The method (800) of claim 1, wherein an encoding of a value as non-carry subvalues is based on a radix decomposition of the value.

8. The method (800) of claim 6, wherein applying the encrypted carry-reduction comprises decomposing a with-carry subvalue of the output value into encryptions of respective subvalues of the subvalue, and adding the encryptions of the subvalues of the subvalue to encryptions of corresponding subvalues of the output value.

9. The method (800) of claim 6, comprising performing an encrypted multiplication of an encoded-and-encrypted value by a scalar, by computing respective encrypted subvalues of a multiplication of a subvalue of the encoded-and-encrypted value by the scalar.

10. The method (800) of claim 6, comprising performing an encrypted multiplication of a first encoded-and-encrypted value and a second encoded-and-encrypted value by performing encrypted multiplications of encryptions of subvalues of the first and second encoded-and-encrypted values, wherein an encrypted multiplication of encryptions of subvalues results in an encoded-and-encrypted value.

11. The method (800) of claim 6, wherein the element of the residue number system or the value that is encoded-and-encrypted without carry is defined modulo a modulus that is smaller than the maximum value representable by the radix decomposition.

12. The method (800) of claim 1, wherein applying the encrypted operation comprises, for a with-carry subvalue that is to be computed, determining a degree of fullness indicating a bound on the with-carry subvalue; and, if the bound exceeds the corresponding carry-message modulus, applying the encrypted carry-reduction prior to computing said with-carry subvalue.

13. The method (800) of claim 1, wherein a message modulus is not a power of two and/or at least 3 and/or at least 5 and/or at least 10.

14. The method (800) of claim 1, wherein a carry-message modulus is at least 4, at least 8, or at least 32 times a corresponding message modulus.

15. The method (800) of claim 1, comprising performing one or more encrypted linear operations and/or one or more encrypted multiplications and/or one or more univariate function evaluations.

16. The method (800) of claim 1, comprising applying a function evaluation to one or more encoded-and-encrypted values by: extracting one or more bits from one or more subvalues of the encoded-and-encrypted values; converting the extracted bits to GGSW ciphertexts; and applying a lookup table to the GGSW ciphertexts.

17. A computer-implemented compiler method (900) of compiling a computation into a homomorphic executable, wherein the homomorphic executable is executable by an encrypted computation engine and causes the encrypted computation engine to perform an encrypted computation according to claim 1, wherein the method comprises:

- for a with-carry subvalue that is to be computed, determining (910) a degree of fullness indicating a bound on the with-carry subvalue; and if (920) the bound exceeds the carry-message modulus of the with-carry subvalue, generating (930) an instruction that causes the encrypted computation engine to apply an encrypted carry-reduction prior to computing said with-carry subvalue.

18. A cryptographic device (110,112) for performing an encrypted computation on a set of one or more encoded-and-encrypted values, wherein:

a value is encoded-and-encrypted as encryptions of multiple respective subvalues, wherein a subvalue has a corresponding message modulus and carry-message modulus larger than the message modulus;

a value is encoded-and-encrypted without carry by non-carry subvalues smaller than the corresponding message moduli; and a value is encoded-and-encrypted with carry by at least one with-carry subvalue larger than or equal to the corresponding message modulus, wherein the device (110,112) comprises:

a storage (140) for storing the one or more encoded-and-encrypted values;

a processor subsystem (130) configured to apply an encrypted operation to at least an input value encoded-and-encrypted with carry to obtain an output value encoded-and-encrypted with carry; and to apply an encrypted carry-reduction to the output value encoded-and-encrypted with carry to obtain a further encoding-and-encryption of the output value in which at least one with-carry subvalue is reduced to a non-carry subvalue.

19. A compiler device (119) for compiling a computation into a homomorphic executable, wherein the homomorphic executable is executable by an encrypted computation engine and causes the encrypted computation engine to perform an encrypted computation according to claim 1, wherein the device comprises:

a storage (149) for storing data representing a computation to be compiled into the homomorphic executable;

a processor subsystem (139) configured to: for a with-carry subvalue that is to be computed, determine a degree of fullness indicating a bound on the with-carry subvalue; and, if the bound exceeds the carry-message modulus of the with-carry subvalue, generate an instruction that causes the encrypted computation engine to apply an encrypted carry-reduction prior to computing said with-carry subvalue.

20. A transitory or non-transitory computer-readable storage medium (1000) comprising data (1020) representing:

instructions which, when executed by a processor system, cause the processor system to perform the method according to claim 1; and/or instructions which, when executed by a processor system, cause the processor system to perform the method according to claim 17; and/or a set of one or more encoded-and-encrypted values comprising zero or more valued encoded-and-encrypted without carry and one or more values encoded-and-encrypted with carry, wherein:

a value is encoded-and-encrypted as encryptions of multiple respective subvalues, wherein a subvalue has a corresponding message modulus and carry-message modulus larger than the message modulus;

a value is encoded-and-encrypted without carry by non-carry subvalues smaller than the corresponding message moduli, and wherein a value is encoded-and-encrypted with carry by at least one with-carry subvalue larger than or equal to the corresponding message modulus.

* * * * *